United States Patent [19]
Kojima

[11] Patent Number: 5,953,383
[45] Date of Patent: Sep. 14, 1999

[54] DIVERSITY RECEIVER

[75] Inventor: Toshiharu Kojima, Tokyo, Japan

[73] Assignee: Mitsubishi Denki Kabushiki Kaisha, Tokyo, Japan

[21] Appl. No.: 08/747,665

[22] Filed: Nov. 13, 1996

[30] Foreign Application Priority Data

Jan. 31, 1996 [JP] Japan ..................................... 8-015633

[51] Int. Cl.$^6$ .............................. H04B 7/10; H04L 1/02
[52] U.S. Cl. .......................................... 375/347; 455/132
[58] Field of Search .................................... 375/347, 267, 375/316, 340, 341, 346, 299; 455/132, 133, 134, 101

[56] References Cited

U.S. PATENT DOCUMENTS

| | | | |
|---|---|---|---|
| 5,621,769 | 4/1997 | Wan et al. | 375/347 |
| 5,621,770 | 4/1997 | Zastera | 375/347 |
| 5,654,980 | 8/1997 | Latva-aho et al. | 375/347 |
| 5,668,839 | 9/1997 | Bernasconi et al. | 375/347 |
| 5,680,419 | 10/1997 | Bottomley | 375/347 |
| 5,710,995 | 1/1998 | Akaiwa et al. | 375/347 |

FOREIGN PATENT DOCUMENTS 6268559  3/1993  Japan .

*Primary Examiner*—Chi H. Pham
*Assistant Examiner*—Bryan Webster

[57] ABSTRACT

According to the present invention, it is possible to improve a bit error rate performance of a conventional diversity receiver.

In a diversity receiver of the present invention, first, second to Lth multiple differential detection signals and received signal strength are generated by multiple differential detection/signal strength detecting circuits, and are inputted into a combined branch metric generating circuit in a sequence estimator, thereby generating a combined branch metric. An ACS circuit is operated for an ACS operation on the basis of Viterbi algorithm by using the combined branch metric. A path memory sequentially takes as input path selecting signals outputted from the ACS circuit, and update the memory contents. A maximum likelihood state detecting circuit detects the most probable state by using a path metric outputted from the ACS circuit. A decision circuit determines and outputs demodulated data from a value corresponding to a surviving path leading to the most probable state detected by the maximum likelihood state detecting circuit among the oldest memory contents in the path memory.

36 Claims, 23 Drawing Sheets

DIVERSITY RECEIVER

BACKGROUND OF THE INVENTION

1. Field of the Invention

The present invention relates to improvement of a diversity receiver in a field of radio communication.

2. Description of the Prior Art

A conventional diversity receiver is disclosed in, for example, JP-A-6/268559. The prior art will be described hereinafter with reference to the drawings. In the following discussion, a prior art structure is equivalent to, but not completely identical with, a structure disclosed in the JP-A-6/268559.

FIG. 22 is a block diagram showing a structure of the conventional diversity receiver. In the drawing, reference numeral 100 denotes a local oscillator, 810A, 810B, . . . , 810L are first, second to Lth (L: integer of two or more) differential detection/signal strength detecting circuits, 820A, 820B, . . . , 820L are first, second to Lth likelihood calculating circuits, 830A, 830B, . . . , 830L are first, second to Lth multipliers, 840 is a combining circuit, and 850 is a decision circuit.

A description will now be given of the operation. In FIG. 22, first, second to Lth (L: integer of two or more) received signals are respectively inputted into the first, second to Lth differential detection/signal strength detecting circuits 810A, 810B, . . . , 810L. On the other hand, the local oscillator 100 outputs a local carrier which is inputted into the first, second to Lth differential detection/signal strength detecting circuits 810A, 810B, . . . , 810L.

Here, the first, second to Lth received signals mean the same transmitted signal received by L antennas (not shown), which is modulated through differential M-phase (M: integer of two or more) phase shift-keying (hereinafter referred to as PSK) or differential π/M shift M-phase PSK. When a carrier frequency of the transmitted signal is defined as f, and a symbol duration thereof is defined as T, a value $s_k(iT)$ of the kth (k=1, 2, . . . , L) received signal at a time of t=iT (i: integer of zero or more) can be given by the following expression:

$$s_k(iT) = \gamma_{k,i} \cos(2\pi f iT + \psi_{k,i}) \tag{1}$$

If there are no effects due to noise, fading, and so forth, a value $\psi_{k,i}$ of a phase of the Kth received signal at the time of t=iT can be written as the following expression (where addition being made modulo 2π) using an initial phase $\theta_o$ of the transmitted signal and a transmitted differential phase $\Delta\theta_i$ determined by transmitted data:

$$\psi_{k,i} = \theta_0 + \sum_{j=1}^{i} \Delta\theta_j \tag{2}$$

where the local carrier outputted from the local oscillator 100 has the same frequency as the carrier frequency f of the transmitted signal, and an initial phase thereof is φ. Therefore, when a value of the local carrier at the time of t=iT is defined as c(iT), the following expression can be held:

$$c(iT) = \cos(2\pi f iT + \phi) \tag{3}$$

The first, second to Lth differential detection/signal strength detecting circuits 810A, 810B, . . . , 810L respectively have the same structure, and perform the same signal processing of the first, second to Lth received signals. Thus, descriptions will be given of only the structure and the operation of the first differential detection/signal strength detecting circuit 810A.

FIG. 23 is a block diagram showing the structure of the first differential detection/signal strength detecting circuit 810A. In the drawing, reference numeral 210 denotes a phase comparator, 220 is a delay element with a delay time equal to a one-symbol duration T of the received signal, 230 is a subtracter modulo 2π, and 260 is a strength detecting circuit.

In FIG. 23, the first received signal, and the local carrier outputted from the local oscillator 100 are respectively inputted into the phase comparator 210. The phase comparator 210 outputs as a received phase signal a value of a phase of the first received signal on the basis of the local carrier. Thus, at the time of t=iT, a value of the received phase signal becomes $\psi_{1,i} - \phi$ (subtraction being made modulo 2π). The received phase signal is inputted into the delay element 220 with the delay time equal to the one-symbol duration T of the received signal, and the subtracter 230 modulo 2π. The delay element 220 outputs a phase signal delayed by the one-symbol duration. Therefore, at the time of t=iT, a value of the phase signal delayed by the one-symbol duration becomes $\psi_{1,i-1} - \phi$. The phase signal delayed by the one-symbol duration is inputted into the subtracter 230 modulo 2π. The subtracter 230 subtracts modulo 2π the phase signal outputted from the delay element 220 and delayed by the one-symbol duration from the received phase signal outputted from the phase comparator 210 to output the result of subtraction as a first one-symbol differential detection signal. Hence, when a value of the first one-symbol differential detection signal at the time of t=iT is defined as $\Delta\psi_{1,i}$, the following expression can be held (where subtraction being made modulo 2π):

$$\Delta\psi_{1,i} = (\psi_{1,i} - \phi) - (\psi_{1,i-1} - \phi) = \psi_{1,i} - \psi_{1,i-1} \tag{4}$$

That is, the first one-symbol differential detection signal $\Delta\psi_{1,i}$ expresses a variation in phase for the one-symbol duration of the first received signal, and has a value equal to the transmitted differential phase $\Delta\theta_i$ without the effects due to noise, fading, and so forth. As set forth above, since the value of the transmitted differential phase $\Delta\theta_i$ is determined by the transmitted data, it is possible to estimate the transmitted data by using the value of the first one-symbol differential detection signal $\Delta\psi_{1,i}$.

Further, the first received signal is inputted into the strength detecting circuit 260. The strength detecting circuit 260 outputs as first received signal strength the square of amplitude of the first received signal. That is, the first received signal strength is proportional to signal power of the first received signal. If a value of the first received signal strength at the time of t=iT is defined as $P_{1,i}$, the following expression can be held:

$$P_{1,i} = \gamma_{1,i}^2 \tag{5}$$

The above signal processing generates the first one-symbol differential detection signal and the first received signal strength which are outputted from the first differential detection/signal strength detecting circuit 810A. Returning to FIG. 22, a description will be given of the prior art.

According to the same signal processing as that in the first differential detection/signal strength detecting circuit 810A, the second to Lth differential detection/signal strength detecting circuits 810B, . . . , 810L generate and output the second to Lth one-symbol differential detection signals and received signal strength from the second to Lth received signals and the local carrier outputted from the local oscillator 100. Thus, when values of the kth (k=2, ..., L) one-symbol differential detection signal and received signal strength at the time of t=iT are defined as $\Delta\psi_{k,i}$ and $P_{k,i}$, the following expressions can be held (where subtraction being made modulo $2\pi$):

$$\Delta\psi_{k,i}=\psi_{k,i}-\psi_{k,i-1} P_{k,i}=\gamma_{k,i}^2 \qquad (6)$$

The first, second to Lth differential detection/signal strength detecting circuits 810A, 810B, ..., 810L output the first, second to Lth one-symbol differential detection signals which are respectively inputted into the first, second to Lth likelihood calculating circuits 820A, 820B, ..., 820L. The first, second to Lth likelihood calculating circuits 820A, 820B, ..., 820L are operated for the same signal processing of the first, second to Lth one-symbol differential detection signals. Hence, a description will now be given of only the operation of the first likelihood calculating circuit 820A.

As set forth above, the first one-symbol differential detection signal $\Delta\psi_{1,i}$ is equal to the transmitted differential phase $\Delta\theta_i$ without the effects due to noise, fading, and so forth. Further, the transmitted differential phase $\Delta\theta_i$ takes any one value of M signal point phases $\alpha_0, \alpha_1, \ldots, \alpha_{M-1}$ according to a value of the transmitted data. Therefore, it is possible to regard an absolute value $|\Delta\psi_{1,i}-\alpha_m|$ of a difference between the first one-symbol differential detection signal $\Delta\psi_{1,i}$ and each of the signal point phases $\alpha_m$ (m=0, 1, ..., M−1) as the likelihood showing probability that the value of the transmitted differential phase $\Delta\theta_i$ is $\alpha_m$. Here, it is assumed that the subtraction is made modulo $2\pi$, and the result of subtraction is equal to or more than $-\pi$ and less than $\pi$. In this case, it is shown that the probability becomes higher as the value of the likelihood becomes smaller. Further, a value of each of the signal point phases $\alpha_m$ is defined as $\alpha_m=2m\pi/M$ in case of the differential M-phase PSK, or $\alpha_m=2m\pi/M+\pi/M$ in case of the differential $\pi/M$ shift M-phase PSK.

The first likelihood calculating circuit 820A calculates for combination of all likelihood $\lambda_{1,i,m}=|\Delta\psi_{1,i}-\alpha_m|$ of the first one-symbol differential detection signal with respect to the respective signal point phases $\alpha_m$ (m=0, 1, ..., M−1), and outputs the result as a first likelihood signal $\lambda_{1,i}=(\lambda_{1,i,0}, \lambda_{1,i,1}, \ldots, \lambda_{1,i,M-1})$. In the calculation of the likelihood $\lambda_{1,i,m}$, it is assumed that the subtraction is made modulo $2\pi$, and the result of subtraction is equal to or more than $-\pi$ and less than $\pi$.

The second to Lth likelihood calculating circuits 820B, ..., 820L carry out the same signal processing as that in the first likelihood calculating circuit 820A, and calculate and output second to Lth likelihood signals from the second to Lth one-symbol differential detection signals. Therefore, for likelihood $\lambda_{k,i,m}$ (m=0, 1, ..., M−1) constituting a kth (k=2, ..., L) likelihood signal $\lambda_{k,i}=(\lambda_{k,i,0}, \lambda_{k,i,1}, \ldots, \lambda_{k,i,M-1})$, the following expression can be held (where the subtraction is made modulo $2\pi$, and the result of subtraction is equal to or more than $-\pi$ and less than $\pi$):

$$\lambda_{k,i,m}=|\Delta\psi_{k,i}-\alpha_m| \qquad (7)$$

The first, second to Lth likelihood calculating circuits 820A, 820B, ..., 820L output the first, second to Lth likelihood signals $\lambda_{1,i}, \lambda_{2,i}, \ldots, \lambda_{L,i}$ which are respectively inputted into the first, second to Lth multipliers 830A, 830B, ..., 830L. Further, the first, second to Lth differential detection/signal strength detecting circuits 810A, 810B, ..., 810L output the first, second to Lth received signal strength $P_{1,i}, P_{2,i}, \ldots, P_{L,i}$ which are similarly inputted into the first, second to Lth multipliers 830A, 830B, ..., 830L to be multiplied by the first, second to Lth likelihood signals $\lambda_{1,i}, \lambda_{2,i}, \ldots, \lambda_{L,i}$. The results of multiplication are inputted into the combining circuit 840 which adds up the results to provide and output a combined likelihood signal $\Lambda_i=(\Gamma_{i,0}, \Gamma_{i,1}, \ldots, \Gamma_{i,M-1})$ Hence, combined likelihood $\Lambda_{i,m}$ (m=0, 1, ..., M−1) serving as components of the combined likelihood signal $\Lambda_i$ can be given by the following expression:

$$\Lambda_{i,m} = \sum_{k=1}^{L} P_{k,i} \lambda_{k,i,m} \qquad (8)$$

That is, the combined likelihood $\Lambda_{i,m}$ (m=0, 1, ..., M−1) can be obtained through diversity combining after weighting the likelihood $\lambda_{k,i,m}$ (k=1, 2, ..., L) with respect to the signal point phases $\alpha_m$ with the received signal strength $P_{k,i}$.

The combining circuit 840 outputs the combined likelihood signal $\Lambda_i$ which is inputted into the decision circuit 850. As set forth above, it is shown that the probability becomes higher as the value of the likelihood becomes smaller. Consequently, in the decision circuit 850, it is determined that the value of the transmitted differential phase $\Delta\theta_i$ is equal to a signal point phase $\alpha_\mu$ with respect to the minimum value $\Lambda_{i,\mu}$ ($\mu\in\{0, 1, \ldots, M-1\}$) among the combined likelihood $\Lambda_{i,m}$ (m=0, 1, ..., M−1) serving as components of the combined likelihood signals $\Lambda_i$. Subsequently, the decision circuit 850 outputs data corresponding to the signal point phase $\alpha_\mu$ as demodulated data depending upon a correspondence between the transmitted data and the transmitted differential phase $\Delta\theta_i$.

In such a manner, the conventional diversity receiver can provide a diversity effect by determining the demodulated data by using the combined likelihood $\Lambda_{i,m}$ obtained through the diversity combining after weighting the likelihood $\lambda_{k,i,m}$ (k=1, 2, ..., L) with respect to the signal point phases $\alpha_m$ (m=0, 1, ..., M−1) with the received signal strength $P_{k,i}$.

As set forth above, in the conventional diversity receiver, the demodulated data is determined on the basis of the likelihood signal generated from the one-symbol differential detection signal. As described above, the one-symbol differential detection signal is obtained by subtracting a received signal phase preceding by the one-symbol duration from a current received signal phase. However, both the received signal phases are generally affected by independent noises. Thus, the one-symbol differential detection signal has a lower signal-to-noise power ratio (hereinafter briefly referred to as SNR) than that of the received signal. In the conventional diversity receiver, the demodulated data is determined on the basis of the likelihood signal generated from the one-symbol differential detection signal having the lower SNR than that of the received signal. As a result, there is a problem of an inferior bit error rate performance of the demodulated data.

SUMMARY OF THE INVENTION

In view of the foregoing, it is an object of the present invention to provide a system of improvement of a bit error rate performance of a diversity receiver.

According to the present invention, there is provided a diversity receiver to receive and demodulate a plurality of signals including a data sequence modulated through differential phase shift keying. The diversity receiver consists of multiple differential detection means arranged corresponding to the plurality of received signals, for generating multiple differential detection signals obtained by multiplying a one-symbol differential detection signal serving as a difference between a current phase of the received signal and a phase preceding by a one-symbol duration, and a predetermined-symbol differential detection signal serving as a difference between the current phase of the received signal and a phase preceding by a predetermined-symbol duration, signal strength detecting means arranged corresponding to the plurality of received signals, for detecting signal strength of the received signals, and generating signal strength signals corresponding to the signal strength, and sequence estimating means for estimating a transmitted differential phase sequence by using the multiple differential detection signal and the signal strength signal generated for each of the plurality of received signals, and demodulating the data sequence.

Further, the sequence estimating means includes weighting factor generating means for each of the weighting factor including a value of integral power of 2 depending upon the signal strength signal in each of the plurality of received signals, and weighting means for weighting the multiple differential detection signal depending upon the weighting factor calculated in the weighting factor generating means.

According the present invention, there is provided a diversity receiver including multiple differential detection means for generating, from first, second to Lth (L: integer of 2 or more) received signals, 1, 2, . . . , N-symbol differential detection signals serving as differences between current phases of the received signals and phases preceding by 1, 2, . . . , N-symbol (N: integer of 2 or more) durations, signal strength detecting means for generating received signal strength corresponding to the first, second to Lth received signals, and sequence estimating means for estimating a transmitted differential phase sequence by using the first, second to Lth 1, 2, . . . , N-symbol differential detection signals outputted from the multiple differential detection means, and the first, second to Lth received signal strength outputted from the signal strength detecting means, and outputting a demodulated data sequence corresponding to an estimated value of the transmitted differential phase sequence.

Further, the signal strength detecting means generate values of the uth (u: real number of zero or more) powers of amplitude of the received signals as the received signal strength.

Further, the sequence estimating means includes combined branch metric generating means for, on the basis of a trellis diagram showing state transitions between $M^{N-1}$ states obtained by (N−1) combinations of M (M: the number of signal point phases in a transmitted differential phase, and integer of 2 or more) signal point phases, generating combined branch metric values corresponding to the state transitions on the trellis diagram by using the first, second to Lth 1, 2, . . . , N-symbol differential detection signals, and the first, second to Lth received signal strength, ACS means for an Add-Compare-Select (ACS) operation on the basis of Viterbi algorithm by using the combined branch metric values generated in the combined branch metric generating means, and path memory means in which path selecting signals outputted from the ACS means to serve as the results of the ACS operation, are stored. Further, the sequence estimating means estimates the transmitted differential phase sequence on the basis of the Viterbi algorithm.

Further, the combined branch metric generating means includes first, second to Lth branch metric calculating means for generating branch metric values corresponding to the state transitions on the trellis diagram by using the first, second to Lth 1, 2, . . . , N-symbol differential detection signals, first, second to Lth multiplying means for multiplying the branch metric values outputted from the first, second to Lth branch metric calculating means by the first, second to Lth received signal strength, and outputting the results of multiplication as weighted branch metric values, and combining means for adding, among the weighted branch metric values outputted from the first, second to Lth multiplying means, the branch metric values corresponding to the same state transition, and outputting the result of addition as a combined branch metric.

Further, the combined branch metric generating means includes first, second to Lth branch metric calculating means for generating the branch metric values corresponding to the state transitions on the trellis diagram by using the first, second to Lth 1, 2, . . . , N-symbol differential detection signals, weighting factor generating means for generating first, second to Lth weighting factors from the first, second to Lth received signal strength, first, second to Lth multiplying means for multiplying the branch metric values outputted from the first, second to Lth branch metric calculating means by the first, second to Lth weighting factors outputted from the weighting factor generating means, and outputting the results of multiplication as the weighted branch metric values, and combining means for adding, among the weighted branch metric values outputted from the first, second to Lth multiplying means, the branch metric values corresponding to the same state transition, and outputting the result of addition as a combined branch metric.

Further, the weighting factor generating means includes maximum value detecting means for detecting and outputting as the maximum signal strength the maximum value among the first, second to Lth received signal strength, and first, second to Lth dividing means for dividing the first, second to Lth received signal strength by the maximum signal strength outputted from the maximum value detecting means, and outputting the results of division as first, second to Lth weighting factors.

Further, the weighting factor generating means consists of maximum value detecting means for detecting and outputting as the maximum signal strength the maximum value among the first, second to Lth received signal strength, first, second to Lth dividing means for dividing the first, second to Lth received signal strength by the maximum signal strength outputted from the maximum value detecting means, and outputting the results of division as first, second to Lth normalized signal strength, and first, second to Lth truncating means for taking as input the first, second to Lth normalized signal strength outputted from the first, second to Lth dividing means, outputting the first, second to Lth normalized signal strength as the first, second to Lth weighting factors when the first, second to Lth normalized signal strength are equal to or more than a predetermined threshold, and outputting zero as the first, second to Lth weighting factors when the first, second to Lth normalized signal strength are less than the predetermined threshold.

Further, the weighting factor generating means includes maximum value detecting means for detecting and outputting as the maximum signal strength the maximum value among the first, second to Lth received signal strength, first, second to Lth dividing means for dividing the first, second to Lth received signal strength by the maximum signal strength outputted from the maximum value detecting means, and outputting the results of division as the first, second to Lth normalized signal strength, and first, second to Lth logarithmic quantization means for taking as input the first, second to Lth normalized signal strength outputted from the first, second to Lth dividing means, and outputting values of integral powers of 2 in the vicinity of the first, second to Lth normalized signal strength as the first, second to Lth weighting factors.

Further, the combined branch metric generating means includes strength order output means for taking as input the first, second to Lth 1, 2, . . . , N-symbol differential detection signals and the first, second to Lth received signal strength, comparing magnitude of the first, second to Lth received signal strength, and outputting 1, 2, . . . , N-symbol differential detection signals generated from the received signals having kth (k =1, 2, . . . , L) highest signal strength as 1, 2, . . . , N-symbol differential detection signals having kth highest strength, first, second to Lth branch metric calculating means for generating branch metric values corresponding to the state transitions on the trellis diagram by using 1, 2, . . . , N-symbol differential detection signals having first, second, . . . , Lth highest strength outputted from the strength order output means, first to (L−1)th multiplying means for multiplying the branch metric values outputted from the second to Lth branch metric calculating means by constants $2^{J(1)}, \ldots, 2^{J(L-1)}$ determined by J(k) (k=1, . . . , L−1) taking integers of zero or less, and outputting the results of multiplication as weighted branch metric values, and combining means for adding, among the branch metric value outputted from the first branch metric calculating means and the weighted branch metric values outputted from the first to (L−1)th multiplying means, the branch metric values corresponding to the same state transition, and outputting the result of addition as a combined branch metric.

Further, the combined branch metric generating means includes strength order selecting means for taking as input the first, second to Lth 1, 2, . . . , N-symbol differential detection signals and the first, second to Lth received signal strength, comparing magnitude of the first, second to Lth received signal strength to select and output first to Kth (K: integer of 1 or more, and less than L) highest signal strength as first, second, . . . , Kth highest signal strength, and output 1, 2, . . . , N-symbol differential detection signals generated from received signals having kth (k=1, 2, . . . , K) highest signal strength as 1, 2, . . . , N-symbol differential detection signals having kth highest strength, first, second to Kth branch metric calculating means for generating branch metric values corresponding to the state transitions on the trellis diagram by using 1, 2, . . . , N-symbol differential detection signals having first, second, . . . , Kth highest strength outputted from the strength order selecting means, first, second to Kth multiplying means for multiplying the branch metric values outputted from the first, second to Kth branch metric calculating means by the first, second, . . . , Kth highest signal strength, and outputting the results of multiplication as weighted branch metric values, and combining means for adding, among the weighted branch metric values outputted from the first, second to Kth multiplying means, the branch metric values corresponding to the same state transition, and outputting the result of addition as a combined branch metric.

Further, the combined branch metric generating means includes strength order selecting means for taking as input the first, second to Lth 1, 2, . . . , N-symbol differential detection signals and the first, second to Lth received signal strength, comparing magnitude of the first, second to Lth received signal strength to select and output first to Kth (K: integer of 1 or more, and less than L) highest signal strength as first, second, . . . , Kth highest signal strength, and output 1, 2, . . . , N-symbol differential detection signals generated from received signals having kth (k=1, 2, . . . , K) highest signal strength as 1, 2, . . . , N-symbol differential detection signals having kth highest strength, first, second to Kth branch metric calculating means for generating branch metric values corresponding to the state transitions on the trellis diagram by using 1, 2, . . . , N-symbol differential detection signals having first, second, . . . , Kth highest strength outputted from the strength order selecting means, weighting factor generating means for generating first to (K−1)th weighting factors from the first, second, . . . , Kth highest signal strength, first to (K−1)th multiplying means for multiplying the branch metric values outputted from the second to Kth branch metric calculating means by the first to (K−1)th weighting factors outputted from the weighting factor generating means, and outputting the results of multiplication as weighted branch metric values, and combining means for adding, among the branch metric value outputted from the first branch metric calculating means and the weighted branch metric values outputted from the first to (K−1)th multiplying means, the branch metric values corresponding to the same state transition, and outputting the result of addition as a combined branch metric.

Further, the weighting factor generating means includes first to (K−1)th dividing means for dividing the second, . . . , Kth highest signal strength by the first highest signal strength, and outputting the results of division as the first to (K−1)th weighting factors.

Further, the weighting factor generating means includes first to (K−1)th dividing means for dividing the second, . . . , Kth highest signal strength by the first highest signal strength, and outputting the results of division as first to (K−1)th normalized signal strength, and first to (K−1)th truncating means for taking as input the first to (K−1)th normalized signal strength outputted from the first to (K−1)th dividing means, outputting the first to (K−1)th normalized signal strength as the first to (K−1)th weighting factors when the first to (K−1)th normalized signal strength are equal to or more than a predetermined threshold, and outputting zero as the first to (K−1)th weighting factors when the first to (K−1)th normalized signal strength are less than the predetermined threshold.

Further, the weighting factor generating means includes first to (K−1)th dividing means for dividing the second, . . . , Kth highest signal strength by the first highest signal strength, and outputting the results of division as the first to (K−1)th normalized signal strength, and first to (K−1)th logarithmic quantization means for taking as input the first to (K−1)th normalized signal strength outputted from the first to (K−1)th dividing means, and outputting values of integral powers of 2 in the vicinity of the first to (K−1)th normalized signal strength as the first to (K−1)th weighting factors.

Further, the combined branch metric generating means includes strength order selecting means for taking as input the first, second to Lth 1, 2, . . . , N-symbol differential detection signals and the first, second to Lth received signal strength, comparing magnitude of the first, second to Lth received signal strength to select and output 1, 2, . . . , N-symbol differential detection signals generated from received signals having first, second, . . . , Kth (K: integer of 1 or more, and less than L) highest signal strength as 1, 2, . . . , N-symbol differential detection signals having first, second, . . . , Kth highest strength, first, second to Kth branch metric calculating means for generating branch metric values corresponding to the state transitions on the trellis diagram by using 1, 2, . . . , N-symbol differential detection signals having first, second, . . . , Kth highest strength outputted from the strength order selecting means, first to (K−1)th multiplying means for multiplying the branch metric values outputted from the second to Kth branch metric calculating means by constants $2^{J(1)}, \ldots, 2^{J(K-1)}$ determined by J(k) (k=1, . . . , K−1) taking integers of zero or less, and outputting the results of multiplication as weighted branch metric values, and combining means for adding, among the branch metric value outputted from the first branch metric calculating means and the weighted branch metric values outputted from the first to (K−1)th multiplying means, the branch metric values corresponding to the same state transition, and outputting the result of addition as a combined branch metric.

Descriptions will now be given of the operations of the invention.

In the diversity receiver according to the present invention, the multiple differential detection means are arranged corresponding to the plurality of received signals, and generate the multiple differential detection signals obtained by multiplying the one-symbol differential detection signal serving as the difference between the current phase of the received signal and the phase preceding by the one-symbol duration, and the predetermined-symbol differential detection signal serving as the difference between the current phase of the received signal and the phase preceding by the predetermined-symbol duration. Further, the signal strength detecting means are arranged corresponding to the plurality of received signals to detect the signal strength of the received signals, and generate signal strength signals corresponding to the signal strength. Further, the sequence estimating means estimates the transmitted differential phase sequence by using the multiple differential detection signal and the signal strength signal generated for each of the plurality of received signals, and demodulates the data sequence.

Further, in the sequence estimating means, the weighting factor generating means calculates the weighting factor including the value of the integral power of 2 depending upon the signal strength signal in each of the plurality of received signals, and the weighting means weight the multiple differential detection signals depending upon the weighting factor calculated in the weighting factor generating means.

In the diversity receiver according to the present invention, the multiple differential detection means and the signal strength detecting means generate, from the first, second to Lth (L: integer of 2 or more) received signals, the 1, 2, . . . , N-symbol differential detection signals serving as the differences between the current phases of the received signals and the phases preceding by the 1, 2, . . . , N-symbol (N: integer of 2 or more) durations. Further, the signal strength detecting means generate the received signal strength corresponding to the first, second to Lth received signals. The sequence estimating means estimates the transmitted differential phase sequence by using the first, second to Lth 1, 2, . . . , N-symbol differential detection signals outputted from the multiple differential detection means, and the first, second to Lth received signal strength outputted from the signal strength detecting means, and outputs the demodulated data sequence corresponding to the estimated value of the transmitted differential phase sequence.

That is, the n-symbol (n=1, 2, . . . , N) differential detection signal contains information about a subsequence including n elements of the transmitted differential phase sequence. Thus, by utilizing this characteristic, the sequence estimating means estimates the transmitted differential phase sequence.

That is, in a state in which (N−1) successive elements of the transmitted differential phase sequence are combined, the elements can take any one value of M signal point phases so that the state inevitably agrees with any one of elements of a finite set including $M^{N-1}$ states formed by (N−1) combinations of the M signal point phases. Thus, since it is possible to define a trellis diagram showing state transitions between the $M^{N-1}$ states, the sequence estimating means can estimate the transmitted differential phase sequence through the Viterbi algorithm on the basis of the trellis diagram.

It is possible to suppose a subsequence including N successive elements of the transmitted differential phase sequence corresponding to a specific state transition between the $M^{N-1}$ states. Thus, it is possible to suppose replicas of 1, 2, . . . , N-symbol differential detection signals determined by the subsequence. Therefore, a calculation can be made to find a branch metric value of a branch on the trellis diagram corresponding to the state transition, showing the probability of generation of the state transition, depending upon the replicas of the 1, 2, . . . , N-symbol differential detection signals corresponding to the state transition and the actual 1, 2, . . . , N-symbol differential detection signals. Depending upon the principle, the combined branch metric generating means arranged in the sequence estimating means generates the combined branch metric values corresponding to the state transitions on the trellis diagram by using the first, second to Lth 1, 2, . . . , N-symbol differential detection signals, and the first, second to Lth received signal strength.

That is, the first, second to Lth branch metric calculating means arranged in the combined branch metric generating means calculate the branch metric values corresponding to the state transitions on the trellis diagram by using the first, second to Lth 1, 2, . . . , N-symbol differential detection signals. As set forth above, the 1, 2, . . . , N-symbol differential detection signals are the differences between the current phases of the received signals and the phases preceding by the 1, 2, . . . , N-symbol durations. However, (N+1) phases are typically affected by independent noises. Consequently, the 1, 2, . . . , N-symbol differential detection signals are differently affected by the noises. Therefore, when the branch metric values are calculated by using the 1, 2, . . . , N-symbol differential detection signals, an SNR is enhanced because an effect of averaging the noise is caused in the process of the calculation. That is, the SNR is enhanced in the branch metric values with respect to the first, second to Lth 1, 2, . . . , N-symbol differential detection signals outputted from the first, second to Lth branch metric calculating means.

The first, second to Lth multiplying means arranged in the combined branch metric generating means multiply the branch metric values with respect to the first, second to Lth 1, 2, . . . , N-symbol differential detection signals outputted from the first, second to Lth branch metric calculating means by the first, second to Lth received signal strength, and output the results of multiplication as the weighted branch metric values. Further, the combining means adds, among the weighted branch metric values outputted from the first, second to Lth multiplying means, the branch metric values corresponding to the same state transition, and outputs the result of addition as the combined branch metric value. Therefore, the combined branch metric value serving as output of the combined branch metric generating means can be obtained by weighted combining of the branch metric values with respect to the first, second to Lth 1, 2, . . . , N-symbol differential detection signals outputted from the first, second to Lth branch metric calculating means with the first, second to Lth received signal strength.

The ACS means arranged in the sequence estimating means performs the ACS operation on the basis of the Viterbi algorithm by using the combined branch metric values generated in the combined branch metric generating means. Further, the path selecting signal outputted from the ACS means to serve as the results of the ACS operation, are stored in the path memory means.

In such a manner, the sequence estimating means estimates the transmitted differential phase sequence on the basis of the Viterbi algorithm. As described above, a diversity effect can be obtained in the process of estimation of the sequence through the Viterbi algorithm by using the combined branch metric obtained by the weighted combining according to the received signal strength, generated in the combined branch metric generating means. Further, as stated above, in the branch metric values with respect to the first, second to Lth 1, 2, . . . , N-symbol differential detection signals outputted from the first, second to Lth branch metric calculating means, the SNR is enhanced in the process of calculation thereof. Consequently, it is possible to provide a more excellent bit error rate performance of the demodulated data sequence corresponding to the estimated value of the transmitted differential phase sequence estimated by the sequence estimating means by using the combined branch metric values obtained by the weighted combining of the branch metric values than a bit error rate performance in a conventional diversity receiver using only a one-symbol differential detection signal.

Further, the weighting factor generating means arranged in the combined branch metric generating means outputs as the weighting factor the result of normalization in which the respective received signal strength are divided by the maximum value among the first, second to Lth received signal strength. That is, the maximum value detecting means arranged in the weighting factor generating means detects and outputs as the maximum signal strength the maximum value among the first, second to Lth received signal strength. Further, the first, second to Lth dividing means divide the first, second to Lth received signal strength by the maximum signal strength outputted from the maximum value detecting means, and output the results of division as first, second to Lth weighting factors. Consequently, the first, second to Lth weighting factors serving as output of the weighting factor generating means are in the same ratio as that of the first, second to Lth received signal strength. Further, the first, second to Lth weighting factors are limited to 1 or less.

In the combined branch metric generating means, the first, second to Lth multiplying means and the combining means are operated for the weighted combining of the branch metric values with respect to the first, second to Lth 1, 2, . . . , N-symbol differential detection signals outputted from the first, second to Lth branch metric calculating means depending upon the first, second to Lth weighting factors outputted from the weighting factor generating means.

As set forth above, the first, second to Lth weighting factors are limited to 1 or less. Thus, when the combined branch metric generating means consists of digital circuits, no overflow error occurs in the first, second to Lth multiplying means or the combining means even if an excessive received signal is inputted. As a result, a normal combined branch metric can be obtained so that degradation in bit error rate performance can be prevented.

Further, the weighting factor generating means arranged in the combined branch metric generating means truncates, i.e., sets the weighting factor to zero when the result of normalization in which the respective signal strength are divided by the maximum value among the first, second to Lth received signal strength is less than the predetermined threshold. That is, the first, second to Lth dividing means divide the first, second to Lth received signal strength by the maximum signal strength outputted from the maximum value detecting means, and output the results of division as the first, second to Lth normalized signal strength. Further, the first, second to Lth truncating means output the first, second to Lth normalized signal strength as the first, second to Lth weighting factors when the first, second to Lth normalized signal strength are equal to or more than the predetermined threshold, and output zero as the first, second to Lth weighting factors when the first, second to Lth normalized signal strength are less than the predetermined threshold.

In the combined branch metric generating means, the first, second to Lth multiplying means and the combining means are operated for the weighted combining of the branch metric values with respect to the first, second to Lth 1, 2, . . . , N-symbol differential detection signals outputted from the first, second to Lth branch metric calculating means depending upon the first, second to Lth weighting factors generated by the weighting factor generating means.

In such a manner, the combined branch metric is generated by using the truncated weighting factor. It is thereby possible to prevent degradation in bit error rate performance when the first, second to Lth received signals consist of only noise and no significant signal. That is, the predetermined threshold is set to be higher than strength of the noise, thereby setting the weighting factor to zero for the branch metric with respect to the received signal including only the noise and no significant signal. Thus, a term having only the noise can be removed when the combined branch metric is generated. As a result, no reduction occurs in SNR even in such a case so that the degradation in bit error rate performance can be prevented.

Further, the weighting factor generating means arranged in the combined branch metric generating means performs logarithmic quantization in which the values of the integral powers of 2 in the vicinity of the first, second to Lth normalized signal strength are outputted as the first, second to Lth weighting factors. That is, the first, second to Lth logarithmic quantization means arranged in the weighting factor generating means take as input the first, second to Lth normalized signal strength outputted from the first, second to Lth dividing means, and output the values of the integral powers of 2 in the vicinity of the first, second to Lth normalized signal strength as the first, second to Lth weighting factors.

In such a manner, by using the weighting factors quantized through the logarithmic quantization in the weighting factor generating means, when the combined branch metric generating means consists of digital circuits, it is possible to reduce hardware size of the first, second to Lth multiplying means arranged in the combined branch metric generating means, resulting in reduction in power consumption. That is, in digital signal processing, the multiplication using the integral power of 2 can be implemented by a simple bit shift operation. Hence, by expressing values of the first, second to Lth weighting factors by the integral powers of 2 through the logarithmic quantization, it is possible to implement the first, second to Lth multiplying means arranged in the combined branch metric generating means by simple bit shift circuits. As a result, it is possible to further reduce hardware size, and further reduce the power consumption than would be in a case without the logarithmic quantization where general multiplying means are required.

Further, the combined branch metric generating means performs weighted combining of branch metrics with respect to multiple differential detection signals obtained from received signals by using as weighting factors constant values of integral powers of 2, determined by the order of magnitude of received signal strength to take values of 1 or less, and outputs the result as the combined branch metric. That is, the strength order output means arranged in the combined branch metric generating means takes as input the first, second to Lth 1, 2, . . . , N-symbol differential detection signals and the first, second to Lth received signal strength, compares magnitude of the first, second to Lth received signal strength, and outputs 1, 2, . . . , N-symbol differential detection signals generated from the received signal having kth (k=1, 2, . . . , L) highest signal strength as 1, 2, . . . , N-symbol differential detection signals having kth highest strength. Further, the first, second to Lth branch metric calculating means generate branch metric values corresponding to the state transitions on the trellis diagram by using 1, 2, . . . , N-symbol differential detection signals having first, second, . . . , Lth highest strength outputted from the strength order output means.

The first to (L−1)th multiplying means arranged in the combined branch metric generating means multiply the branch metric values outputted from the second to Lth branch metric calculating means by constants $2^{J(1)}$, . . . , $2^{J(L-1)}$ determined by J(k) k=1, . . . , L−1) taking integers of zero or less, and output the results of multiplication as weighted branch metric values. As stated above, since J(1), . . . , J(L−1) are respectively the integers of zero or less, the weighting factors $2^{J(1)}$, . . . , $2^{j(L-1)}$ are respectively limited to 1 or less. Further, the combining means adds, among the branch metric value outputted from the first branch metric calculating means and the weighted branch metric values outputted from the first to (L−1)th multiplying means, the branch metric values corresponding to the same state transition, and outputs the result of addition as the combined branch metric serving as output of the combined branch metric generating means. Consequently, the signal processing is equivalent to multiplication of the branch metric value outputted from the first branch metric calculating means by the maximum weighting factor "1."

The combined branch metric generating means generates and outputs the combined branch metric in such a manner. The values of the weighting factors are not directly equal to the values of the received signal strength but equal to the constant values determined by the order of their magnitude. Hence, degradation in bit error rate performance can be prevented from occurring due to an overflow error even when an excessive received signal is inputted. In addition, when the combined branch metric generating means consists of digital circuits, it is possible to more reduce hardware size of the first to (L−1)th multiplying means arranged in the combined branch metric generating means, resulting in reduction in power consumption. That is, in digital signal processing, multiplication using the integral power of 2 can be implemented by a simple bit shift operation. Hence, the first to (L−1)th multiplying means can be implemented by bit shift circuits in which the number of shifted bits is fixed. As a result, the hardware size can more be reduced, resulting in reduction in power consumption.

Further, the combined branch metric generating means performs weighted combining of branch metrics with respect to multiple differential detection signals obtained from K (K: integer of 1 or more, and less than L) received signals having higher order signal strength among L received signals, and outputs the result as the combined branch metric. That is, the strength order selecting means arranged in the combined branch metric generating means takes as input the first, second to Lth 1, 2, . . . , N-symbol differential detection signals and the first, second to Lth received signal strength, compares the magnitude of the first, second to Lth received signal strength to select and output the first to Kth (K: integer of 1 or more, and less than L) highest signal strength as the first, second, . . . , Kth highest signal strength, and output the 1, 2, . . . , N-symbol differential detection signals generated from the received signals having the kth (k=1, 2, . . . , K) highest signal strength as the 1, 2, . . . , N-symbol differential detection signals having the kth highest strength. Further, the first, second to Kth branch metric calculating means generate the branch metric values corresponding to the state transitions on the trellis diagram by using the 1, 2, . . . , N-symbol differential detection signals having the first, second, . . . , Kth highest strength outputted from the strength order selecting means. Besides, the first, second to Kth multiplying means multiply the branch metric values outputted from the first, second to Kth branch metric calculating means by the first, second, . . . , Kth highest signal strength, and output the results of multiplication as the weighted branch metric values. Finally, the combining means adds, among the weighted branch metric values outputted from the first, second to Kth multiplying means, the branch metric values corresponding to the same state transition, and outputs the result of addition as the combined branch metric.

In such a manner, the combined branch metric generating means performs the weighted combining of the branch metrics with respect to the multiple differential detection signals obtained from the K received signals having the higher order strength, and outputs the result as the combined branch metric. Since the number of branch metric calculating means or multiplying means can be reduced from L to K, it is possible to more reduce hardware size, resulting in reduction in power consumption.

Further, the weighting factor generating means arranged in the combined branch metric generating means outputs as the weighting factor the result of normalization in which the second, . . . , Kth highest signal strength are divided by the first highest signal strength serving as the maximum value among the first, second, . . . , Kth highest signal strength. That is, the first to (K−1)th dividing means arranged in the weighting factor generating means divide the second, . . . , Kth highest signal strength by the first highest signal strength, and output the results of division as the first to (K−1)th weighting factors. Consequently, the first to (K−1) th weighting factors serving as output of the weighting factor generating means are in the same ratio as that of the second, . . . , Kth highest signal strength. Further, the first to (K−1)th weighting factors are limited to 1 or less.

The first to (K−1)th multiplying means arranged in the combined branch metric generating means multiply the branch metric values outputted from the second to Kth branch metric calculating means by the first to (K−1)th weighting factors outputted from the weighting factor generating means, and output the results of multiplication as the weighted branch metric values. Further, the combining means adds, among the branch metric value outputted from the first branch metric calculating means and the weighted branch metric values outputted from the first to (K−1)th multiplying means, the branch metric values corresponding to the same state transition, and outputs the result of addition as the combined branch metric. Consequently, the signal processing is equivalent to multiplication of the branch metric value outputted from the first branch metric calculating means by the maximum weighting factor "1".

As set forth above, the first to (K−1)th weighting factors are limited to 1 or less. Thus, when the combined branch metric generating means consists of digital circuits, no overflow error occurs in the first to (K−1)th multiplying means or the combining means even if an excessive received signal is inputted. As a result, a normal combined branch metric can be obtained so that degradation in bit error rate performance can be prevented.

The weighting factor generating means arranged in the combined branch metric generating means truncates, i.e., sets the weighting factor to zero when the result of normalization in which the second, ..., Lth highest signal strength are divided by the first highest signal strength is less than the predetermined threshold. That is, the first to (K−1)th dividing means divide the second, ..., Kth highest signal strength by the first highest signal strength, and output the results of division as the first to (K−1)th normalized signal strength. Further, the first to (K−1)th truncating means take as input the first to (K−1)th normalized signal strength outputted from the first to (K−1)th dividing means, output the first to (K−1)th normalized signal strength as the first to (K−1)th weighting factors when the first to (K−1)th normalized signal strength are equal to or more than the predetermined threshold, and output zero as the first to (K−1)th weighting factors when the first to (K−1)th normalized signal strength are less than the predetermined threshold.

In such a manner, the combined branch metric is generated by using the truncated weighting factor. It is thereby possible to prevent degradation in bit error rate performance when the received signal consists of only noise and no significant signal. That is, the predetermined threshold is set to be higher than strength of the noise, thereby setting the weighting factor to zero for the branch metric with respect to the received signal including only the noise and no significant signal. Thus, a term having only the noise can be removed when the combined branch metric is generated. As a result, no reduction occurs in SNR even in such a case so that the degradation in bit error rate performance can be prevented.

Further, the weighting factor generating means performs the logarithmic quantization to output the values of the integral powers of 2 in the vicinity of the first to (K−1)th normalized signal strength as the first to (K−1)th weighting factors. That is, the first to (K−1)th logarithmic quantization means arranged in the weighting factor generating means take as input the first to (K−1)th normalized signal strength outputted from the first to (K−1)th dividing means, and output the values of the integral powers of 2 in the vicinity of the first to (K−1)th normalized signal strength as the first to (K−1)th weighting factors.

In such a manner, by using the weighting factors quantized through the logarithmic quantization in the weighting factor generating means, when the combined branch metric generating means consists of digital circuits, it is possible to reduce the hardware size of the first to (K−1)th multiplying means arranged in the combined branch metric generating means, resulting in reduction in power consumption. That is, in digital signal processing, the multiplication using the integral power of 2 can be implemented by a simple bit shift operation. Hence, by expressing values of the first to (K−1)th weighting factors by the integral powers of 2 through the logarithmic quantization, it is thereby possible to implement the first to (K−1)th multiplying means arranged in the combined branch metric generating means by simple bit shift circuits. As a result, it is possible to more reduce the hardware size, and more reduce the power consumption than would be in a case without the logarithmic quantization where typical multiplying means are required.

Further, the combined branch metric generating means performs weighted combining of the branch metrics with respect to the multiple differential detection signals having the first, second, ..., Kth highest strength by using as the weighting factors the constant values of the integral powers of 2, determined by the order of magnitude of received signal strength to take values of 1 or less, and outputs the result as the combined branch metric. That is, the strength order selecting means arranged in the combined branch metric generating means takes as input the first, second to Lth 1, 2, ..., N-symbol differential detection signals and the first, second to Lth received signal strength, compares the magnitude of the first, second to Lth received signal strength to select and output the 1, 2, ..., N-symbol differential detection signals generated from the received signals having the first, second, ..., Kth (K: integer of 1 or more, and less than L) highest signal strength as the 1, 2, ..., N-symbol differential detection signals having the first, second, ..., Kth highest strength. Further, the first, second to Kth branch metric calculating means generate the branch metric values corresponding to the state transitions on the trellis diagram by using the 1, 2, ..., N-symbol differential detection signals having the first, second, ..., Kth highest strength outputted from the strength order selecting means.

The first to (K−1)th multiplying means arranged in the combined branch metric generating means multiply the branch metric values outputted from the second to Kth branch metric calculating means by the constants $2^{J(1)}, \ldots, 2^{J(K-1)}$ determined by J(k) (k=1, ..., K−1) taking integers of zero or less as the weighting factors, and output the results of multiplication as the weighted branch metric values. As stated above, since J(1), ..., J(K−1) are respectively the integers of zero or less, the weighting factors $2^{J(1)}, \ldots, 2^{J(K-1)}$ are respectively limited to 1 or less. Further, the combining means adds, among the branch metric value outputted from the first branch metric calculating means and the weighted branch metric values outputted from the first to (K−1)th multiplying means, the branch metric values corresponding to the same state transition, and outputs the result of addition as the combined branch metric serving as output of the combined branch metric generating means. Consequently, the signal processing is equivalent to multiplication of the branch metric value outputted from the first branch metric calculating means by the maximum weighting factor "1".

The combined branch metric generating means generates and outputs the combined branch metric in such a manner. The values of the weighting factors are not directly equal to the values of the received signal strength but equal to the constant values determined by the order of their magnitude. Hence, degradation in bit error rate performance can be prevented from occurring due to an overflow error even when an excessive received signal is inputted. In addition, when the combined branch metric generating means consists of digital circuits, it is possible to reduce the hardware size of the first to (L−1)th multiplying means arranged in the combined branch metric generating means, resulting in reduction in power consumption. That is, in digital signal processing, multiplication using the integral power of 2 can be implemented by a simple bit shift operation. Hence, the first to (K−1)th multiplying means can be implemented by bit shift circuits in which the number of shifted bits is fixed.

As a result, it is possible to reduce the hardware size, and reduce the power consumption.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Embodiment 1

Figure 1:
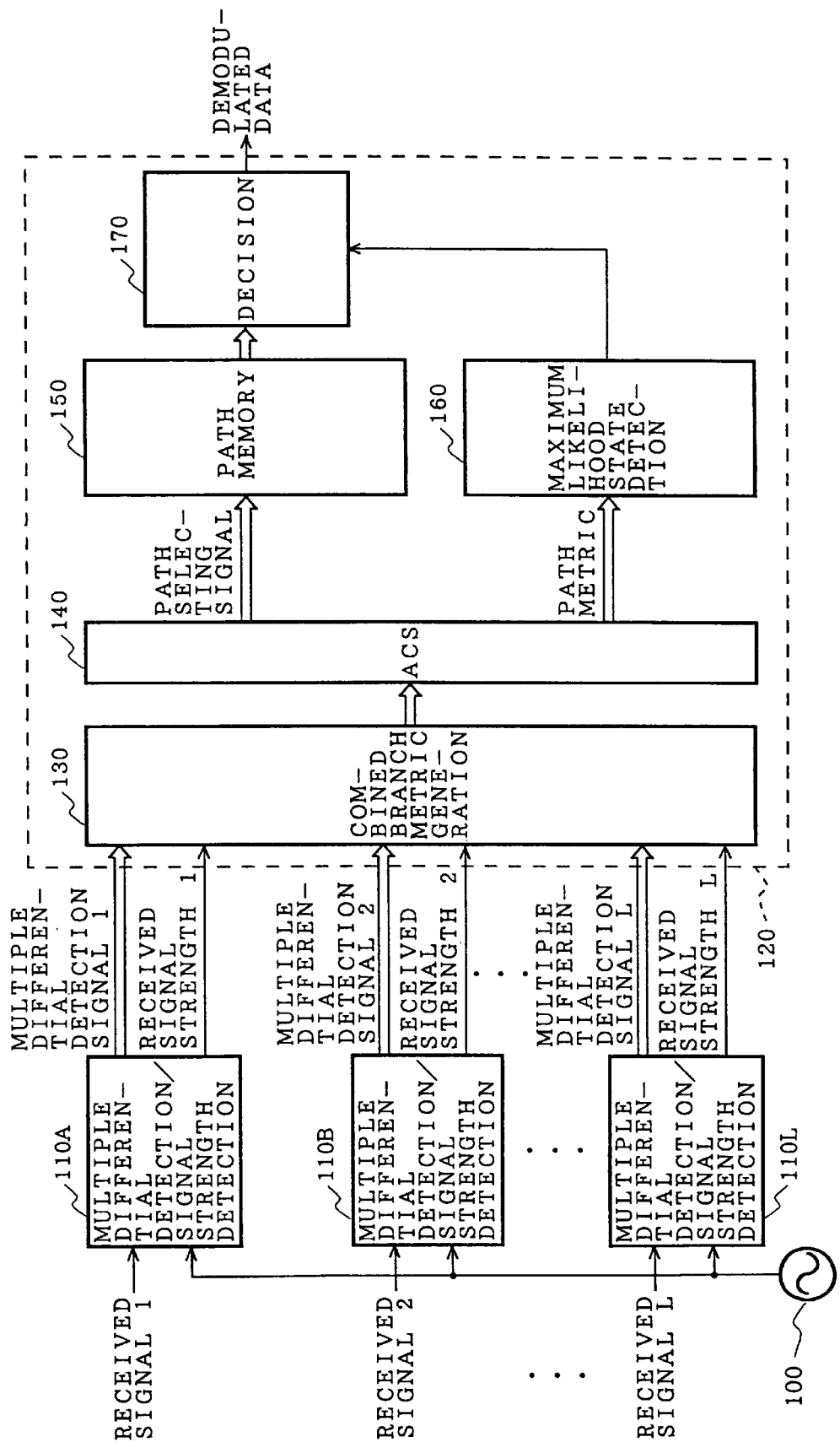
FIG. 1 is a block diagram showing one embodiment of a diversity receiver of the present invention.

FIG. 1 is a block diagram showing a structure of one embodiment of the present invention. In the drawing, reference numeral 100 denotes a local oscillator, 110A, 110B, ..., 110L are first, second to Lth (L: integer of two or more) multiple differential detection/signal strength detecting circuits, 120 is a sequence estimator to generate demodulated data by estimating a transmitted differential phase sequence through Viterbi algorithm, 130 is a combined branch metric generating circuit, 140 is an ACS circuit for an ACS operation on the basis of the Viterbi algorithm, 150 is a path memory in which path selecting signals serving as the results of the ACS operation are stored, 160 is a maximum likelihood state detecting circuit to detect the minimum value of a path metric updated by the ACS operation so as to output a value of a state having the minimum path metric, and 170 is a decision circuit for decision of the demodulated data depending upon memory contents of the path memory 150 corresponding to the state having the minimum path metric value outputted from the maximum likelihood state detecting circuit 160. Further, the same reference numerals are used for component parts identical with or equivalent to those in the prior art.

A description will now be given of the operation. In FIG. 1, first, second to Lth (L: integer of two or more) received signals are respectively inputted into the first, second to Lth multiple differential detection/signal strength detecting circuits 110A, 110B, ..., 110L. On the other hand, the local oscillator 100 outputs a local carrier which is inputted into the first, second to Lth multiple differential detection/signal strength detecting circuits 110A, 110B, ..., 110L.

Here, the first, second to Lth received signals are the same transmitted signal received by L antennas (not shown), which is modulated through differential M-phase (M: integer of two or more) PSK or differential π/M shift M-phase PSK. When a carrier frequency of the transmitted signal is defined as f, and a symbol duration thereof is defined as T, a value $S_k(iT)$ of the kth (k=1, 2, ..., L) received signal at a time of t=iT (i: integer of zero or more) can be given by the following expression:

$$s_k(iT) = \gamma_{k,i} \cos(2\pi f iT + \psi_{k,i}) \qquad (9)$$

Without effects due to noise, fading, and so forth, a value $\psi_{k,i}$ of a phase of the kth received signal at the time of t=iT can be written by the following expression (where addition being made modulo $2\pi$) using an initial phase $\theta_o$ of the transmitted signal and a transmitted differential phase $\Delta\theta_i$ determined by transmitted data:

$$\psi_{k,i} = \theta_0 + \sum_{j=1}^{i} \Delta\theta_j \tag{10}$$

where the local carrier outputted from the local oscillator 100 has the same frequency as the carrier frequency f of the transmitted signal, and an initial phase thereof is $\phi$. Therefore, when a value of the local carrier at the time of t=iT is defined as c(iT), the following expression can be held:

$$c(iT) = \cos(2\pi f iT + \phi) \tag{11}$$

The first, second to Lth multiple differential detection/signal strength detecting circuits 110A, 110B, . . . , 110L respectively have the same structure, and perform the same signal processing of the first, second to Lth received signals. Thus, descriptions will now be give of only the structure and the operation of the first multiple differential detection/signal strength detecting circuit 110A.

Figure 2:
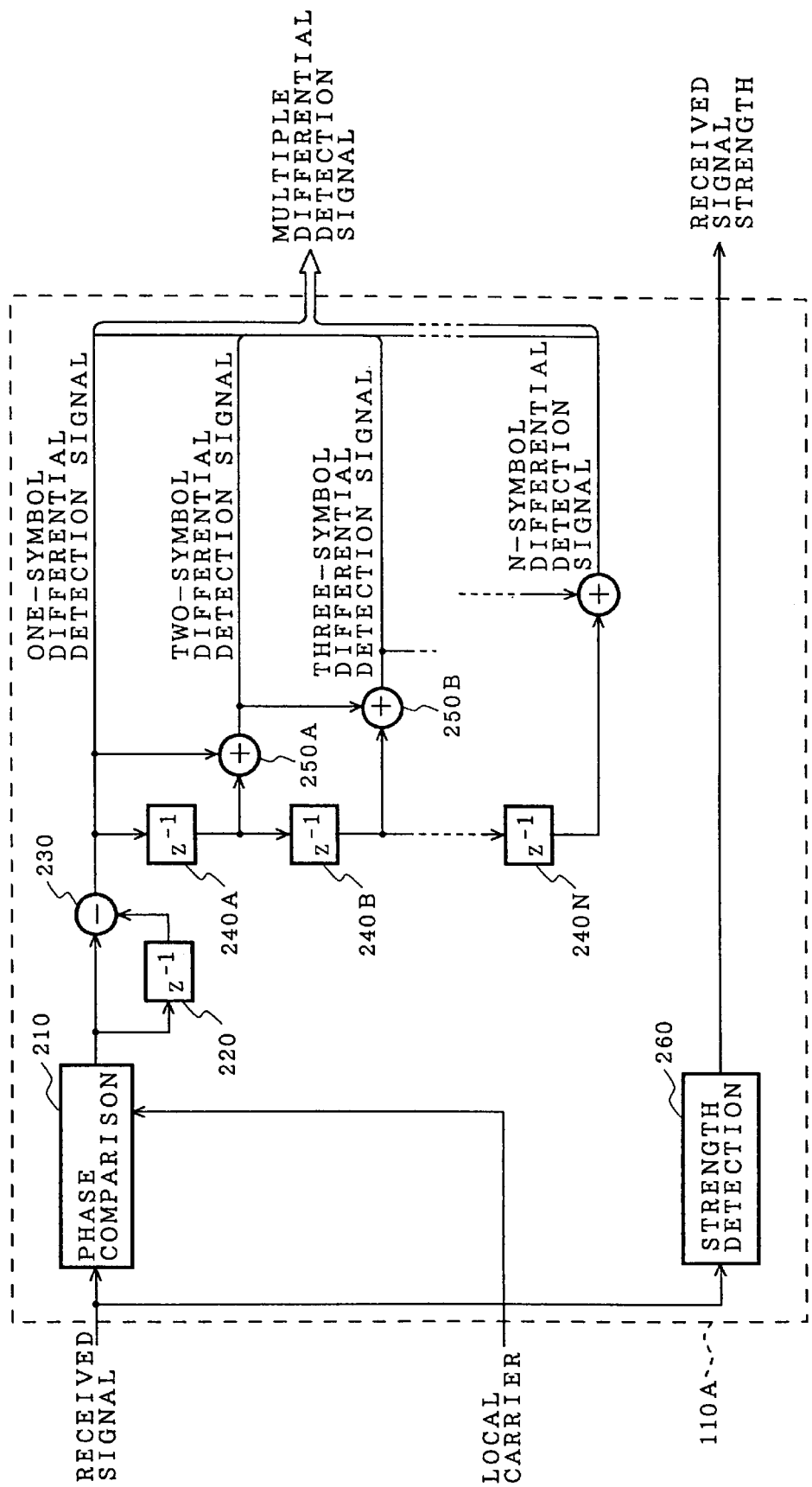
FIG. 2 is a block diagram showing one embodiment of a first multiple differential detection/signal strength detecting circuit shown in FIG. 1.

FIG. 2 is a block diagram showing the first multiple differential detection/signal strength detecting circuit 110A. In the drawing, reference numeral 210 denotes a phase comparator, 220 is a delay element with a delay time equal to a one-symbol duration T of the received signal, 230 is a subtracter modulo $2\pi$, 240A, 240B, . . . , 240N are a total of (N−1) (N: integer of two or more) delay elements with a delayed time equal to the one-symbol duration T of the received signal, 250A, 250B, . . . , 250N are a total of (N−1) (N: integer of two or more) adders modulo $2\pi$, and 260 is a strength detecting circuit.

In FIG. 2, the first received signal, and the local carrier outputted from the local oscillator 100 are respectively inputted into the phase comparator 210. The phase comparator 210 outputs as a received phase signal a value of a phase of the first received signal on the basis of the local carrier. Thus, at the time of t=iT, a value of the received phase signal becomes $\psi_{1,i}-\phi$ (subtraction being made modulo $2\pi$). The received phase signal is inputted into the delay element 220 with the delay time equal to the one-symbol duration T of the received signal and the subtracter 230 modulo $2\pi$. The delay element 220 outputs a phase signal delayed by the one-symbol duration. Therefore, at the time of t=iT, a value of the phase signal delayed by the one-symbol duration becomes $\psi_{1,i-1}-\phi$. The phase signal delayed by the one-symbol duration is inputted into the subtracter 230 modulo $2\pi$. The subtracter 230 subtracts modulo $2\pi$ the phase signal outputted from the delay element 220 and delayed by the one-symbol duration from the received phase signal outputted from the phase comparator 210, and outputs the result of subtraction as a one-symbol differential detection signal. Hence, when a value of the one-symbol differential detection signal at the time of t=iT is defined as $\Delta\psi_{(1)1,i}$, the following expression can be held (where subtraction being made modulo $2\pi$):

$$\Delta\psi_{(1)1,i} = (\psi_{1,i}-\phi) - (\psi_{1,i-1}-\phi) = \psi_{1,i}-\psi_{1,i-1} \tag{12}$$

That is, the one-symbol differential detection signal $\Delta\psi_{(1)1,i}$ expresses a variation in phase for the one-symbol duration of the first received signal, and takes a value equal to the transmitted differential phase $\Delta\theta_i$ without the effects due to noise, fading, and so forth. As set forth above, since a value of the transmitted differential phase $\Delta\theta_i$ is determined by the transmitted data, it is possible to estimate the transmitted data by using the value of the one-symbol differential detection signal $\Delta\psi_{(1)1,i}$.

The one-symbol differential detection signal $\Delta\psi_{(1)1,i}$ outputted from the subtracter 230 modulo $2\pi$ is inputted into the delay element 240A to have a delay equal to the one-symbol duration T of the received signal. Output of the delay element 240A is inputted into the adder 250A modulo $2\pi$. Further, the adder 250A modulo $2\pi$ takes as input the one-symbol differential detection signal $\Delta\psi_{(1)1,i}$ outputted from the subtracter 230 modulo $2\pi$. That is, the adder 250A modulo $2\pi$ adds modulo $2\pi$ the one-symbol differential detection signal $\Delta\psi_{(1)1,i}$ outputted from the subtracter 230 modulo $2\pi$ to the output of the delay element 240A. Therefore, when a value of output of the adder 250A modulo $2\pi$ at the time of t=iT is defined as $\Delta\psi_{(2)1,i}$, the following expression can be held (where addition and subtraction being made modulo $2\pi$):

$$\begin{aligned}\Delta\psi_{(2)1,i} &= \Delta\psi_{(1)1,i} + \Delta\psi_{(1)1,i-1} \\ &= (\psi_{1,i}-\psi_{1,i-1}) + (\psi_{1,i-1}-\psi_{1,i-2}) \\ &= \psi_{1,i}-\psi_{1,i-2}\end{aligned} \tag{13}$$

That is, the value $\Delta\psi_{(2)1,i}$ outputted from the adder 250A modulo $2\pi$ can serve as a two-symbol differential detection signal showing a variation in phase for a two-symbol duration of the first received signal.

On the other hand, the total of (N−1) delay elements 240A, 240B, . . . , 240N are connected in tandem, and the nth (n=2, . . . , N−1) delay element feeds a delay equal to the one-symbol duration T of the received signal to output of the (n−1)th delay element so as to output the result. Thus, at the time of t=iT, the nth (n=1, 2, . . . , N−1) delay element outputs a value $\Delta\psi_{(1)1,i-n}$.

Further, the total of (N−1) adders 250A, 250B, . . . , 250N modulo $2\pi$ are connected in tandem, and the nth (n=2, . . . , N−1) adder modulo $2\pi$ takes as input output of the (n−1)th adder modulo $2\pi$. Further, the total of (N−1) adders 250A, 250B, . . . , 250N modulo $2\pi$ take as input output of the total of (N−1) delay elements 240A, 240B, . . . , 240N. That is, in the nth (n=2, . . . , N−1) adder modulo $2\pi$, the output of the (n−1)th adder modulo $2\pi$ is added modulo $2\pi$ to the output of the nth delay element, and the result is outputted. Therefore, when a value of output of the nth (n=2, . . . , N−1) adder modulo $2\pi$ at the time of t=iT is defined as $\Delta\psi_{(n+1)1,i}$, the following expression can be held (where addition and subtraction being made modulo $2\pi$):

$$\Delta\psi_{(n+1)1,i} = \Delta\psi_{(n)1,i} + \Delta\psi_{(1)1,i-n} = \Delta\psi_{(n)1,i} + (\psi_{1,i-n}-\psi_{1,i-n-1}) \tag{14}$$

The expression is recurrence formula with respect to $\Delta\psi_{(n)1,i}$. It is possible to obtain the following expression by solving the formula (where addition and subtraction being made modulo $2\pi$):

$$\begin{aligned}\Delta\psi_{(n+1)1,i} &= \Delta\psi_{(2)1,i} + \sum_{j=2}^{n}(\psi_{1,i-j}-\psi_{1,i-j-1}) \\ &= \Delta\psi_{(2)1,i} + \psi_{1,i-2} - \psi_{1,i-n-1} \\ &= (\psi_{1,i}-\psi_{1,i-2}) + \psi_{1,i-2} - \psi_{1,i-n-1} \\ &= \psi_{1,i} - \psi_{1,i-(n+1)}\end{aligned} \tag{15}$$

That is, the value $\Delta\psi_{(n+1)1,i}$ outputted from the nth (n =2, . . . , N−1) adder modulo $2\pi$ can serve as an (n+1)-symbol differential detection signal showing a variation in phase for an (n+1)-symbol duration of the first received signal. Thus, it can be seen that the total of (N−1) adders 250A, 250B, . . . , 250N modulo 2π output 2, . . . , N-symbol differential detection signals. The total of (N−1) differential detection signals $\Delta\psi_{(2)1,i}$, . . . , $\Delta\psi_{(N)1,i}$ are combined with the one-symbol differential detection signal $\Delta\psi_{(1)1,i}$ outputted from the subtracter 230 modulo 2lπ into a first multiple differential detection signal $\Delta\psi_{1,i}=(\Delta\psi_{(1)1,i}, \Delta\psi_{(2)1,i}, \ldots, \Delta\psi_{(N)1,i})$. Further, the first received signal is inputted into the strength detecting circuit 260. The strength detecting circuit 260 outputs as first received signal strength the square of amplitude of the first received signal. That is, the first received signal strength is proportional to signal power of the first received signal. If a value of the first received signal strength at the time of t=iT is defined as $P_{1,i}$, the following expression can be held:

$$P_{1,i}=\gamma_{1,i}^2 \qquad (16)$$

The above signal processing generates the first multiple differential detection signal $\Delta\psi_{1,i}=(\Delta\psi_{(1)1,i}, \Delta\psi_{(2)1,i}, \ldots, \Delta\psi_{(N)1,i})$ and the first received signal strength $P_{1,i}$ which are outputted from the first multiple differential detection/signal strength detecting circuit 110A. Returning to FIG. 1, a description will be given of the embodiment.

According to the same signal processing as that in the first multiple differential detection/signal strength detecting circuit 110A, the second to Lth multiple differential detection/signal strength detecting circuits 110B, . . . , 110L generate and output the second to Lth multiple differential detection signals and received signal strength from the second to Lth received signals, and the local carrier outputted from the local oscillator 100. Thus, when values of the kth (k=2, . . . , L) multiple differential detection signal and received signal strength at the time of t=iT are defined as $\Delta\psi_{k,i}=(\Delta\psi_{(1)k,i}, \Delta\psi_{(2)k,i}, \Delta\psi_{(N)k,i})$ and $P_{k,i}$, the following expressions can be held with respect to $\Delta\psi_{(n)k,i}$ (n=1, 2, . . . , N) and $P_{k,i}$ (where subtraction being made modulo 2π):

$$\Delta\psi_{(n)k,i}=\psi_{k,i}-\psi_{k,i-n} \quad P_{k,i}=\gamma_{k,i}^2 \qquad (17)$$

The first, second to Lth multiple differential detection/signal strength detecting circuits 110A, 110B, . . . , 110L output the first, second to Lth multiple differential detection signals and received signal strength which are inputted into the sequence estimator 120.

The sequence estimator 120 is operated to estimate the transmitted differential phase sequence $\{\Delta\theta_i\}$ on the basis of the Viterbi algorithm by using the first, second to Lth multiple differential detection signals and received signal strength outputted from the first, second to Lth multiple differential detection/signal strength detecting circuits 110A, 110B, . . . , 110L, and outputs data corresponding to an estimated value as demodulated data. A schematic description will now be given of a system for estimation of the transmitted differential phase sequence $\{\Delta\theta_i\}$ by using the multiple differential detection signal.

A consideration is made to an n-symbol (n=1, 2, . . . , N) differential detection signal $\Delta\psi_{(n)1,i}$ serving as components of the first multiple differential detection signal $\Delta\psi_{1,i}=(\Delta\psi_{(1)1,i}, \Delta\psi_{(2)1,i}, \ldots, \Delta\psi_{(N)1,i})$. As set forth above, $\Delta\psi_{(n)1,i}$ can be obtained by the following expression depending upon a phase $\psi_{1,i}$ of the first received signal (where subtraction being made modulo 2π):

$$\Delta\psi_{(n)1,i}=\psi_{1,i}-\psi_{1,i-n} \qquad (18)$$

As set forth above, without the effects due to noise, fading, and so forth, the phase $\psi_{1,i}$ of the first received signal can be written by the following expression using the initial phase $\theta_o$ of the transmitted signal and the transmitted differential phase $\Delta\theta_i$ determined by the transmitted data (where addition being made modulo 2π):

$$\psi_{1,i}=\theta_0+\sum_{j=1}^{i}\Delta\theta_j \qquad (19)$$

Thus, without the effects due to noise, fading, and so forth, the following expression can be held with respect to the n-symbol (n=1, 2, . . . , N) differential detection signal $\Delta\psi_{(n)1,i}$ (where addition and subtraction being made modulo 2π):

$$\Delta\psi_{(n)1,i}=\left(\theta_0+\sum_{j=1}^{i}\Delta\theta_j\right)-\left(\theta_0+\sum_{j=1}^{i-n}\Delta\theta_j\right)=\sum_{j=0}^{n-1}\Delta\theta_{i-j} \qquad (20)$$

That is, in this case, the n-symbol (n=1, 2, . . . , N) differential detection signal $\Delta\psi_{(n)1,i}$ is equal to a value obtained by summing n successive elements of the transmitted differential phase sequence $\{\Delta\theta_i\}$. In other words, the n-symbol differential detection signal contains information about a subsequence including the n elements of the transmitted differential phase sequence $\{\Delta\theta_i\}$. By utilizing this characteristic, it is possible to estimate the transmitted differential phase sequence $\{\Delta\theta_i\}$.

That is, (N−1) successive elements of the transmitted differential phase sequence $\{\Delta\theta_i\}$ are combined to provide a state $(\Delta\theta_{i-(N-1)}, \Delta\theta_{i-(N-2)}, \ldots, \Delta\theta_{i-1})$. Since the elements $\Delta\theta_i$ can take any one value of M signal point phases $\alpha_0, \alpha_1, \ldots, \alpha_{M-1}$, the state inevitably agrees with any one of elements of a finite set including $M^{N-1}$ states formed by (N−1) combinations of the M signal point phases $\alpha_0, \alpha_1, \ldots, \alpha_{M-1}$. Thus, it is possible to define a trellis diagram showing state transitions between the $M^{N-1}$ states, and estimate the transmitted differential phase sequence $\{\Delta\theta_i\}$ through the Viterbi algorithm on the basis of the trellis diagram.

Figure 3:
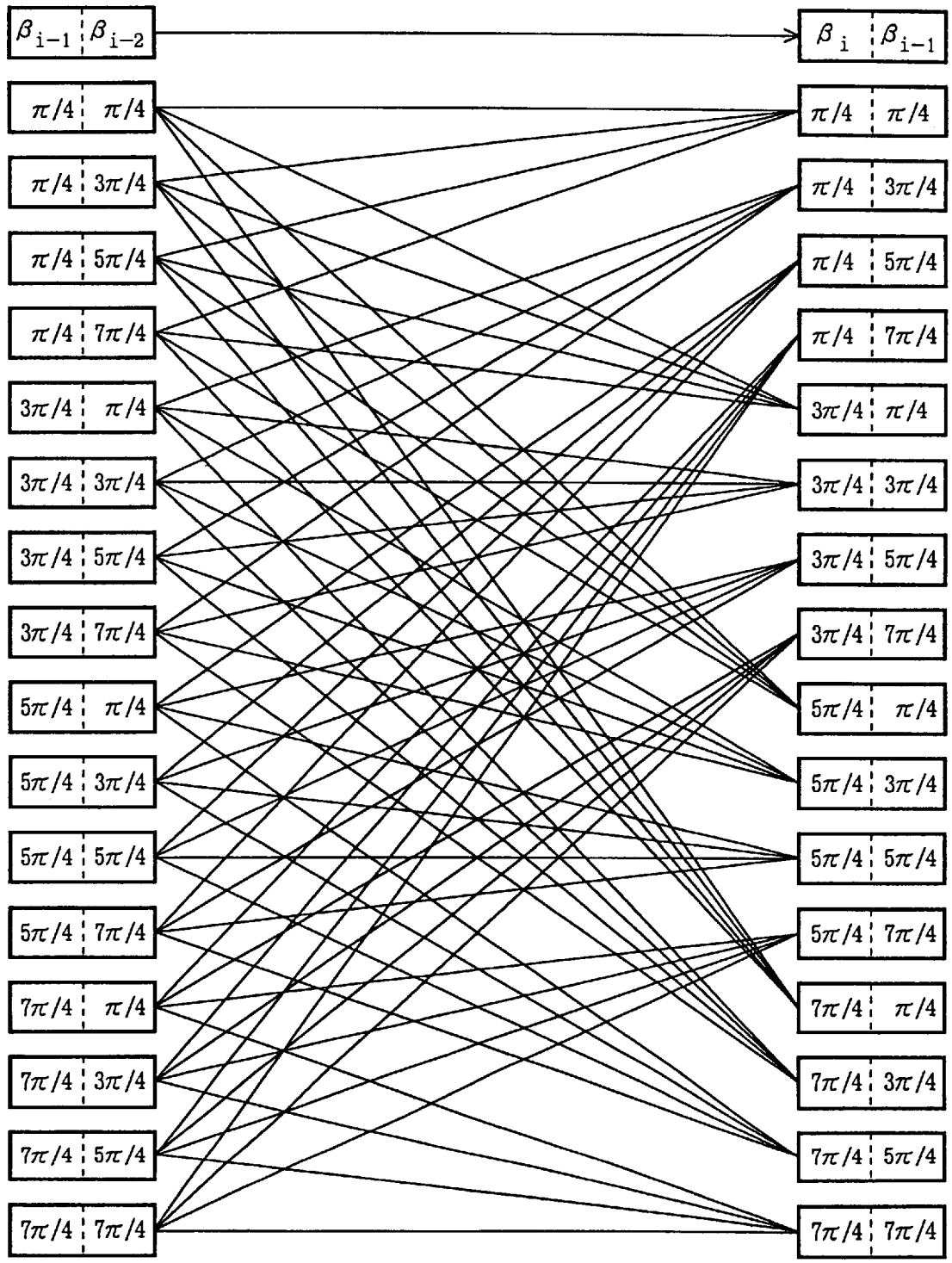
FIG. 3 is a diagram showing state transitions in a trellis diagram in case of N=3 in differential π/4 shift four-phase PSK (i.e., M=4)
Figure 4:
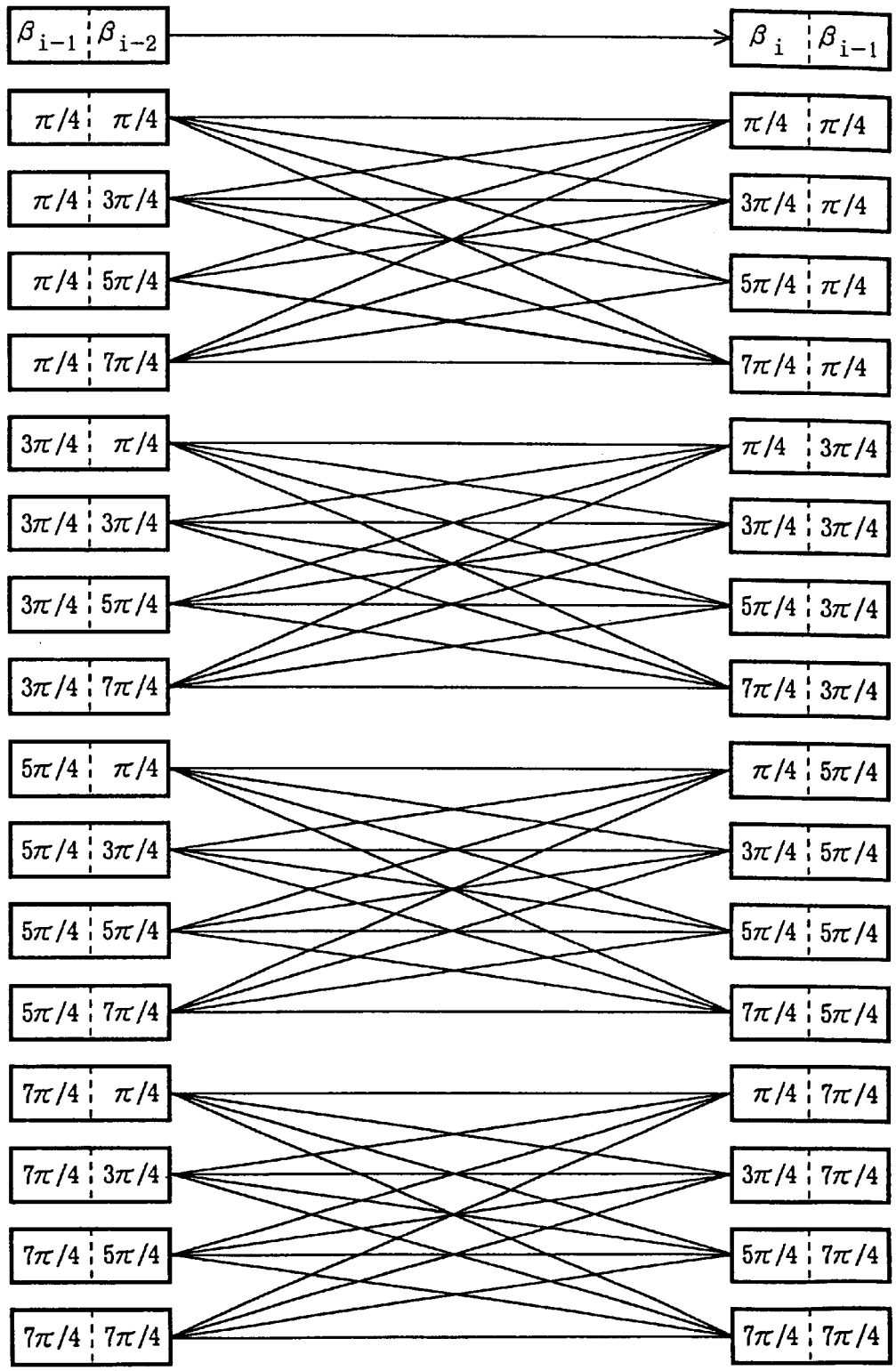
FIG. 4 is a diagram in which the state transitions in FIG. 3 are resolved into four basic combinations of the state transitions.

FIG. 3 is a diagram showing state transitions in a trellis diagram in case of N=3 in differential π/4 shift four-phase PSK (i.e., M=4). In this case, there are 16 states depending upon 2 (=N−1) combinations of four signal point phases $\alpha_0, \alpha_1, \alpha_2$, and $\alpha_3$ ($\alpha_m$=mπ/2+π/4; m =0, 1, 2, 3). The state transition exists between one state $(\beta_{i-2}, \beta_{i-1})$ and the next state $(\beta_{i-1}, \beta_i)$ $(\beta_{i-j} \in \{\alpha_0, \epsilon_1, \alpha_2, \alpha_3\}; j=0, 1, 2)$. Therefore, it is possible to obtain four state transitions shown in FIG. 4 by resolving FIG. 3.

In general, there are state transitions from one state $B_{i-1}=(\beta_{i-(N-1)}, \beta_{i-(N-2)}, \ldots, \beta_{i-1})$ to the next state $B_i=(\beta_{i-(N-2)}, \beta_{i-(N-3)}, \ldots, \beta_i)$ $(\beta_{i-j} \in \{\alpha_0, \alpha_1, \ldots, \alpha_{M-1}\}; j=0, 1, \ldots, N-1)$. Hence, on the trellis diagram, the respective states have M inflow and outflow branches. The state transition from the state $B_{i-1}=(\beta_{i-(N-1)}, \beta_{i-(N-2)}, \ldots, \beta_{i-1})$ to the next state $B_i=(\beta_{i-(N-2)}, \beta_{i-(N-3)}, \ldots, \beta_i)$ means that a subsequence including N successive elements of the transmitted differential phase sequence $\{\Delta\theta_i\}$ is $\{\beta_{i-(N-1)}, \beta_{i-(N-2)}, \ldots, \beta_i\}$. Therefore, it is possible to suppose replicas of 1, 2, . . . , N-symbol differential detection signals with respect to the state transition. That is, when a value of the replica of an n-symbol (n=1, 2, . . . , N) differential detection signal corresponding to the state transition is expressed as $\Delta\theta_{(n)}\{B_{i-1}, B_i\}$, the following expression can be held (where addition being made modulo 2π):

$$\Delta\theta_{(n)}(B_{i-1}, B_i) = \sum_{j=0}^{n-1} \beta_{i-j} \quad (21)$$

Hence, probability of generation of the state transition from the state $B_{i-1}$ to the state $B_i$ can be shown by the sum of absolute values of differences between the 1, 2, . . . , N-symbol differential detection signals $\Delta\psi_{(1)1,i}$, $\Delta\psi_{(2)1,i}$, . . . , $\Delta\psi_{(N)1,i}$, and the replicas $\Delta\theta_{(1)}\{B_{i,1}, B_i\}$, $\Delta\theta_{(2)}\{B_{i-1}B_i\}$, . . . , $\Delta\theta_{(N)}\{B_{i-1}, B_i\}$ of the 1, 2, . . . , N-symbol differential detection signals. Thus, it is possible to estimate the transmitted differential phase sequence $\{\Delta\theta_i\}$ by carrying out the Viterbi algorithm by using the value as a branch metric value of a branch in the trellis diagram corresponding to the state transition from the state $B_{i-1}$ to the state $B_i$.

Further, as set forth above, the 1, 2, . . . , N-symbol differential detection signals $\Delta\psi_{(1)1,i}, \Delta\psi_{(2)1,i}, \ldots, \Delta\psi_{(N)1,i}$, are differences between the current phase $\psi_{1,i}$ of the first received signal and phases $\psi_{1,i-1}, \psi_{1,i-2}, \ldots, \psi_{1,i-N}$ preceding by 1, 2, . . . , N-symbol durations. However, the phases $\psi_{1,i-1}, \psi_{1,i-2}, \ldots, \psi_{1,i-N}$ are typically affected by independent noises. Consequently, the 1, 2, . . . , N-symbol differential detection signals $\Delta\psi_{(1)1,i}, \Delta\psi_{(2)1,i}, \ldots, \Delta\psi_{(N)1,i}$ are differently affected by the noises. When the branch metric is calculated by using the 1, 2, . . . , N-symbol differential detection signals, an SNR is enhanced because an effect of averaging the noise is caused in the process of the calculation for the branch metric. Hence, when the transmitted differential phase sequence $\{\Delta\theta_i\}$ is estimated by using the branch metric through the Viterbi algorithm, it is possible to enhance estimation accuracy more so than would be in a case where only the one-symbol differential detection signal is used as in the prior art. As a result, it is possible to improve a bit error rate performance of the demodulated data on the basis of the estimated value of the transmitted differential phase sequence.

Though the invention has been described by way of the first multiple differential detection signal $\Delta\psi_{1,i}=(\Delta\psi_{(1)1,i}, \Delta\psi_{(2)1,i}, \ldots, \Delta\psi_{(N)1,i})$ as an example, the same holds true for the second to Lth multiple differential detection signals $\Delta\psi_{2,i}, \ldots, \Delta\psi_{L,i}$.

In the present invention, the calculation is made to find the first, second to Lth branch metrics by using the first, second to Lth multiple differential detection signals, and a weighted combining is made to the branch metrics according to the received signal strength. Further, the Viterbi algorithm is carried out by using the combined metrics to estimate the transmitted differential phase sequence $\{\Delta\theta_i\}$, and the demodulated data corresponding to the estimated value is outputted. In such a manner, a diversity effect can be obtained by using the branch metric to which the weighted combining is made according to the received signal strength. In addition, the transmitted differential phase sequence $\{\Delta\theta_i\}$ is estimated by using the branch metric which is generated from the multiple differential detection signal. Because of the above facts, it is possible to more enhance the bit error rate performance than would be in a prior art apparatus using only the one-symbol differential detection signal.

Figure 5:
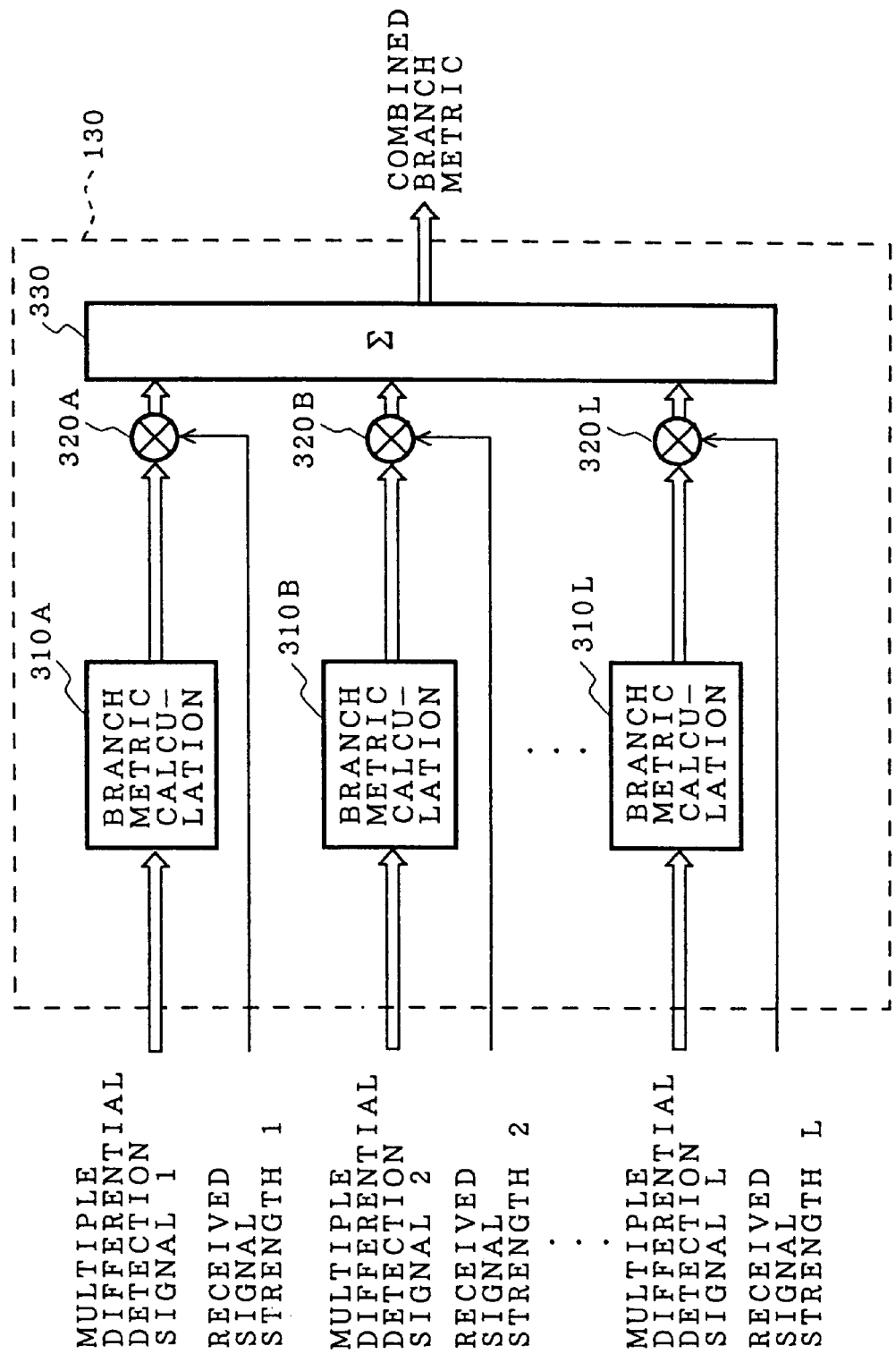
FIG. 5 is a block diagram showing one embodiment of a combined branch metric generating circuit in the diversity receiver of the present invention.

Returning to FIG. 1, a description will be given of the operation of the embodiment. In FIG. 1, the combined branch metric generating circuit 130 takes as input the first, second to Lth multiple differential detection signals and received signal strength inputted into the sequence estimator 120 and outputted from the first, second to Lth multiple differential detection/signal strength detecting circuits 110A, 110B, . . . , 110L. Referring to FIG. 5, a description will now be given of the structure and the operation of the combined branch metric generating circuit 130.

FIG. 5 is a block diagram showing one embodiment of the combined branch metric generating circuit 130. In the drawing; reference numerals 310A, 310B, . . . , 310L denote first, second to Lth branch metric calculating circuits, 320A, 320B, . . . , 320L are first, second to Lth multipliers, and 330 is a combining circuit.

A description will now be given of the operation. The first, second to Lth multiple differential detection signals inputted into the combined branch metric generating circuit 130 are respectively inputted into the first, second to Lth branch metric calculating circuits 310A, 310B, . . . , 310L. The first, second to Lth branch metric calculating circuits 310A, 310B, . . . , 310L are operated for the same processing of the first, second to Lth multiple differential detection signals. Hence, a description will be given of only the operation of the first branch metric calculating circuit 310A.

The first branch metric calculating circuit 310A calculates and outputs branch metric values corresponding to all the state transitions on the trellis diagram depending upon the first multiple differential detection signal $\Delta\psi_{1,i}=(\Delta\psi_{(1)1,i}, \Delta\psi_{(2)1,i}, \ldots, \Delta\psi_{(N)1,i})$. As set forth above, the trellis diagram consists of the $M^{N-1}$ states, and each of the states has the M inflow and outflow branches, resulting in totaling the $M^N$ branches. Thus, the total number of state transitions is $M^N$. As described above, the branch metric of the branch corresponding to the state transition from the state $B_{i-1}=(\beta_{i-(N-1)}, \beta_{i-(N-2)}, \ldots, \beta_{i-1})$ to the state $B_i=(\beta_{i-(N-2)}, \beta_{i-(N-3)}, \ldots, \beta_i)$ ($\beta_{i-j} \in \{\alpha_0, \alpha_1, \ldots, \alpha_{M-1}\}$; j=0, 1, . . . , N-1) can be given by the sum of the absolute values of the differences between the 1, 2, . . . , N-symbol differential detection signals $\Delta\psi_{(1)1,i}, \Delta\psi_{(2)1,i}, \ldots, \Delta\psi_{(N)1,i}$, and the replicas $\Delta\theta_{(1)}\{B_{i-1}, B_i\}, \Delta\theta_{(2)}\{B_{i-1}, B_i\}, \ldots, \Delta\theta_{(N)}\{B_{i-1}, B_i\}$ of the 1, 2, . . . , N-symbol differential detection signals. Here, as stated above, the value $\Delta\theta_{(n)}\{B_{i-1}, B_i\}$ of the replica of the n-symbol (n=1, 2, . . . , N) differential detection signal can be given by the following expression (where addition being made modulo $2\pi$):

$$\Delta\theta_{(n)}\{B_{i-1}, B_i\} = \sum_{j=0}^{n-1} \beta_{i-j} \quad (22)$$

Consequently, when the branch metric value of the branch corresponding to the state transition from the state $B_{i-1}$ to the state $B_i$ is expressed as $\lambda_{1,i}\{B_{i-1}, B_i\}$, the following expression can be held (where addition and subtraction within absolute value notations being made modulo $2\pi$, and the results of addition and subtraction being of $-\pi$ or more and less than $\pi$):

$$\lambda_{1,i}\{B_{i-1}, B_i\} = \quad (23)$$

$$\sum_{n=1}^{N} |\Delta\psi_{(n)1,i} - \Delta\theta_{(n)}\{B_{i-1}, B_i\}| = \sum_{n=1}^{N} \left| \Delta\psi_{(n)1,i} - \sum_{j=0}^{n-1} \beta_{i-j} \right|$$

The first branch metric calculating circuit 310A calculates all the branch metric values corresponding to the $M^N$ kinds of state transitions on the basis of the expression from the first multiple differential detection signal $\Delta\psi_{1,i}=(\Delta\psi_{(1)1,i}, \Delta\psi_{(2)1,i}, \ldots, \Delta\psi_{(N)1,i})$, and combines and outputs the results as a first branch metric.

According to the same signal processing as that in the first branch metric calculating circuit 310A, the second to Lth branch metric calculating circuits 310B, . . . , 310L respectively calculate all branch metric values corresponding to the $M^N$ kinds of state transitions from the second to Lth multiple differential detection signals $\Delta\psi_{2,i}, \ldots, \Delta\psi_{L,i}$, and combine and output the results as second to Lth branch metrics. Consequently, when, in a kth (k=2, . . . , L) branch metric, the branch metric value of the branch corresponding to the state transition from the state $B_{i-1}$ to the state $B_i$ is expressed as $\lambda_{k,i}\{B_{i-1}, B_i\}$, the following expression can be held (where addition and subtraction within absolute value notations being made modulo $2\pi$, and the results of addition and subtraction being of $-\pi$ or more and less than $\pi$):

$$\lambda_{k,i}\{B_{i-1}, B_i\} = \sum_{n=1}^{N} |\Delta\psi_{(n)k,i} - \Delta\theta_{(n)}\{B_{i-1}, B_i\}| = \sum_{n=1}^{N} \left|\Delta\psi_{(n)k,i} - \sum_{j=0}^{n-1} \beta_{i-j}\right| \quad (24)$$

Further, as in a likelihood signal in the prior art apparatus, it is shown that the probability becomes higher as the branch metric values become smaller.

The first, second to Lth branch metric calculating circuits 310A, 310B, . . . , 310L output the first, second to Lth branch metrics which are respectively inputted into the first, second to Lth multipliers 320A, 320B, . . . , 320L. Further, the first, second to Lth multiple differential detection/signal strength detecting circuits 110A, 110B, . . . , 110L output the first, second to Lth received signal strength $P_{1,i}, P_{2,i}, \ldots, P_{L,i}$ which are similarly inputted into the first, second to Lth multipliers 320A, 320B, . . . , 320L to be multiplied by the first, second to Lth branch metrics. Thereby, the first, second to Lth branch metrics can be weighted with the first, second to Lth received signal strength as weighting factors. That is, output of the multipliers 320A, 320B, . . . , 320L are the first, second to Lth branch metrics weighted by the first, second to Lth received signal strength. The output of the multipliers 320A, 320B, . . . , 320L are respectively inputted into the combining circuit 330.

The combining circuit 330 finds the sum of branch metric values corresponding to the same state transition among the output of the first, second to Lth multipliers 320A, 320B, . . . , 320L, i.e., the first, second to Lth branch metrics respectively weighted by the first, second to Lth received signal strength. Therefore, the summation operation is executed $M^N$ times according to the total number of state transitions. The combining circuit 330 combines the results of the $M^N$ kinds of summations to output the combined result as a combined branch metric serving as output of the combined branch metric generating circuit 130. Thus, when, in the combined branch metrics, a metric value of a branch corresponding to a state transition from the state $B_{i-1}=(\beta_{i-(N-1)}, \beta_{i-(N-2)}, \ldots, \beta_{i-1})$ to the state $B_i=(\beta_{i-(N-2)}, \beta_{i-(N-3)}, \ldots, \beta_i)$ is expressed as $\Lambda_i\{B_{i-1}, B_i\}$, the following expression can be held (where addition and subtraction within absolute value notations being made modulo $2\pi$, and the results of addition and subtraction being of $-\pi$ or more and less than $\pi$):

$$\Lambda_i\{B_{i-1}, B_i\} = \sum_{k=1}^{L} P_{k,i}\lambda_{k,i}\{B_{i-1}, B_i\} = \sum_{k=1}^{L} P_{k,i} \sum_{n=1}^{N} \left|\Delta\psi_{(n)k,i} - \sum_{j=0}^{n-1} \beta_{i-j}\right| \quad (25)$$

As set forth above, it is shown that the probability becomes higher as the branch metric values $\lambda_{k,i}\{B_{i-1}, B_i\}$ (k =1, 2, . . . , L) become smaller. Thus, it is also shown that the probability becomes higher as the combined branch metric value $\Lambda_i\{B_{i-1}, B_i\}$ becomes smaller.

In such a manner, the combined branch metric generating circuit 130 in the sequence estimator 120 generates and outputs the combined branch metric from the first, second to Lth multiple differential detection signals and received signal strength outputted from the first, second to Lth multiple differential detection/signal strength detecting circuits 110A, 110B, . . . , 110L. Returning to FIG. 1, a description will be given of the operation of the embodiment.

In FIG. 1, the sequence estimator 120 carries out the Viterbi algorithm by using the combined branch metric generated by the combined branch metric generating circuit 130 as a branch metric, and estimates the transmitted differential phase sequence $\{\Delta\theta_i\}$ so as to output demodulated data corresponding to the estimated value. As described above, in the combined branch metric generating circuit 130, the calculation is made to find the first, second to Lth branch metrics by using the first, second to Lth multiple differential detection signals, and the branch metrics are weighted according to the received signal strength to generate the combined branch metric. In such a manner, a diversity effect can be obtained by using the combined branch metric to which the weighted combining is made according to the received signal strength. In addition, the transmitted differential phase sequence is estimated by using the branch metric which is generated from the multiple differential detection signal. Consequently, as stated above, it is possible to enhance the SNR in the process of generation of the branch metric, and more improve the bit error rate performance than would be in the prior art apparatus using only the one-symbol differential detection signal.

As can be seen from the above discussion, the essential parts of the present invention can be summarized in the following two points: (1) the calculation is made to find the first, second to Lth branch metrics by using the first, second to Lth multiple differential detection signals, and the combined branch metric is generated by weighting the branch metrics according to the received signal strength; and (2) the Viterbi algorithm is carried out by using the generated combined branch metric as the branch metric to estimate the transmitted differential phase sequence so as to output the demodulated data corresponding to the estimated value. On the other hand, the Viterbi algorithm itself applied to the present invention is generally known, and has no inventiveness. Hence, only a schematic description will now be given of the operation of the component parts for the Viterbi algorithm in the steps after the step of the combined branch metric generating circuit 130 in the sequence estimator 120.

In the sequence estimator 120 of FIG. 1, the combined branch metric generated in the combined branch metric generating circuit 130 is inputted into the ACS circuit 140. The ACS circuit 140 executes the ACS operation on the basis of the Viterbi algorithm by using the inputted combined branch metric to select $M^{N-1}$ surviving paths corresponding to each state, and update the path metric. Subsequently, the ACS circuit 140 outputs the results of the ACS operation, i.e., $M^{N-1}$ path selecting signals showing connection of the surviving paths to the path memory 150, and outputs the $M^{N-1}$ updated path metrics to the maximum likelihood state detecting circuit 160. The path memory 150 sequentially takes as input the $M^{N-1}$ path selecting signals outputted from the ACS circuit 140 to update the memory contents corresponding to each state, and output the oldest memory contents to the decision circuit 170. The maximum likelihood state detecting circuit 160 detects the maximum likelihood state by using the $M^{N-1}$ path metrics outputted from the ACS circuit 140. As set forth above, it is shown that the probability becomes higher as the combined branch metric value becomes smaller. Hence, it is also shown that the probability becomes higher as the path metric value becomes smaller. The maximum likelihood state detecting circuit 160 detects a state having the minimum path metric, and outputs the state as the most probable state to the decision circuit 170. The decision circuit 170 defines, among the $M^{N-1}$ oldest memory contents outputted from the path memory 150, the contents corresponding to the surviving path leading to the most probable state detected by the maximum likelihood state detecting circuit 160 as an estimated value of the transmitted differential phase, and outputs data corresponding to the estimated value as the demodulated data.

As set forth above, in the embodiment, (1) the calculation is made to find the first, second to Lth branch metrics by using the first, second to Lth multiple differential detection signals, and the combined branch metric is generated by weighting the branch metrics according to the received signal strength; and (2) the Viterbi algorithm is carried out by using the generated combined branch metric as the branch metric to estimate the transmitted differential phase sequence so as to provide the demodulated data corresponding to the estimated value. The diversity effect can be obtained by using the combined branch metric to which the weighted combining is made according to the received signal strength. In addition, the transmitted differential phase sequence is estimated by using the branch metric which is generated from the multiple differential detection signal. As stated above, it is thereby possible to enhance the SNR in the process of generation of the branch metric, and more improve the bit error rate performance than would be in the prior art apparatus using only the one-symbol differential detection signal. In the following discussion, an effect of improving the bit error rate performance is shown according to the result of computer simulation.

Figure 6:
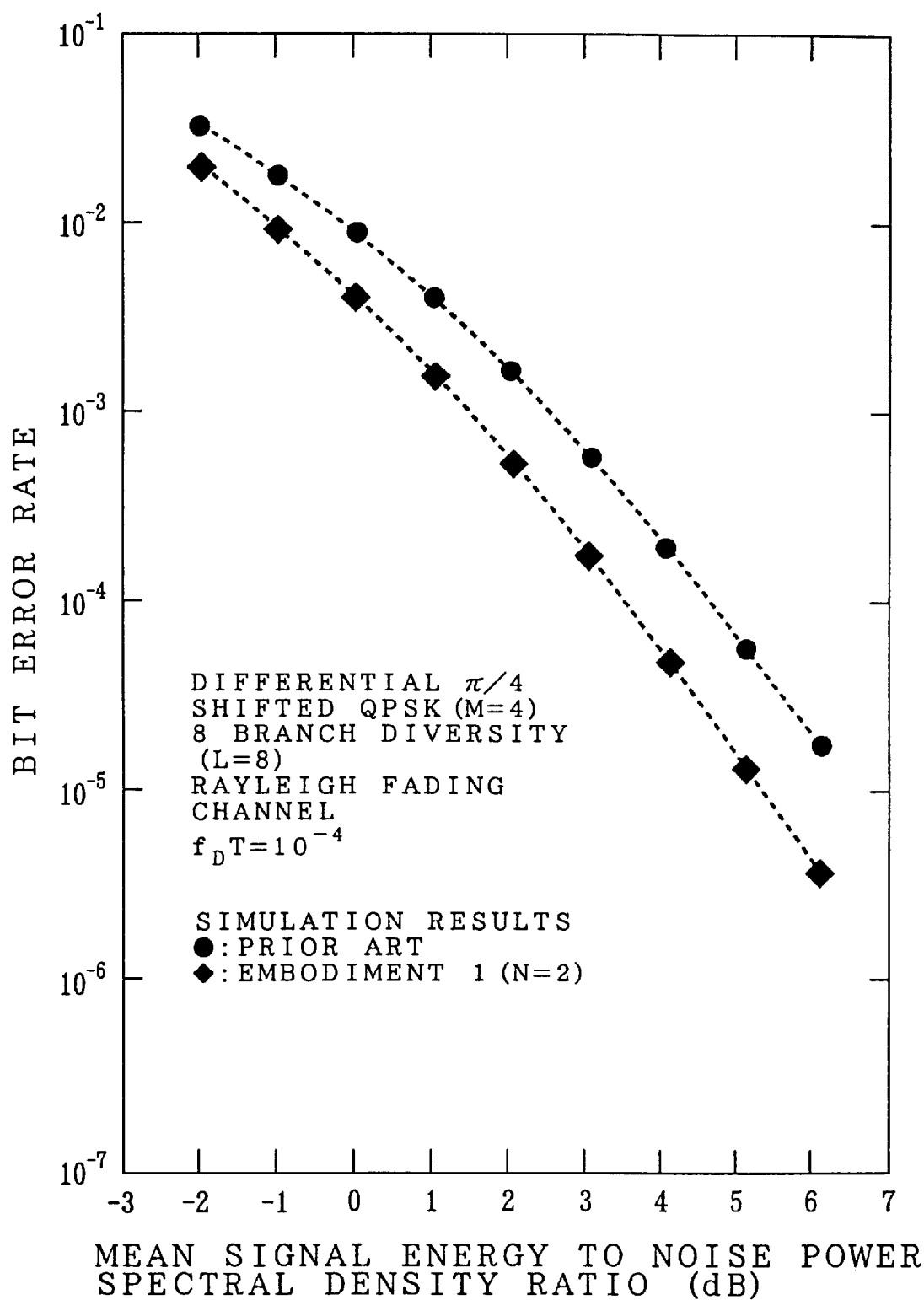
FIG. 6 is a characteristic diagram showing bit error rate performances in diversity receivers according to the prior art and the embodiment 1 depending upon computer simulation.

FIG. 6 is a characteristic diagram showing bit error rate performances in diversity receivers according to the prior art and the embodiment 1 depending upon the computer simulation. FIG. 6 is under simulation conditions where a modulation scheme is differential π/4 shift four-phase PSK (that is, M=4), and the number of diversity branches is defined as L=8. Further, a channel is a Rayleigh fading channel in which variations in fading between the branches are mutually set with no correlation, and the product of the maximum Doppler frequency $f_D$ and the symbol duration T, serving as a index of a speed of the variation in fading, is defined as $f_D T=10^{-4}$. In FIG. 6, the abscissa shows a mean signal energy to noise power spectral density ratio in the received signal per branch in decibels, and the ordinate shows the bit error rate. Further, in FIG. 6, simulation results of the prior art are shown by "●", and simulation results of the embodiment 1 are shown by "◆". In the simulation of the embodiment 1, a constant N is defined as N =2.

FIG. 6 shows that, in the embodiment 1, the same bit error rate as that in the prior art can be achieved with a lower mean signal energy to noise power spectral density ratio than that in the prior art. That is, from FIG. 6, it becomes apparent that the bit error rate performance is more enhanced in the embodiment 1 than would be in the prior art. Thus, according to the present invention, it is possible to provide a more excellent bit error rate performance in the Rayleigh fading channel than that in the prior art diversity receiver.

Figure 7:
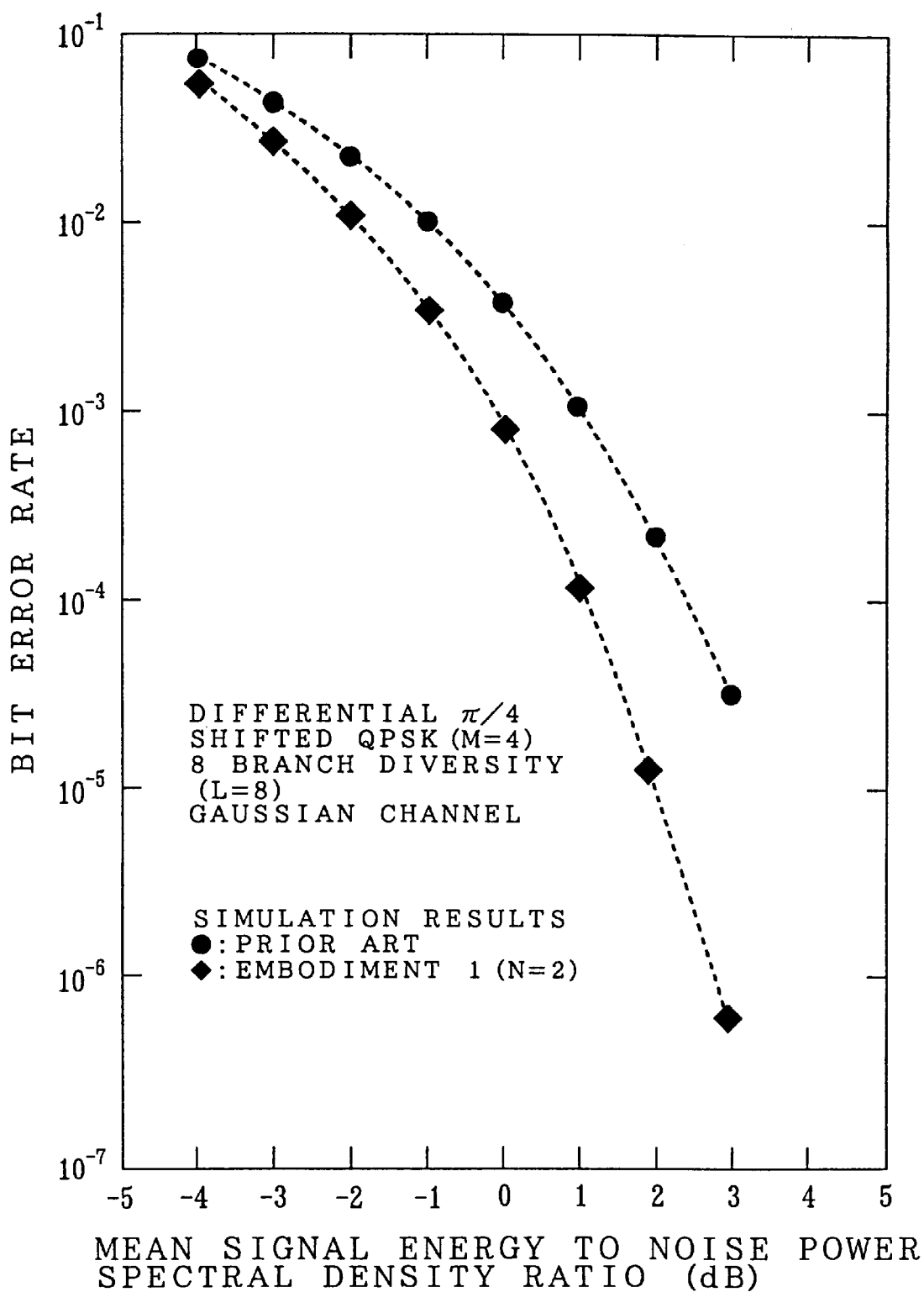
FIG. 7 is a characteristic diagram showing bit error rate performances in diversity receivers according to the prior art and the embodiment 1 depending upon computer simulation.

FIG. 7 is a characteristic diagram showing bit error rate performances in diversity receivers according to the prior art and the embodiment 1 depending upon the computer simulation as in FIG. 6. Simulation conditions in FIG. 7 are identical with those in FIG. 6 except that a channel is a Gaussian channel including only additive white Gaussian noises. It can also be seen in FIG. 7 that the bit error rate performance is more enhanced in the embodiment 1 than would be in the prior art. Thus, according to the present invention, it is possible to provide a more excellent bit error rate performance even in the Gaussian channel than that in the prior art diversity receiver.

Though the constant N is defined as N=2 in the embodiment 1 in FIGS. 6 and 7, in general, an effect of averaging of noise more increases in the process of calculation for the branch metric as described above as the value N becomes higher, thereby more enhancing the SNR. It is thereby possible to more improve the bit error rate performance.

Embodiment 2

In the embodiment 1, the first, second to Lth multiple differential detection/signal strength detecting circuits 110A, 110B, . . . , 110L output the squares of the amplitude of the first, second to Lth received signals as the first, second to Lth received signal strength. However, the first, second to Lth multiple differential detection/signal strength detecting circuits 110A, 110B, . . . , 110L may output the uth (u: real number of zero or more) powers of the amplitude of the first, second to Lth received signals as the first, second to Lth received signal strength.

Embodiment 3

The embodiment 1 has been described with reference to a case where the received signal is modulated through the differential M-phase PSK or the differential π/M shift M-phase PSK. However, it is sufficient that the received signal is modulated through a modulation scheme which can employ a differential detection scheme. For example, the received signal may be modulated through minimum shift keying (MSK).

Embodiment 4

Figure 8:
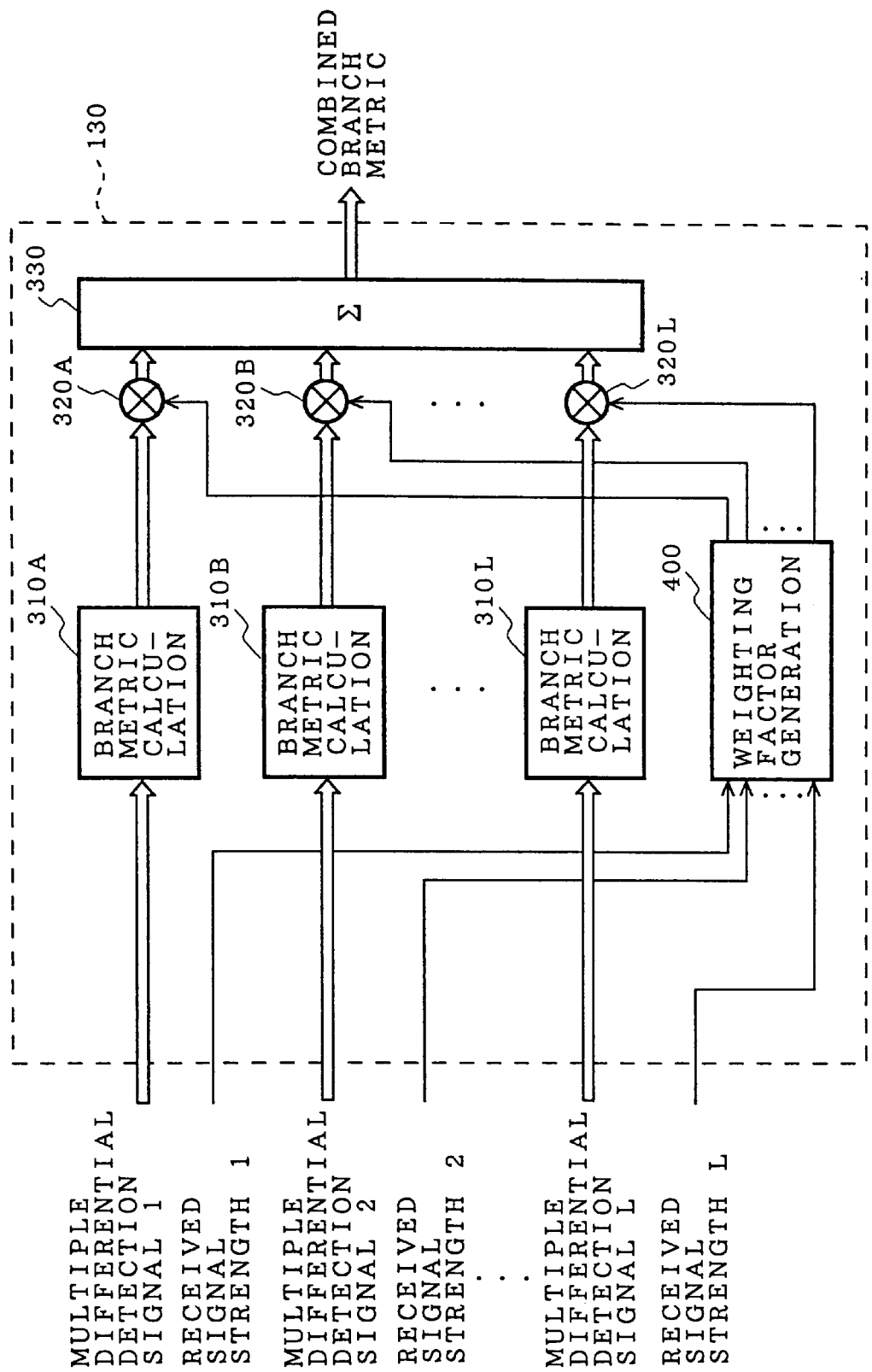
FIG. 8 is a block diagram showing another embodiment of the combined branch metric generating circuit of the diversity receiver of the present invention.

In the embodiment 1, the combined branch metric generating circuit 130 performs the weighted combining by directly using the inputted received signal strength as the weighting factors for the branch metrics. However, the result of normalization in which the respective received signal strength are divided by the maximum value among the received signal strength may be used as the weighting factor. FIG. 8 is a block diagram showing a structure of a combined branch metric generating circuit 130 for the above normalization in a diversity receiver. In the drawing, reference numeral 400 denotes a weighting factor generating circuit. The same reference numerals are used for component parts identical with or equivalent to those in FIG. 5 showing the combined branch metric generating circuit 130 of the diversity receiver according to the embodiment 1, and descriptions thereof are omitted.

A description will now be given of the operation. In FIG. 8, first, second to Lth multiple differential detection signals inputted into the combined branch metric generating circuit 130 are respectively inputted into first, second to Lth branch metric calculating circuits 310A, 310B, . . . , 310L, thereby calculating a branch metric as in the embodiment 1. On the other hand, first, second to Lth received signal strength $P_{1,i}$, $P_{2,i}$ . . . , $P_{L,i}$ inputted into the combined branch metric generating circuit 130 are similarly inputted into the weighting factor generating circuit 400.

Figure 9:
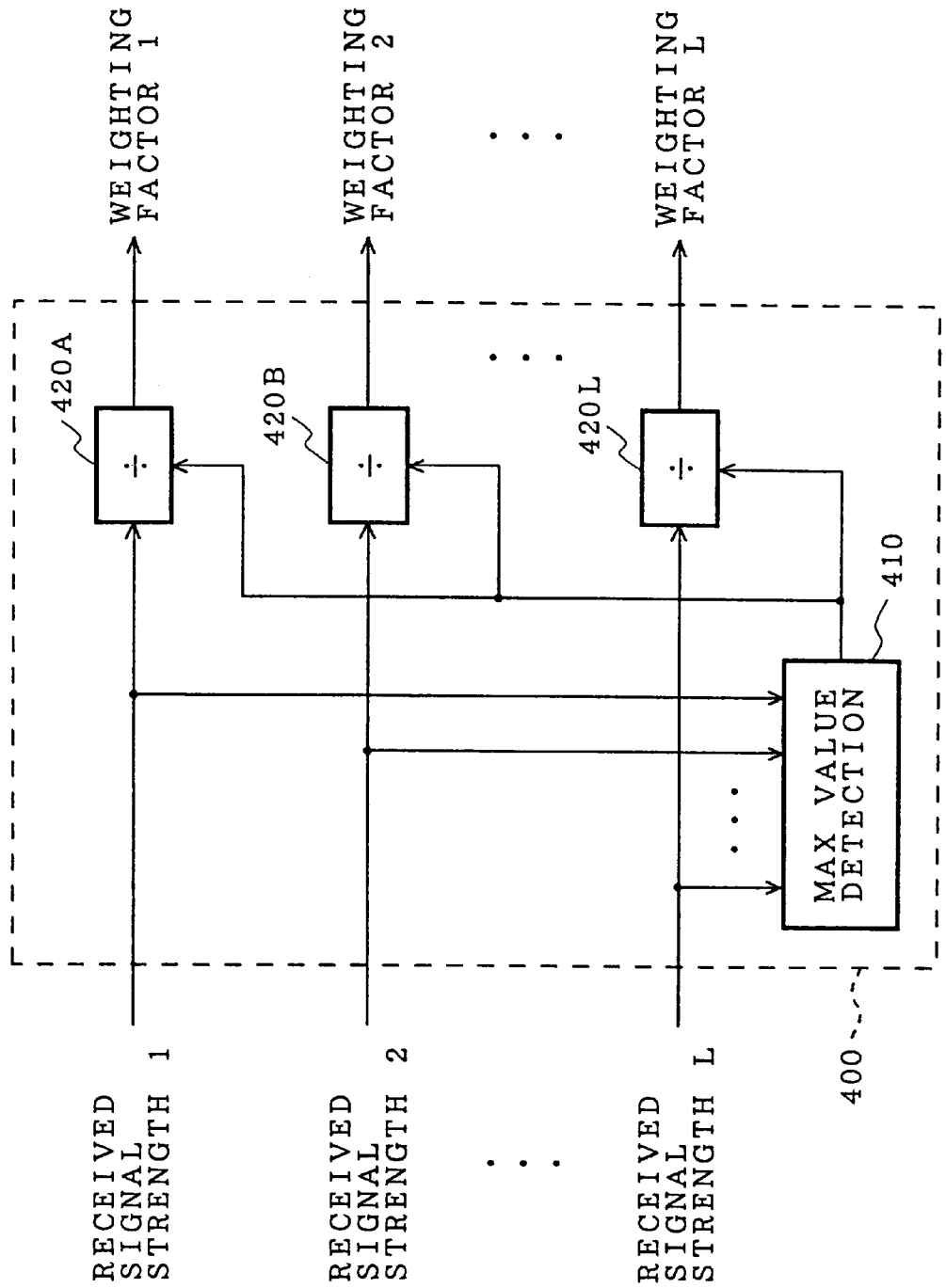
FIG. 9 is a block diagram showing one embodiment of a weighting factor generating circuit of the diversity receiver of the present invention.

FIG. 9 is a block diagram showing a structure of the weighting factor generating circuit 400. In the drawing, reference numeral 410 denotes a maximum value detecting circuit, and 420A, 420B, . . . , and 420L are first, second to Lth dividers. In FIG. 9, the first, second to Lth received signal strength $P_{1,i}$, $P_{2,i}$, . . . , $P_{L,i}$ inputted into the weighting factor generating circuit 400 are inputted into the maximum value detecting circuit 410. The maximum value detecting circuit 410 selects and outputs the maximum value among the inputted first, second to Lth received signal strength $P_{1,i}$, $P_{2,i}$, ..., $P_{L,i}$ as the maximum signal strength. That is, when a value of the maximum signal strength at a time of t=iT is expressed as $\rho_i$, $\rho_i$ can be given by the following expression (where max{·} meaning the maximum value):

$$\rho_i = \text{MaX}\{P_{1,i}, P_{2,i}, \ldots, P_{L,i}\} \quad (26)$$

On the other hand, the first, second to Lth received signal strength $P_{1,i}$, $P_{2,i}$, ..., $P_{L,i}$ are also inputted into the first, second to Lth dividers 420A, 420B, ..., 420L. The first, second to Lth dividers 420A, 420B, ..., 420L take as input the maximum signal strength $\rho_i$ outputted from the maximum value detecting circuit 410, thereby respectively dividing the first, second to Lth received signal strength $P_{1,i}$, $P_{2,i}$, ..., $P_{L,i}$ by the maximum signal strength $\rho_i$. The first, second to Lth dividers 420A, 420B, ..., 420L output the results of division as first, second to Lth weighting factors serving as output of the weighting factor generating circuit 400. Here, when a value of a kth (k=1, ..., L) weighting factor at the time of t=iT is defined as $W_{k,i}$, $W_{k,i}$ can be given by the following expression:

$$W_{k,i} = P_{k,i}/\rho_i \quad (27)$$

It is apparent that the first, second to Lth weighting factors $W_{1,i}$, $W_{2,i}$, ..., $W_{L,i}$ are in the same ratio as that of the first, second to Lth received signal strength $P_{1,i}$, $P_{2,i}$, ..., $P_{L,i}$. Further, it is apparent that the first, second to Lth weighting factors $W_{1,i}$, $W_{2,i}$, ..., $W_{L,i}$ are limited to 1 or less. Returning to FIG. 8, a description will be given of the operation of the combined branch metric generating circuit 130 according to the embodiment.

In FIG. 8, first, second to Lth branch metrics outputted from the first, second to Lth branch metric calculating circuits 310A, 310B, ..., 310L are respectively inputted into first, second to Lth multipliers 320A, 320B, ..., 320L. Further, the first, second to Lth weighting factors $W_{1,i}$, $W_{2,i}$, ..., $W_{L,i}$ serving as output of the weighting factor generating circuit 400 are inputted into the first, second to Lth multipliers 320A, 320B, ..., 320L to be respectively multiplied by the first, second to Lth branch metrics. Thus, output of the first, second to Lth multipliers 320A, 320B, ..., 320L are first, second to Lth branch metrics weighted by the first, second to Lth weighting factors $W_{1,i}$, $W_{2,i}$, ..., $W_{L,i}$. The output of the multipliers 320A, 320B, ..., 320L are respectively inputted into a combining circuit 330.

The combining circuit 330 computes the sum of values corresponding to the same state transition among the output of the first, second to Lth multipliers 320A, 320B, ..., 320L, i.e., the first, second to Lth branch metrics respectively weighted by the first, second to Lth weighting factors. Therefore, the summation operation is executed $M^N$ times according to the total number of state transitions. The combining circuit 330 combines the results of the $M^N$ kinds of summations to output the combined result as a combined branch metric serving as output of the combined branch metric generating circuit 130. Thus, in the combined branch metric, a metric value $\Lambda_i\{B_{i-1}, B_i\}$ of a branch corresponding to a state transition from a state $B_{i-1}=(\beta_{i-(N-1)}, \beta_{i-(N-2)}, \ldots, \beta_{i-1})$ to a state $B_i=(\beta_{i-(N-2)}, \beta_{i-(N-3)}, \ldots, \beta_i)$ can be given by the following expression (where addition and subtraction within absolute value notations being made modulo $2\pi$, and the results of addition and subtraction being of $-\pi$ or more and less than $\pi$):

$$\Lambda_i\{B_{i-1}, B_i\} = \quad (28)$$

$$\sum_{k=1}^{L} W_{k,i}\lambda_{k,i}\{B_{i-1}, B_i\} = \sum_{k=1}^{L} W_{k,i} \sum_{n=1}^{N} \left| \Delta\psi_{(n)k,i} - \sum_{j=0}^{n-1} \beta_{i-j} \right|$$

As set forth above, the first, second to Lth weighting factors $W_{1,i}$, $W_{2,i}$, ..., $W_{L,i}$ are in the same ratio as that of the first, second to Lth received signal strength $P_{1,i}$, $P_{2,i}$, ..., $P_{L,i}$. Thus, the combined branch metric generating circuit 130 in the embodiment can generate the combined branch metric to which the weighted combining is made equivalent to that in the embodiment 1. Thus, by using the combined branch metric generated by the combined branch metric generating circuit 130 in the embodiment, it is possible to provide the same bit error rate performance as that in the embodiment 1.

Further, as stated above, the first, second to Lth weighting factors $W_{1,i}$, $W_{2,i}$, ..., $W_{L,i}$ are limited to 1 or less. Hence, in the embodiment, there is an advantage in that degradation in bit error rate performance can be prevented even when an excessive received signal is inputted. That is, in, for example, mobile communication applications, a transmitter and a receiver may frequently be in close proximity to one another. In this case, the received signal strength becomes extremely high. For example, the first, second to Lth received signal strength $P_{1,i}$, $P_{2,i}$, ..., $P_{L,i}$ frequently range from thousands to tens of thousands. In such a case, if the combined branch metric generating circuit 130 in the embodiment 1 consists of digital circuits, and the above excessive received signal is inputted, an overflow error occurs in the first, second to Lth multipliers 320A, 320B, ..., 320L, or the combining circuit 330. It is thereby impossible to obtain a normal combined branch metric, resulting in degradation in bit error rate performance. However, in the embodiment, since the first, second to Lth weighting factors $W_{1,i}$, $W_{2,i}$, ..., $W_{L,i}$ are limited to 1 or less, the above overflow error does not occur even when the excessive received signal is inputted, resulting in no degradation in bit error rate performance.

As described above, the result of normalization in which the respective received signal strength are divided by the maximum value among the received signal strength can be used as the weighting factor. It is thereby possible to prevent the degradation in bit error rate performance even when the excessive received signal is inputted.

Embodiment 5

Figure 10:
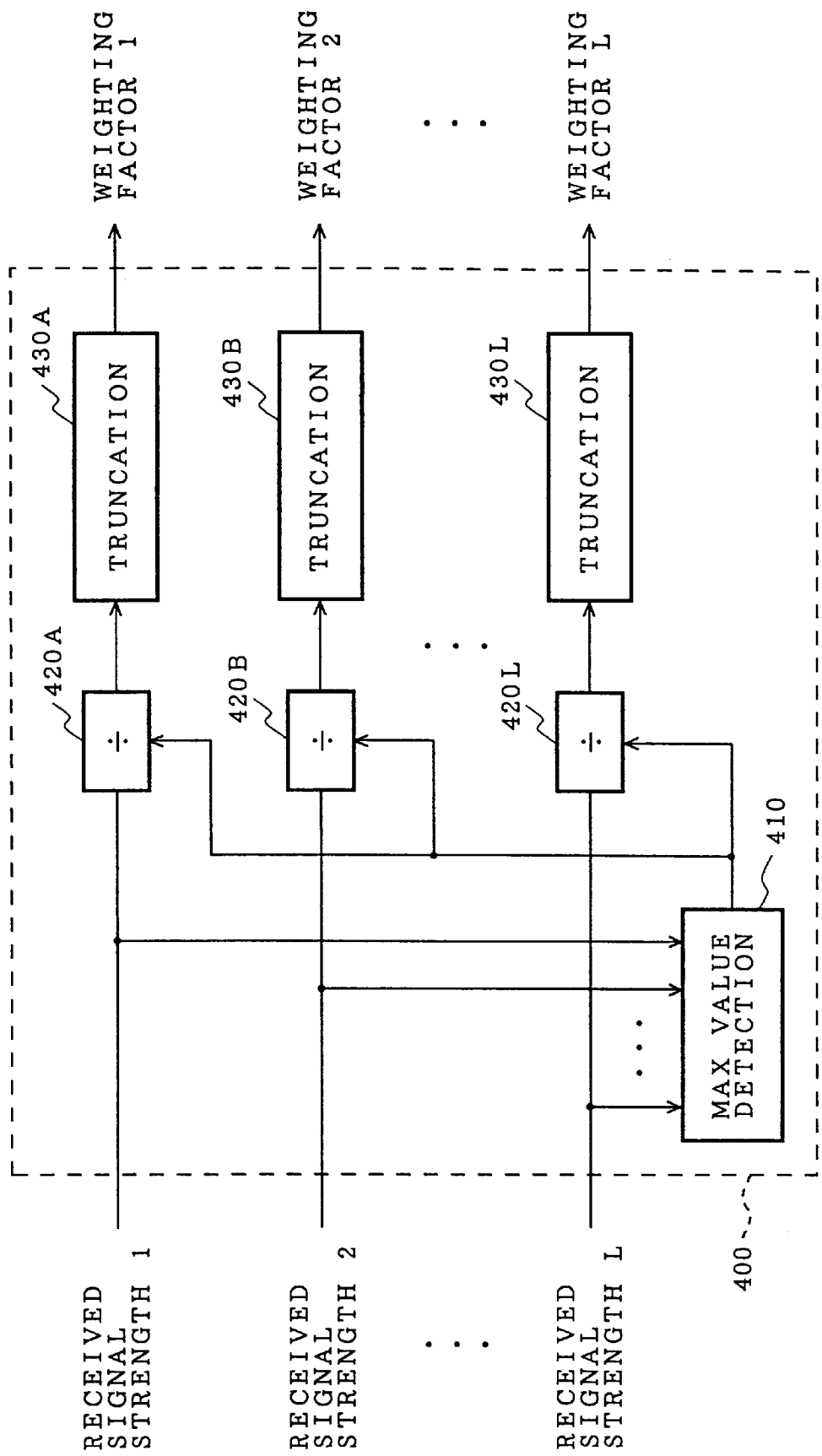
FIG. 10 is a block diagram showing another embodiment of the weighting factor generating circuit of the diversity receiver of the present invention.

In the embodiment 4, the weighting factor generating circuit 400 defines as the weighting factor the result of normalization in which the respective received signal strength are divided by the maximum value among the received signal strength. However, when the result of the normalization is less than a predetermined threshold, truncation may be made to set the weighting factor to zero. FIG. 10 is a block diagram showing a structure of a weighting factor generating circuit 400 for the above truncation in a diversity receiver. In the drawing, reference numerals 430A, 430B, ..., 430L denote first, second to Lth truncating circuits. The same reference numerals are used for component parts identical with or equivalent to those in FIG. 9 showing the structure of the weighting factor generating circuit 400 in the diversity receiver according to the embodiment 4, and descriptions thereof are omitted.

A description will now be given of the operation. In FIG. 10, first, second to Lth received signal strength $P_{1,i}$, $P_{2,i}$, ..., $P_{L,i}$ inputted into the weighting factor generating circuit 400 are inputted into a maximum value detecting circuit 410.

The maximum value detecting circuit 410 outputs the maximum value among the inputted first, second to Lth received signal strength $P_{1,i}, P_{2,i}, \ldots, P_{L,i}$ as the maximum signal strength. That is, when a value of the maximum signal strength at a time of t=iT is expressed as $\rho_i$, $\rho_i$ can be given by the following expression (where max{·} meaning the maximum value):

$$\rho_i = \max\{P_{1,i}, P_{2,i}, \ldots, P_{L,i}\} \qquad (29)$$

On the other hand, the first, second to Lth received signal strength $P_{1,i}, P_{2,i}, \ldots, P_{L,i}$ are inputted into the first, second to Lth dividers 420A, 420B, ..., 420L. The first, second to Lth dividers 420A, 420B, ..., 420L take as input the maximum signal strength $\rho_i$ outputted from the maximum value detecting circuit 410, thereby respectively dividing the first, second to Lth received signal strength $P_{1,i}, P_{2,i}, \ldots, P_{L,i}$ by the maximum signal strength [<b]old92 $_i$. The first, second to Lth dividers 420A, 420B, ..., 420L output the results of division as first, second to Lth normalized signal strength. The first, second to Lth normalized signal strength are respectively inputted into the first, second to Lth truncating circuits 430A, 430B, ..., 430L. When the inputted first, second to Lth normalized signal strength are equal to or more than a predetermined threshold, the first, second to Lth truncating circuits 430A, 430B, ..., 430L directly output the first, second to Lth normalized signal strength as first, second to Lth weighting factors. Otherwise, when the first, second to Lth normalized signal strength are less than the predetermined threshold, the first, second to Lth truncating circuits 430A, 430B, ..., 430L truncate, i.e., output zero as the first, second to Lth weighting factors. Therefore, when a value of the kth (k =1, 2, ..., L) weighting factor at the time of t=iT is defined as $W_{k,i}$, and the threshold is defined as $\delta$, $W_{k,i}$ can be given by the following expression:

$$W_{k,i} = P_{k,i} / \rho_i \qquad (P_{k,i}/\rho_i \geq \delta) \qquad (30)$$
$$\phantom{W_{k,i}} = 0 \qquad (P_{k,i}/\rho_i < \delta)$$

The weighting factor generating circuit 400 according to the embodiment generates and outputs the first, second to Lth truncated weighting factors in such a manner. A combined branch metric is generated by using the weighting factor. In the embodiment, it is thereby possible to prevent degradation in bit error rate performance when first, second to Lth received signals consist of only noise and no significant signal. That is, in the embodiment 1, the combined branch metric is generated with strength of the noise as the weighting factor if the received signal consists of only the noise and no significant signal. Consequently, the combined branch metric consists of a term having only the noise so that an SNR is reduced, resulting in the degradation in bit error rate performance. On the other hand, in the embodiment, since the threshold $\delta$ is set to be higher than the strength of the noise, the value of the weighting factor can be set to zero for a branch metric with respect to the received signal including only the noise and no significant signal. Hence, the term having only the noise can be removed when the combined branch metric is generated. As a result, reduction in SNR can be prevented so that no degradation occurs in bit error rate performance.

As set forth above, when the result of the normalization is less than the predetermined threshold, the truncation is made to set the weighting factor to zero. It is thereby possible to prevent the degradation in bit error rate performance even if the received signal consists of only the noise and no significant signal.

Embodiment 6

Figure 11:
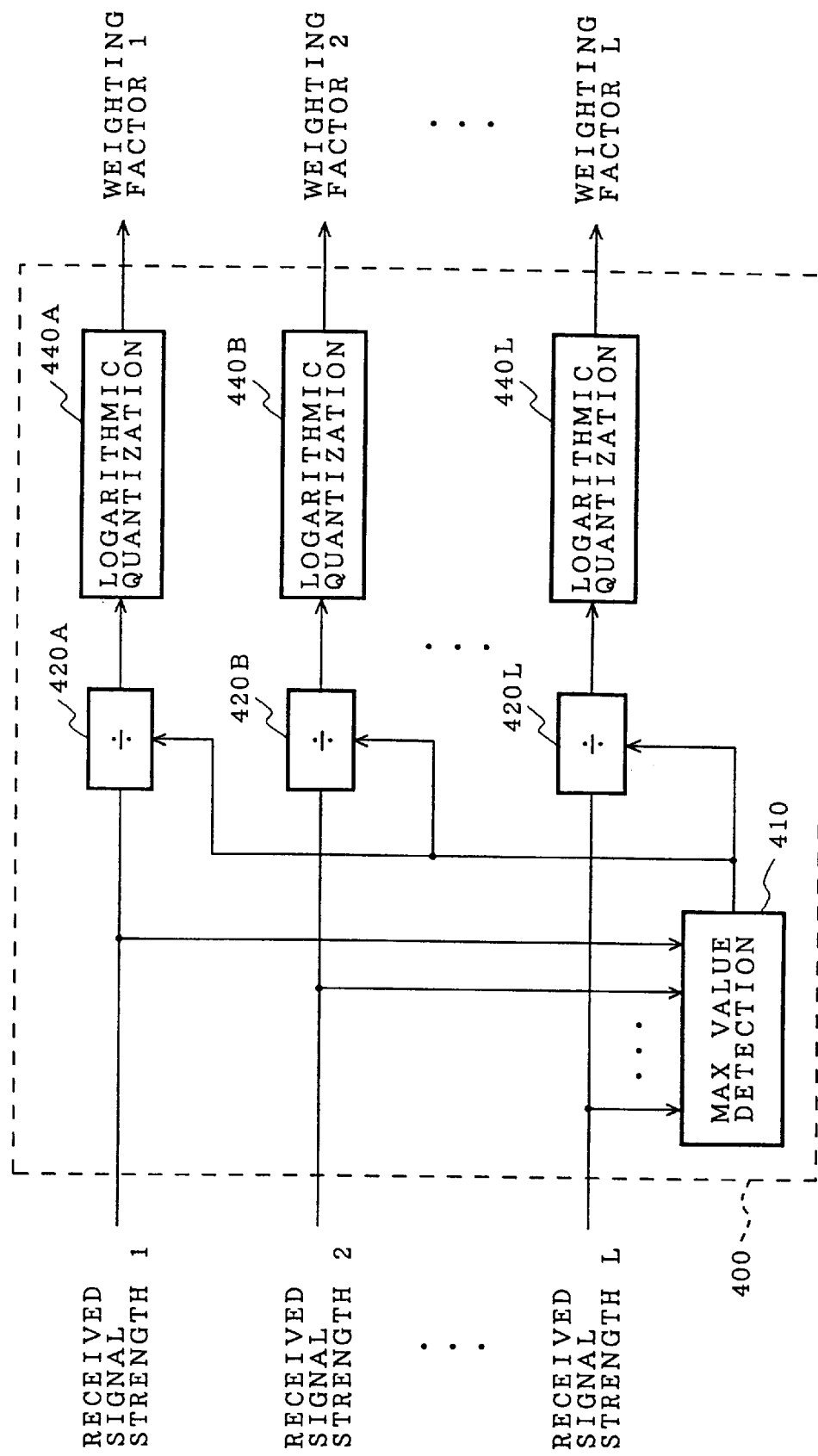
FIG. 11 is a block diagram showing another embodiment of the weighting factor generating circuit of the diversity receiver of the present invention.

Alternatively, a logarithmic quantization may be made to output values of integral powers of 2 in the vicinity of first, second to Lth normalized signal strength as first, second to Lth weighting factors. FIG. 11 is a block diagram showing a structure of a weighting factor generating circuit 400 for the above logarithmic quantization in a diversity receiver. In the drawing, reference numerals 440A, 440B, ..., 440L denote first, second to Lth logarithmic quantization circuits. The same reference numerals are used for component parts identical with those in FIG. 10 showing the structure of the weighting factor generating circuit 400 in the diversity receiver according to the embodiment 5, and descriptions thereof are omitted.

In FIG. 11, first, second to Lth received signal strength $P_{1,i}, P_{2,i}, \ldots, P_{L,i}$ are divided by the maximum signal strength $\rho_i$ serving as output of a maximum value detecting circuit 410. As the results of division, first, second to Lth normalized signal strength are outputted from first, second to Lth dividers 420A, 420B, ..., 420L, and are respectively inputted into the first, second to Lth logarithmic quantization circuits 440A, 440B, ..., 440L. The first, second to Lth logarithmic quantization circuits 440A, 440B, ..., 440L carry out the logarithmic quantization to output the values of the integral powers of 2 in the vicinity of the first, second to Lth inputted normalized signal strength as the first, second to Lth weighting factors. Here, when a value of a kth (k=1, 2, ..., L) weighting factor at the time of t =iT is defined as $W_{k,i}$, $W_{k,i}$ can be given by the following expressions (where $\lfloor x \rfloor$: the maximum integer not exceeding x):

$$W_{k,i} = 2^{\lfloor z + 0.5 \rfloor}; \qquad (31)$$
$$z = \log_2(P_{k,i}/\rho_i)$$

The weighting factor generating circuit 400 according to the embodiment generates and outputs the first, second to Lth weighting factors quantized through the logarithmic quantization in such a manner. In the embodiment, by using the weighting factors, it is possible to reduce the hardware size of the first, second to Lth multipliers 320A, 320B, ..., 320L in a combined branch metric generating circuit 130, resulting in reduction in power consumption. That is, in digital signal processing, multiplication using the integral power of 2 can be implemented by a simple bit shift operation. Hence, by expressing values of the first, second to Lth weighting factors by the integral powers of 2 through the logarithmic quantization, it is possible to implement the first, second to Lth multipliers 320A, 320B, ..., 320L in the combined branch metric generating circuit 130 by simple bit shift circuits. As a result, it is possible to more reduce the hardware size, and more reduce the power consumption than would be in the embodiment 4 in which typical multipliers are required because of no logarithmic quantization.

Embodiment 7

Figure 12:
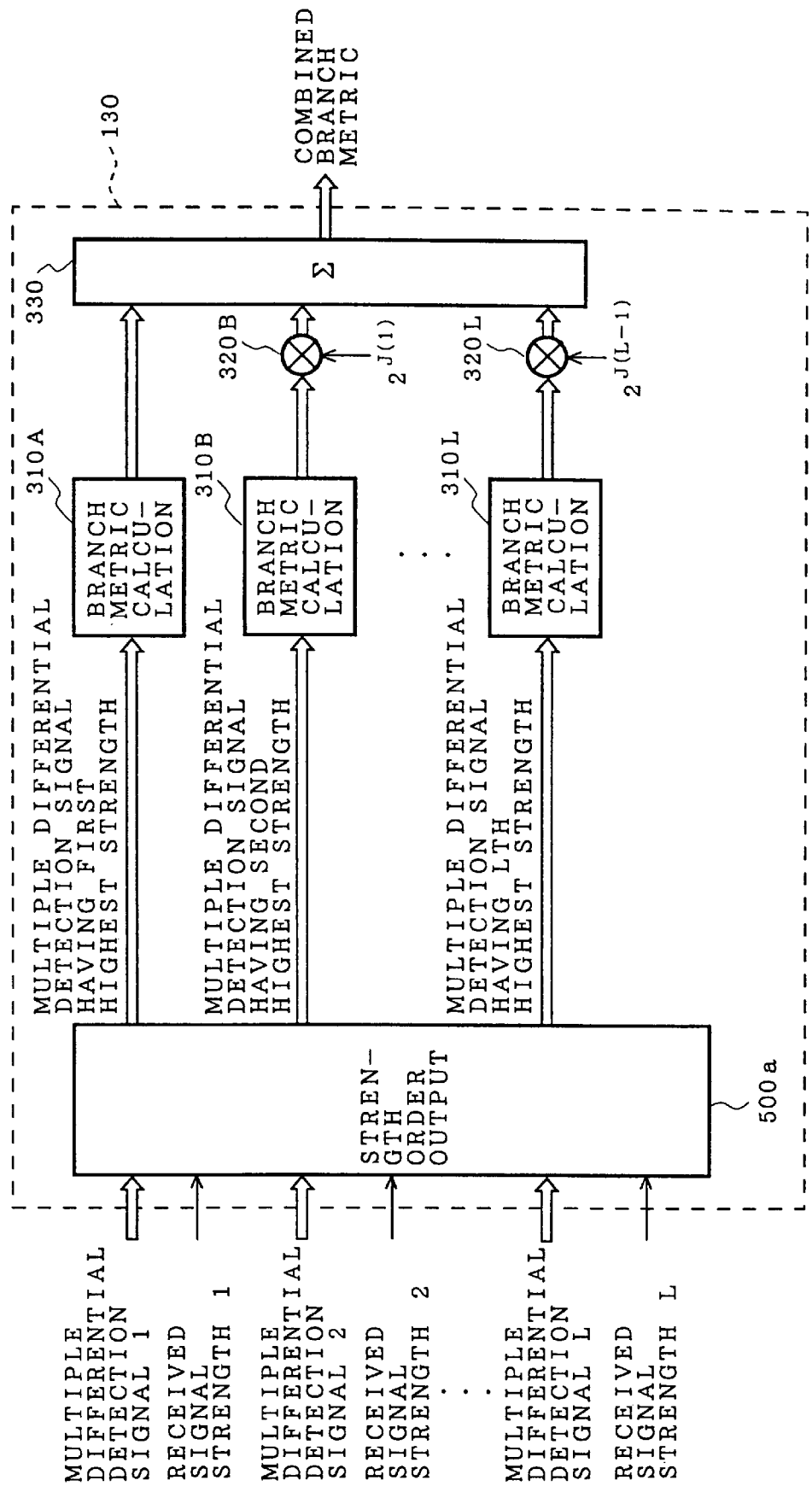
FIG. 12 is a block diagram showing another embodiment of the combined branch metric generating circuit of the diversity receiver of the present invention.

Alternatively, there may be provided a combined branch metric generating circuit 130 which performs weighted combining of branch metrics with respect to multiple differential detection signals obtained from received signals by using weighting factors constant values of integral powers of 2, determined by the order of magnitude of received signal strength to take values of 1 or less, and outputs the result as a combined branch metric. FIG. 12 is a block diagram showing a structure of the combined branch metric generating circuit 130 for the above signal processing. In the drawing, reference numerals 320B, ..., 320L denote first to (L−1)th multipliers, and 500 is a strength order output circuit. The same reference numerals are used for component parts identical with or equivalent to those in FIG. 5 showing the structure of the combined branch metric generating circuit 130 in the diversity receiver according to the embodiment 1, and descriptions thereof are omitted.

In FIG. 12, first, second to Lth multiple differential detection signals and received signal strength are inputted into the combined branch metric generating circuit 130, and are subsequently inputted into the strength order output circuit 500. The strength order output circuit 500 compares the magnitude of the first, second to Lth received signal strength, and outputs multiple differential detection signals generated from received signals having kth (k=1, 2, ..., L) highest signal strength as multiple differential detection signals having kth highest strength.

Multiple differential detection signals having first, second to Lth highest strength outputted from the strength order output circuit 500 are respectively inputted into the first, second to Lth branch metric calculating circuits 310A, 310B, ..., 310L in which a calculation is made to find a branch metric as in the embodiment 1.

The second to Lth branch metric calculating circuits 310B, ..., 310L output branch metrics with respect to the multiple differential detection signals having the second, ..., Lth highest strength, and the branch metrics are respectively inputted into the first to (L−1)th multipliers 320B, ..., 320L to be multiplied by constants $2^{J(1)}, \ldots, 2^{J(L-1)}$ serving as weighting factors (where J(k) (k=1, ..., L−1): integer of zero or less). That is, the weighting factors $2^{J(1)}, \ldots, 2^{J(L-1)}$ are limited to 1 or less.

A combining circuit 330 takes as input the branch metric with respect to the multiple differential detection signal having the first highest strength outputted from the first branch metric calculating circuits 310A, and output of the first to (L−1)th multipliers 320B, ..., 320L. The combining circuit 330 computes the sum of values corresponding to the same state transition among the branch metric with respect to the multiple differential detection signal having the first highest strength outputted from the first branch metric calculating circuit 310A, and the branch metrics with respect to the multiple differential detection signals having the second, ..., Lth highest strength weighted by the first to (L−1)th multipliers 320B, ..., 320L. Therefore, the summation operation is executed $M^N$ times according to the total number of state transitions. The combining circuit 330 combines the results of the $M^N$ kinds of summations to output the combined result as the combined branch metric serving as output of the combined branch metric generating circuit 130.

The signal processing is equivalent to multiplication of the maximum weighting factor "1" by the branch metric with respect to the multiple differential detection signal having the first highest strength serving as the output of the first branch metric calculating circuit 310A. Here, if a value of an n-symbol (n=1, 2, ..., N) differential detection signal constituting the multiple differential detection signal having the kth (k=1, 2, .., L) highest strength is defined as $\Delta\psi_{(n)k,i}$, in the combined branch metric, a metric value $\Lambda_i\{B_{i-1}, B_i\}$ of a branch corresponding to a state transition from a state $B_{i-1}=(\beta_{i-(N-1)}, \beta_{i-(N-2)}, \ldots, \beta_{i-1})$ to a state $B_i=(\beta_{i-(N-2)}, \beta_{i-(N-3)}, \ldots, \beta_i)$ can be expressed by the following expression (where addition and subtraction within absolute value notations being made modulo 2π, and the results of addition and subtraction being of −π or more and less than π):

$$\Lambda_i\{B_{i-1}, B_i\} = \sum_{n=1}^{N}\left|\Delta\psi_{(n)1,i} - \sum_{j=0}^{n-1}\beta_{i-j}\right| + \sum_{k=2}^{L}2^{J(k-1)}\sum_{n=1}^{N}\left|\Delta\psi_{(n)k,i} - \sum_{j=0}^{n-1}\beta_{i-j}\right| \quad (32)$$

The combined branch metric generating circuit 130 according to the embodiment generates and outputs the combined branch metric in such a manner. However, as set forth above, the values of the weighting factors are not directly equal to the values of the received signal strength but equal to the constant values determined by the order of their magnitude. Hence, as in the embodiment 4, degradation in bit error rate performance can be prevented from occurring due to an overflow error even when an excessive received signal is inputted. In addition, in the embodiment, it is possible to reduce the hardware size of the first to (L−1)th multipliers 320B, ..., 320L, resulting in reduction in power consumption. That is, in digital signal processing, multiplication using the integral power of 2 can be implemented by a simple bit shift operation. Hence, the first to (L−1)th multipliers 320B, ..., 320L can be implemented by bit shift circuits in which the number of shifted bits is fixed. As a result, it is possible to more reduce the hardware size, and more reduce the power consumption than would be in the embodiment 1 in which typical multipliers are required.

Figure 13:
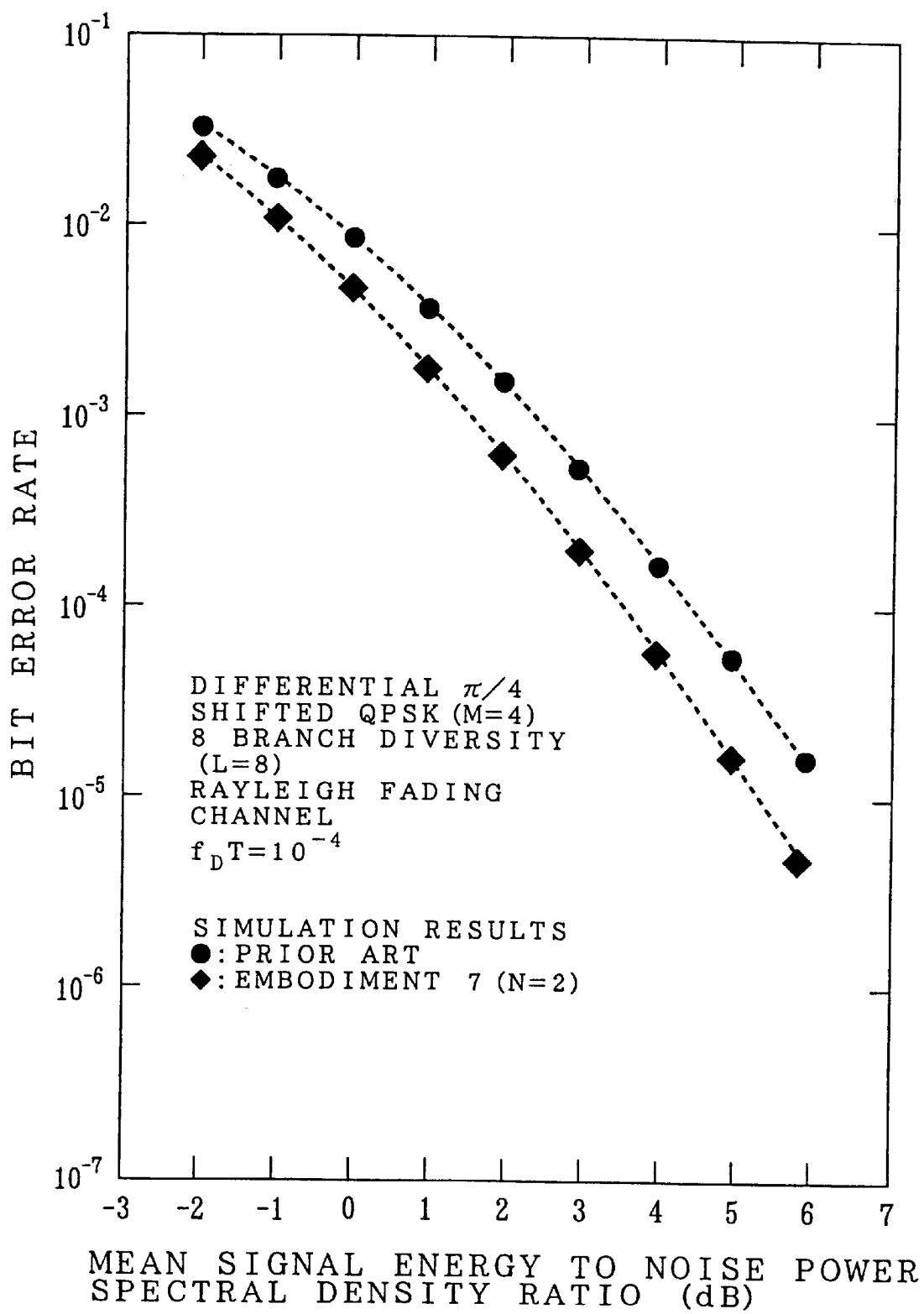
FIG. 13 is a characteristic diagram showing bit error rate performances in diversity receivers according to the prior art and the embodiment 7 depending upon computer simulation.

As stated above, even in case of the simple weighting using the constant values of the integral powers of 2 as the weighting factors, it is possible to more enhance the bit error rate performance than would be in a prior art apparatus. This is shown according to the result of computer simulation. FIG. 13 is a characteristic diagram showing bit error rate performances in diversity receivers according to the prior art and the embodiment 7 depending upon the computer simulation. Simulation conditions in FIG. 13 are identical with those in FIG. 6 except that values of J(k) (k=1, ..., 7) in the embodiment 7 are set to values shown in the following table:

TABLE 1

| k    | 1  | 2  | 3  | 4  | 5  | 6  | 7  |
|------|----|----|----|----|----|----|----|
| J(k) | −1 | −1 | −1 | −2 | −2 | −3 | −4 |

From FIG. 13, it is apparent that the bit error rate performance is more enhanced in the embodiment 7 than would be in the prior art. As set forth above, even in case of the simple weighting using the constant values of the integral powers of 2 as the weighting factors, it is possible to provide a more excellent bit error rate performance than that in the prior art diversity receiver.

Embodiment 8

Figure 14:
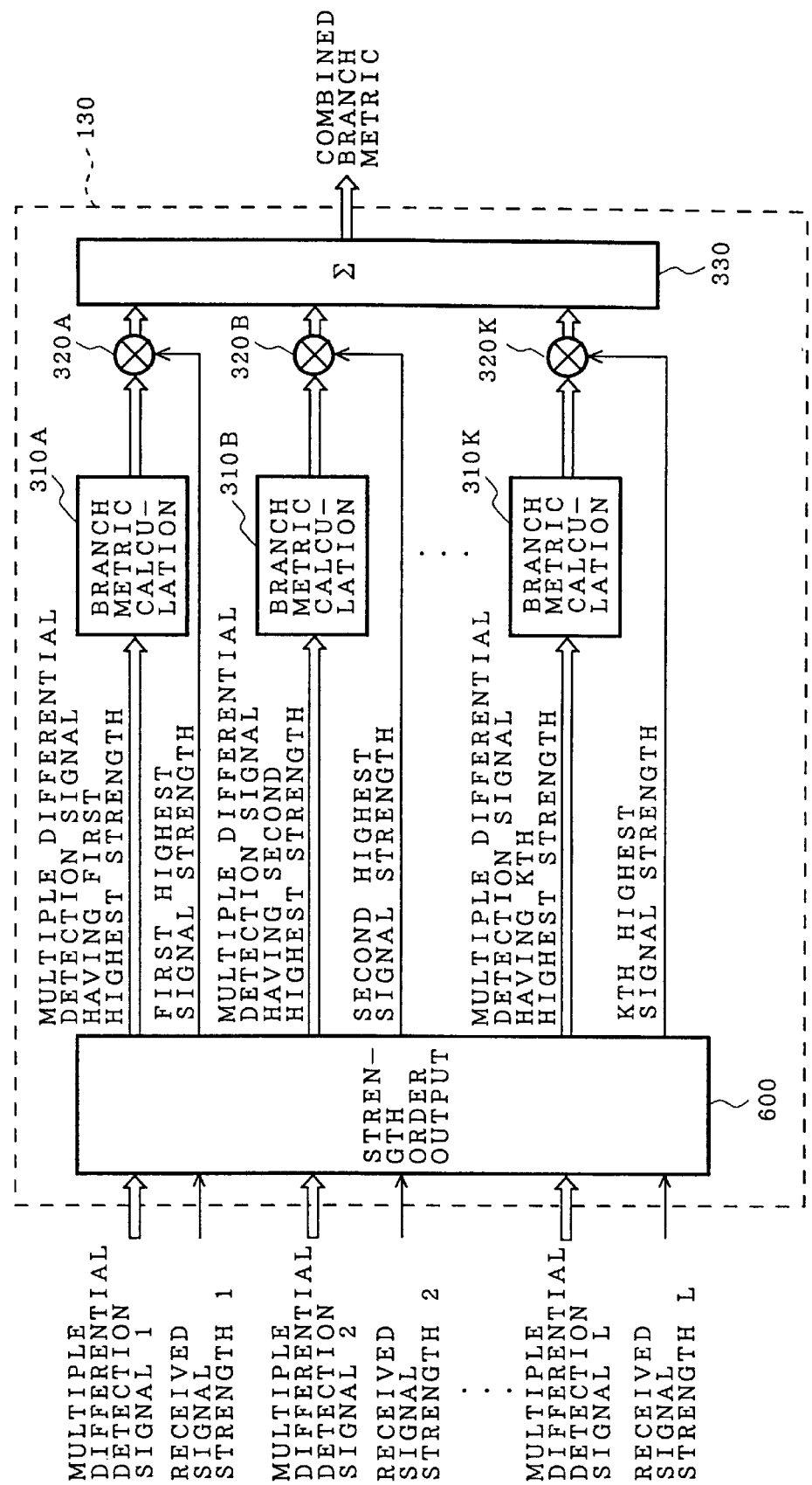
FIG. 14 is a block diagram showing another embodiment of the combined branch metric generating circuit of the diversity receiver of the present invention.

Alternatively, there may be provided a combined branch metric generating circuit 130 which performs weighted combining of branch metrics with respect to multiple differential detection signals obtained from K (K: integer of 1 or more, and less than L) received signals having higher order signal strength among L received signals, and outputs the result as a combined branch metric. FIG. 14 is a block diagram showing a structure of the combined branch metric generating circuit 130 for the above signal processing. In the drawing, reference numerals 310A, 310B, ..., 310K denote first to Kth branch metric calculating circuits, 320A, 320B, ..., 320K are first to Kth multipliers, and 600 is a strength order selecting circuit. The same reference numerals are used for component parts identical with or equivalent to those in FIG. 5 showing the structure of the combined branch metric generating circuit 130 in the diversity receiver according to the embodiment 1, and descriptions thereof are omitted.

In FIG. 14, first, second to Lth multiple differential detection signals and received signal strength are inputted into the combined branch metric generating circuit 130, and are inputted into the strength order selecting circuit 600. The strength order output circuit 600 compares magnitude of the first, second to Lth received signal strength, selects and outputs first, ..., Kth highest signal strength as first, second, ..., Kth highest signal strength, and outputs multiple differential detection signals generated from received signals having kth (k=1, 2, ..., K) highest signal strength as multiple differential detection signals having kth highest strength.

The multiple differential detection signals having the first, second, ..., Kth highest strength outputted from the strength order selecting circuit 600 are respectively inputted into the first, second to Kth branch metric calculating circuits 310A, 310B, ..., 310K in which a calculation is made to find a branch metric as in the embodiment 1.

The first, second to Kth branch metric calculating circuits 310A, 310B, ..., 310K output branch metrics with respect to the multiple differential detection signals having the first, second, ..., Kth highest strength, and the branch metrics are respectively inputted into the first, second to Kth multipliers 320A, 320B, ..., 320K. Further, the first, second, ..., Kth highest strength outputted from the strength order selecting circuit 600 are respectively inputted into the first, second to Kth multipliers 320A, 320B, ..., 320K to be respectively multiplied by the branch metrics with respect to the multiple differential detection signals having the first, second, ..., Kth highest strength. It is thereby possible to weight the branch metrics with respect to the multiple differential detection signals having the first, second, ..., Kth highest strength with the first, second, ..., Kth highest signal strength as weighting factors. That is, output of the multipliers 320A, 320B, ..., 320K are the branch metrics with respect to the multiple differential detection signals having the first, second, ..., Kth highest strength respectively weighted by the first, second, ..., Kth highest signal strength. The output of the multipliers 320A, 320B, ..., 320K are respectively inputted into a combining circuit 330.

The combining circuit 330 computes the sum of values corresponding to the same state transition among the output of the first, second to Kth multipliers 320A, 320B, ..., 320K, i.e., the branch metrics with respect to the multiple differential detection signals having the first, second, ..., Kth highest strength weighted by the first, second, ..., Kth highest signal strength. Therefore, the summation operation is executed $M^N$ times according to the total number of state transitions. The combining circuit 330 combines the results of the $M^N$ kinds of summations to output the combined result as the combined branch metric serving as output of the combined branch metric generating circuit 130. Thus, when a value of the kth (k=1, 2, ..., K) highest signal strength is defined as $\Gamma_{k,i}$, and a value of an n-symbol (n=1, 2, ..., N) differential detection signal constituting the multiple differential detection signal having the kth highest strength is defined as $\Delta\Psi_{(n)k,i}$, in the combined branch metric, a metric value $\Lambda_i\{B_{i-1}, B_i\}$ of a branch corresponding to a state transition from a state $B_{i-1}=(\beta_{i-(N-1)}, \beta_{i-(N-2)}, \ldots, \beta_{i-1})$ to a state $B_i=(\beta_{i-(N-2)}, \beta_{i-(N-3)}, \ldots, \beta_i)$ can be expressed by the following expression (where addition and subtraction within absolute value notations being made modulo $2\pi$, and the results of addition and subtraction being of $-\pi$ or more and less than $\pi$):

$$\Lambda_i\{B_{i-1}, B_i\} = \sum_{k=1}^{K} \Gamma_{k,i} \sum_{n=1}^{N} \left| \Delta\Psi_{(n)k,i} - \sum_{j=0}^{n-1} \beta_{i-j} \right| \tag{33}$$

In such a manner, the combined branch metric generating circuit 130 according to the embodiment performs the weighted combining of the branch metrics with respect to the multiple differential detection signals obtained from the K received signals having the higher order strength among the L received signals, and outputs the result as the combined branch metric. In the embodiment, since the number of branch metric calculating circuits or multipliers can be reduced from L to K, hardware size thereof can be reduced, resulting in reduction in power consumption.

Figure 15:
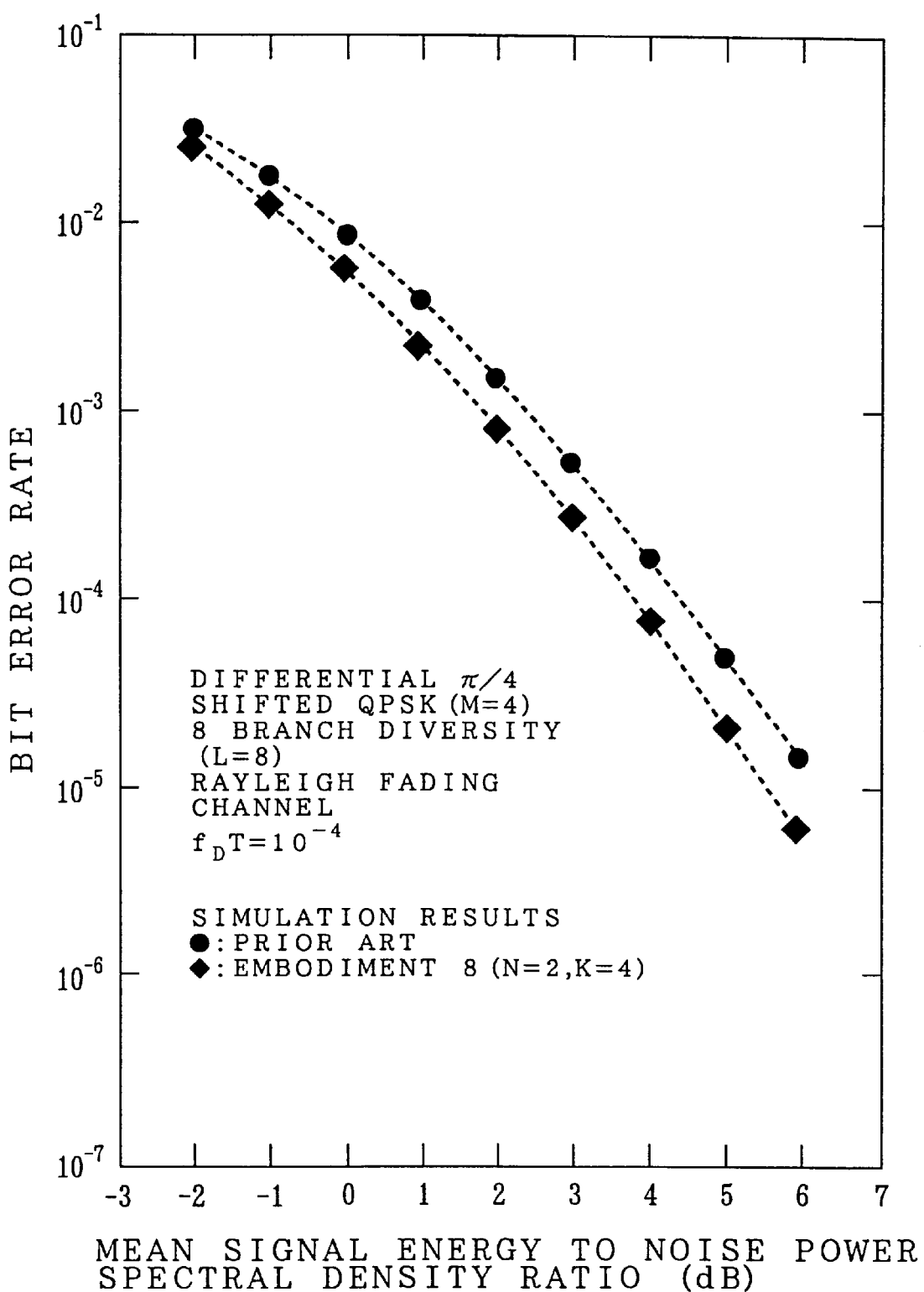
FIG. 15 is a characteristic diagram showing bit error rate performances in diversity receivers according to the prior art and the embodiment 8 depending upon computer simulation.

In this case, a diversity gain is reduced because the number of received signals used to generate the combined branch metric is reduced from L to K. However, it is possible to provide a more excellent bit error rate performance than that in a prior art apparatus. This is shown according to the result of computer simulation. FIG. 15 is a characteristic diagram showing bit error rate performances in diversity receivers according to the prior art and the embodiment 8 depending upon the computer simulation. Simulation conditions in FIG. 15 are identical with those in FIG. 6 except that a value K is defined as K=4 in the embodiment 8. From FIG. 15, though only four received signals are used in the embodiment 8, it is apparent that the bit error rate performance is more enhanced than would be in the prior art in which all the eight received signals are used. As set forth above, the combined branch metric is obtained by performing the weighted combining of the branch metrics with respect to the multiple differential detection signals obtained from the K (K: integer of 1 or more, and less than L) received signals having the higher order signal strength among the L received signals. Consequently, the number of branch metric calculating circuits and multipliers can be decreased so that the hardware size can be reduced and the power consumption can be reduced. At the same time, it is possible to provide a more excellent bit error rate performance than that in the prior art diversity receiver.

Embodiment 9

Figure 16:
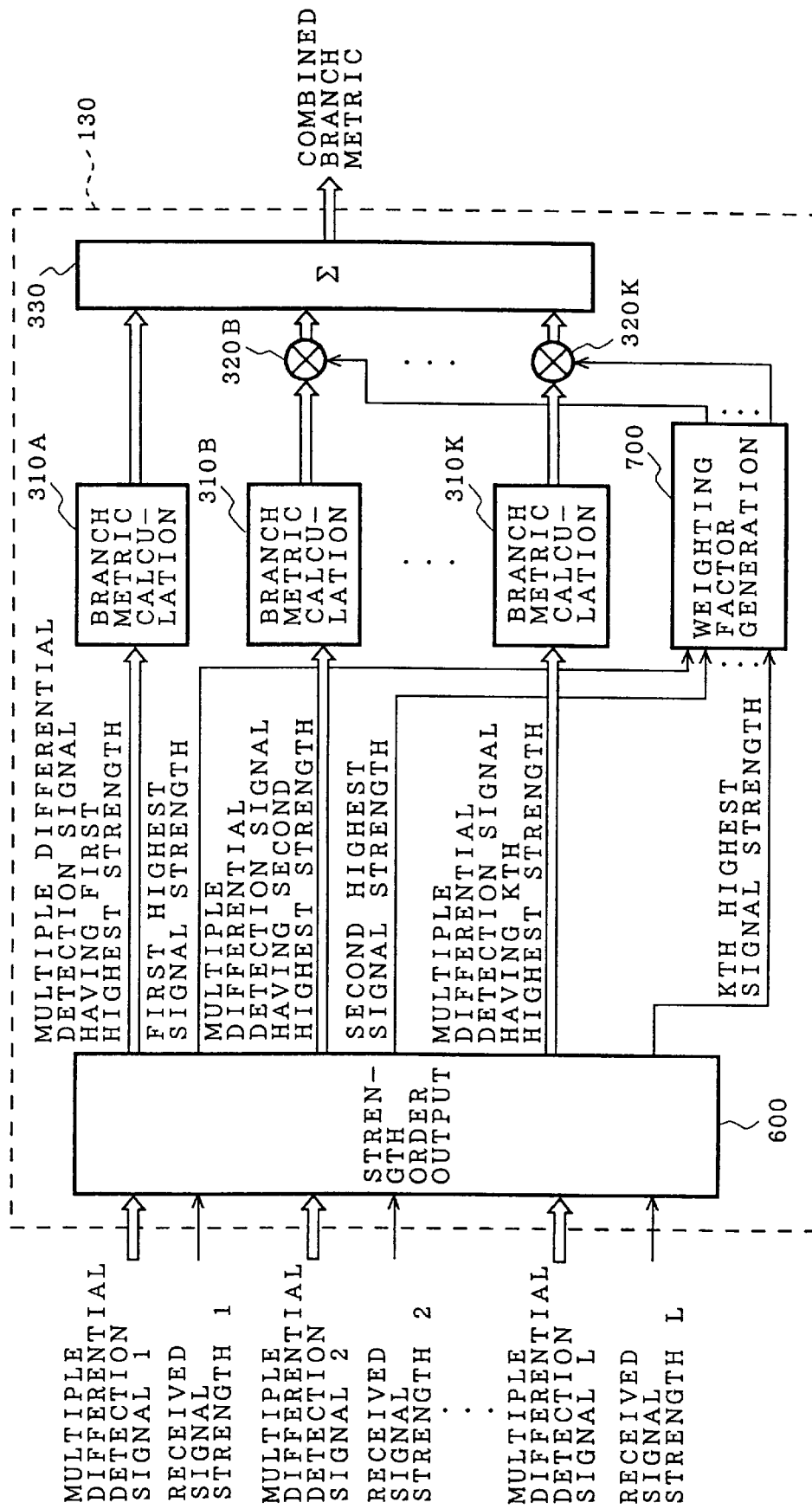
FIG. 16 is a block diagram showing another embodiment of the combined branch metric generating circuit of the diversity receiver of the present invention.

In the embodiment 8, the combined branch metric generating circuit 130 carries out the weighted combining directly using the signal strength as the weighting factors for the branch metrics. However, as in the embodiment 4 serving as modification of the embodiment 1, the result of normalization in which the respective signal strength are divided by the maximum value of the signal strength may be defined as a weighting factor. FIG. 16 is a block diagram showing a structure of a combined branch metric generating circuit 130 for the above normalization in a diversity receiver. In the drawing, reference numerals 320B, ..., 320K denote first to (K–1)th multipliers, and 700 is a weighting factor generating circuit. The same reference numerals are used for component parts identical with or equivalent to those in FIG. 14 showing the structure of the combined branch metric generating circuit 130 in the diversity receiver according to the embodiment 8, and descriptions thereof are omitted. In FIG. 16, a strength order selecting circuit 600 outputs first, second, ..., Kth highest signal strength $\Gamma_{1,i}, \Gamma_{2,i}, \ldots, \Gamma_{K,i}$ which are inputted into the weighting factor generating circuit 700.

Figure 17:
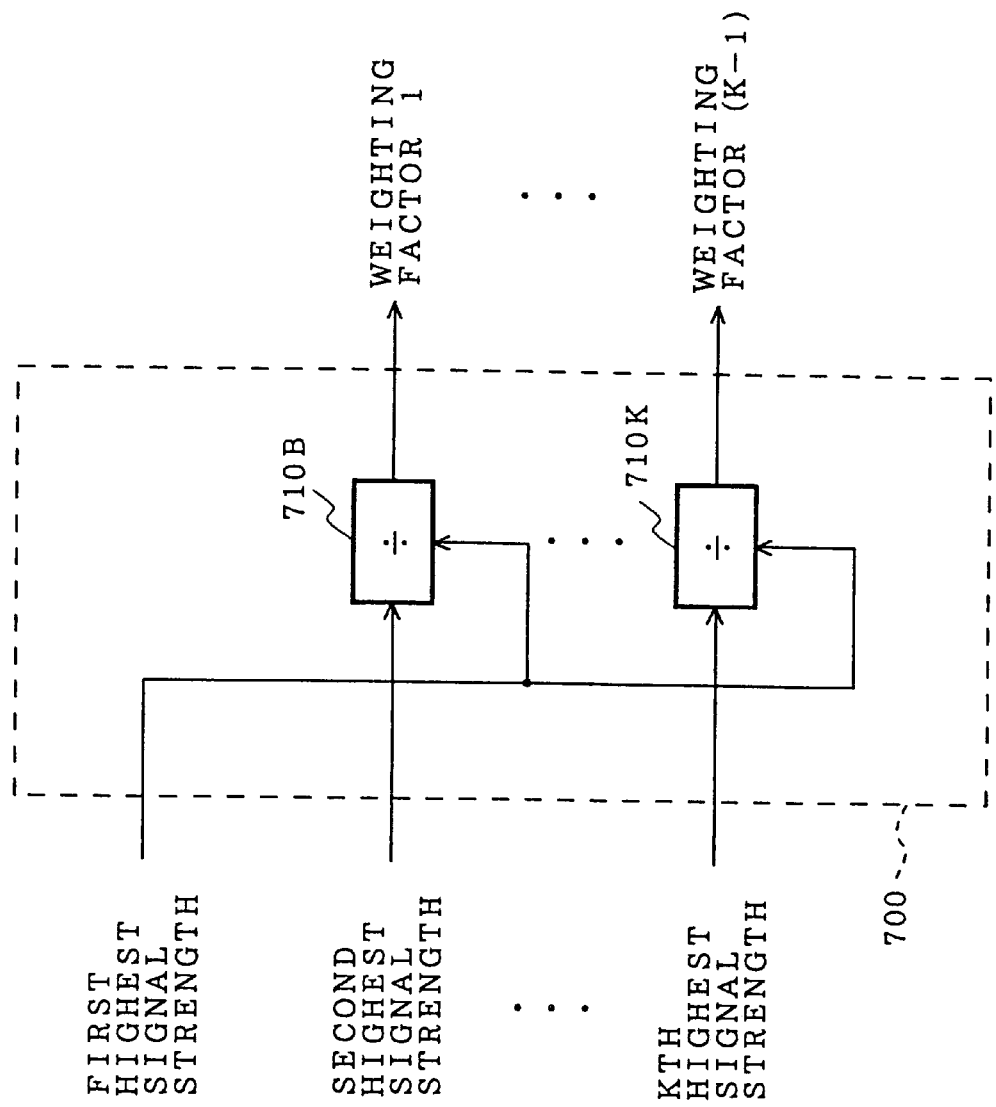
FIG. 17 is a block diagram showing of one embodiment of the weighting factor generating circuit of the diversity receiver of the present invention.

FIG. 17 is a block diagram showing a structure of the weighting factor generating circuit 700. In the drawing, reference numerals 710B, ..., 710K denote first to (K–1)th dividers. In FIG. 17, among the first, second, ..., Kth highest signal strength $\Gamma_{1,i}, \Gamma_{2,i}, \ldots, \Gamma_{K,i}$ inputted into the weighting factor generating circuit 700, the second, . . . , Kth highest signal strength $\Gamma_{2,i}, \ldots, \Gamma_{K,i}$ are respectively inputted into the first to (K−1)th dividers 710B, . . . , 710K. Further, the first highest signal strength $\Gamma_{1,i}$ serving as the maximum value of the signal strength is inputted into the first to (K−1)th dividers 710B, . . . , 710K in which the second, . . . , Kth highest signal strength $\Gamma_{2,i}, \ldots, \Gamma_{K,i}$ are respectively divided by the first highest signal strength $\Gamma_{1,i}$. The first to (K−1)th dividers 710B, . . . , 710K output the results of division as first to (K−1)th weighting factors serving as output of the weighting factor generating circuit 700. Here, when a value of a kth (k=1, . . . , K−1) weighting factor is defined as $W_{k,i}$, $W_{k,i}$ can be given by the following expression:

$$W_{k,i} = \Gamma_{k+1,i}/\Gamma_{1,i} \tag{34}$$

It is apparent that the first to (K−1)th weighting factors $W_{1,i}, \ldots, W_{K-1,i}$ are in the same ratio as that of the second to Kth received signal strength $P_{2,i}, \ldots, P_{K,i}$. Further, it is apparent that the first to (K−1)th weighting factors $W_{1,i}, \ldots, W_{K-1,i}$ are limited to 1 or less.

Returning to FIG. 16, a description will be given of the operation of the combined branch metric generating circuit 130 according to the embodiment. In FIG. 16, the second to Kth branch metric calculating circuits 310B, . . . , 310K output branch metrics with respect to multiple differential detection signals having second, . . . , Kth highest strength, and the branch metrics are inputted into the first to (K−1)th multipliers 320B, . . . , 320K. Further, the first to (K−1)th weighting factors serving as output of the weighting factor generating circuit 700 are respectively inputted into the first to (K−1)th multipliers 320B, . . . , 320L to be respectively multiplied by the branch metrics with respect to the multiple differential detection signals having the second, Kth highest strength. Thus, output of the first to (K−1)th multipliers 320B, . . . , 320K are the branch metrics with respect to the multiple differential detection signals having the second, . . . , Kth highest strength weighted by the first to (K−1)th weighting factors $W_{1,i}, \ldots, W_{K-1,i}$.

A combining circuit 330 takes as input the branch metric with respect to the multiple differential detection signal having the first highest strength serving as output of a first branch metric calculating circuit 310A, and output of the first to (K−1)th multipliers 320B, . . . , 320K. The combining circuit 330 computes the sum of values corresponding to the same state transition among the branch metric with respect to the multiple differential detection signal having the first highest strength serving as output of the first branch metric calculating circuit 310A, and the output of the first to (K−1)th multipliers 320B, . . . , 320K, i.e., the branch metrics with respect to multiple differential detection signals having second, . . . , Kth highest strength weighted by the first to (K−1)th weighting factors. Therefore, the summation operation is executed $M^N$ times according to the $M^N$ kinds of state transitions. The combining circuit 330 combines the results of the above $M^N$ kinds of summations to output the combined result as the combined branch metric serving as output of the combined branch metric generating circuit 130.

The signal processing is equivalent to multiplication of the maximum weighting factor "1" by the branch metric with respect to the multiple differential detection signal having the first highest strength serving as the output of the first branch metric calculating circuit 310A. Here, if a value of an n-symbol (n=1, 2, . . . , N) differential detection signal constituting the multiple differential detection signal having the kth (k=1, 2, . . . , K) highest signal strength is defined as $\Delta\Psi_{(n)k,i}$, in the combined branch metric, a metric value $\Lambda_i\{B_{i,1}, B_i\}$ of a branch corresponding to a state transition from a state $B_{i-1}=(\beta_{i-(N-1)}, \beta_{i-(N-2)}, \ldots, \beta_{i-1})$ to a state $B_i=(\beta_{i-(N-2)}, \beta_{i-(N-3)}, \ldots, \beta_i)$ can be expressed by the following expression (where addition and subtraction within absolute value notations being made modulo $2\pi$, and the results of addition and subtraction being of $-\pi$ or more and less than $\pi$):

$$\Lambda_i\{B_{i-1}, B_i\} = \sum_{n=1}^{N} \left| \Delta\psi_{(n)1,i} - \sum_{j=0}^{n-1} \beta_{i-j} \right| + \tag{35}$$

$$\sum_{k=2}^{L} W_{k-1,i} \sum_{n=1}^{N} \left| \Delta\psi_{(n)k,i} - \sum_{j=0}^{n-1} \beta_{i-j} \right|$$

$$= \sum_{n=1}^{N} \left| \Delta\psi_{(n)1,i} - \sum_{j=0}^{n-1} \beta_{i-j} \right| +$$

$$\sum_{k=2}^{L} (\Gamma_{k,i}/\Gamma_{1,i}) \sum_{n=1}^{N} \left| \Delta\psi_{(n)k,i} - \sum_{j=0}^{n-1} \beta_{i-j} \right|$$

$$= \frac{1}{\Gamma_{1,i}} \sum_{k=1}^{L} \Gamma_{k,i} \sum_{n=1}^{N} \left| \Delta\psi_{(n)k,i} - \sum_{j=0}^{n-1} \beta_{i-j} \right|$$

In such a manner, the combined branch metric generating circuit 130 according to the embodiment can generate the combined branch metric to which the weighted combining is made equivalent to the weighted combining of the embodiment 8 using the first, second, . . . , Kth highest signal strength $\Gamma_{1,i}, \Gamma_{2,i}, \ldots, \Gamma_{K,i}$ as the weighting factors. Therefore, by using the combined branch metric generated by the combined branch metric generating circuit 130 according to the embodiment, it is possible to provide the same bit error rate performance as that in the embodiment 8.

As set forth above, the first to (K−1)th weighting factors $W_{1,i}, \ldots, W_{K-1,i}$ are limited to 1 or less in the embodiment. Thus, as in the embodiment 4, when the combined branch metric generating circuit 130 consists of digital circuits, there are advantages in that an overflow error can be prevented to cause no degradation in bit error rate performance in the circuits even if an excessive received signal is inputted.

Embodiment 10

Figure 18:
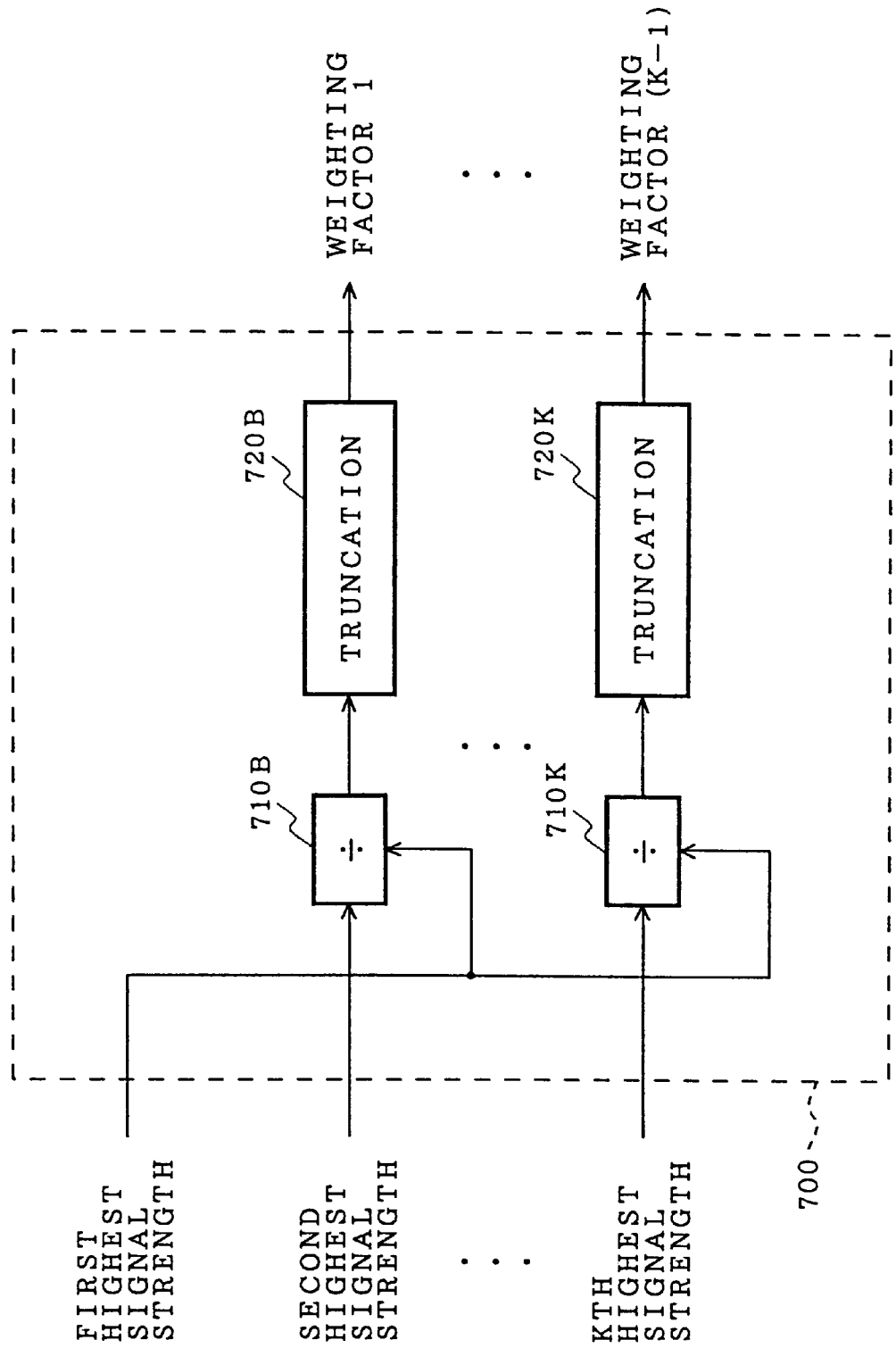
FIG. 18 is a block diagram showing another embodiment of the weighting factor generating circuit of the diversity receiver of the present invention.

In the weighting factor generating circuit 700 in the embodiment 9, the result of normalization in which the respective signal strength are divided by the maximum value of the signal strength is defined as the weighting factor. However, as in the embodiment 5 serving as modification of the embodiment 4, when the result of normalization is less than a predetermined threshold, truncation may be made to set the weighting factor to zero. FIG. 18 is a block diagram showing a structure of a weighting factor generating circuit 700 for the above truncation in a diversity receiver. In the drawing, reference numerals 720B, . . . , 720K mean first to (K−1)th truncating circuits. The same reference numerals are used for component parts identical with or equivalent to those in FIG. 17 showing the structure of the weighting factor generating circuit 700 in the diversity receiver according to the embodiment 9, and descriptions thereof are omitted.

In FIG. 18, among first, second, . . . , Kth highest signal strength $\Gamma_{1,i}, \Gamma_{2,i}, \ldots, \Gamma_{K,i}$ inputted into the weighting factor generating circuit 700, the second, . . . , Kth highest signal strength $\Gamma_{2,i}, \ldots, \Gamma_{K,i}$ are respectively inputted into first to (K−1)th dividers 710B, . . . , 710K. Further, the first to (K–1)th dividers 710B, . . . , 710K take as input the first highest signal strength $\Gamma_{1,i}$ serving as the maximum value of the signal strength, thereby respectively dividing the second, . . . , Kth highest signal strength $\Gamma_{2,i}, \ldots, \Gamma_{K,i}$ by the first highest signal strength $\Gamma_{1,i}$. The first to (K–1)th dividers 710B, . . . , 710K output the results of division as first to (K–1)th normalized signal strength. The first to (K–1)th normalized signal strength are respectively inputted into the first to (K–1)th truncating circuits 720B, . . . , 720K. When the inputted first to (K–1)th normalized signal strength are equal to or more than a predetermined threshold, the first to (K–1)th truncating circuits 720B, . . . , 720K directly output the first to (K–1)th normalized signal strength as first to (K–1)th weighting factors. Otherwise, when the first to (K–1)th normalized signal strength are less than the predetermined threshold, the first to (K–1)th truncating circuits 720B, . . . , 720K truncate, that is, output zero as the first to (K–1)th weighting factors. Therefore, when a value of a kth (k=1, . . . , K–1) weighting factor is defined as $W_{k,i}$ and the threshold is defined as $\delta$, $W_{k,i}$ can be given by the following expression:

$$W_{k,i} = \Gamma_{k+1,i}/\Gamma_{1,i} \quad (\Gamma_{k+1,i}/\Gamma_{1,i} \geq \delta) \quad (36)$$
$$= 0 \quad (\Gamma_{k+1,i}/\Gamma_{1,i} < \delta)$$

In such a manner, the weighting factor generating circuit 700 according to the embodiment generates and outputs the first to (K–1)th truncated weighting factors. A combined branch metric is generated by using the weighting factors. In the embodiment, as in the embodiment 5, it is thereby possible to prevent degradation in bit error rate performance even when a received signal consists of only noise and no significant signal. That is, in the embodiment, the threshold $\delta$ is set to be higher than strength of the noise, thereby setting to zero a weighting factor for a branch metric with respect to the received signal including only noise and no significant signal. Consequently, it is possible to remove a term having only the noise when the combined branch metric is generated. Therefore, it is possible to prevent a reduction in SNR even in such a case, resulting in an advantage of no degradation in bit error rate performance.

Embodiment 11

Figure 19:
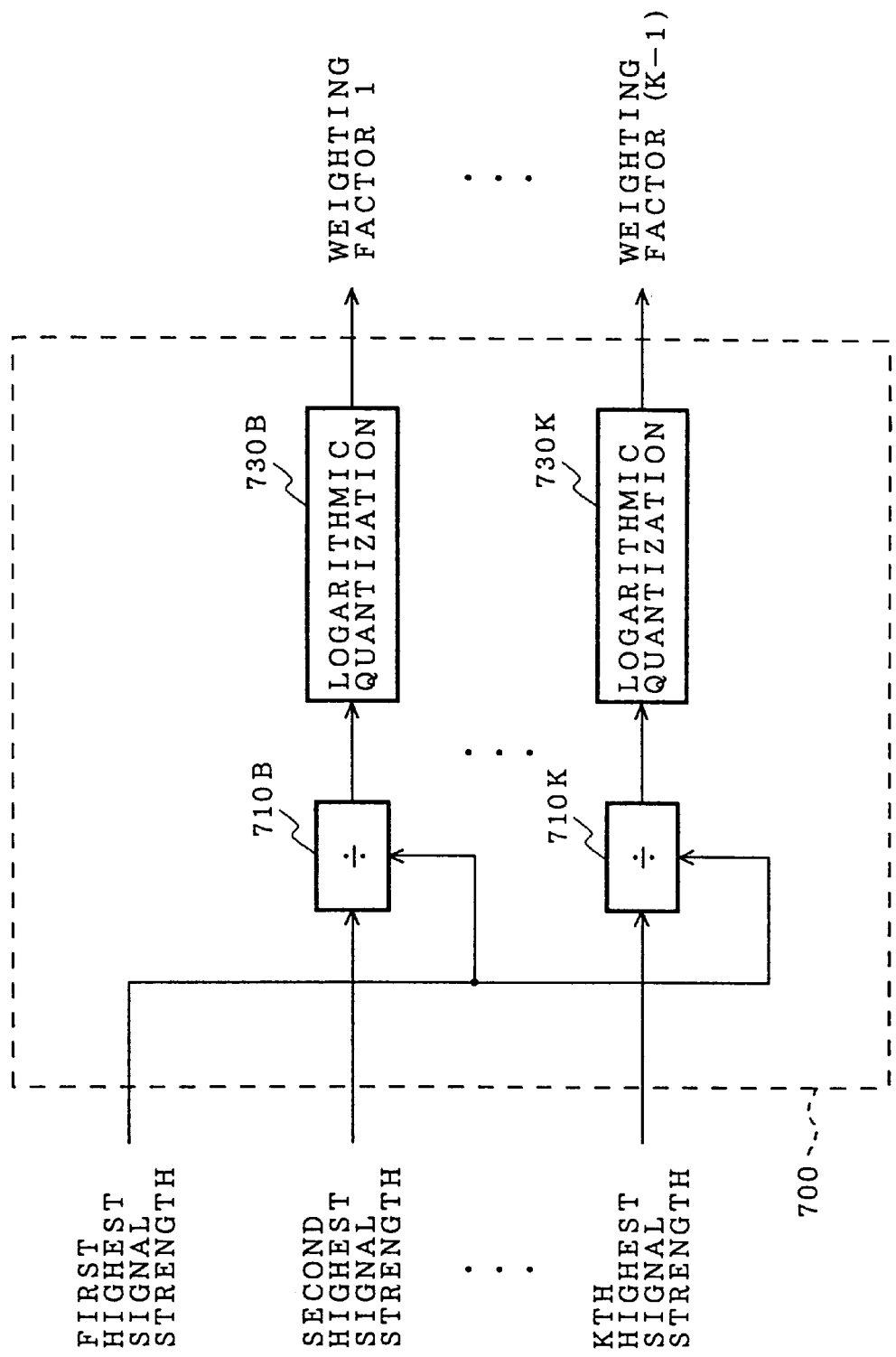
FIG. 19 is a block diagram showing another embodiment of the weighting factor generating circuit of the diversity receiver of the present invention.

Alternatively, as in the embodiment 6 serving as modification of the embodiment 4, a logarithmic quantization may be made to output values of integral powers of 2 in the vicinity of first to (K–1)th normalized signal strength as first to (K–1)th weighting factors. FIG. 19 is a block diagram showing a structure of a weighting factor generating circuit 700 for the above logarithmic quantization in a diversity receiver. In the drawing, reference numerals 730B, . . . , 730K denote first to (K–1)th logarithmic quantization circuits. The same reference numerals are used for component parts identical with or equivalent to those in FIG. 18 showing the structure of the weighting factor generating circuit 700 in the diversity receiver according to the embodiment 10, and descriptions thereof are omitted.

In FIG. 19, second to Kth highest signal strength $\Gamma_{2,i}, \ldots, \Gamma_{K,i}$ are respectively divided by the first highest signal strength $\Gamma_{1,i}$, and the results of division are outputted from first to (K–1)th dividers 710B, . . . , 710K. The first to (K–1)th normalized signal strength serving as the results of division are respectively inputted into the first to (K–1)th logarithmic quantization circuits 730B, . . . , 730K. The first to (K–1)th logarithmic quantization circuits 730B, . . . , 730K carry out the logarithmic quantization to output the values of the integral powers of 2 in the vicinity of the inputted first to (K–1)th normalized signal strength as the weighting factors. Here, when a value of the kth (k =1, . . . , K–1) weighting factor is defined as $W_{k,i}$, $W_{k,i}$ can be given by the following expressions (where $\lfloor x \rfloor$: the maximum integer not exceeding x):

$$W_{k,i} = 2^{\lfloor z+0.5 \rfloor}; \quad (37)$$
$$z = \log_2(\Gamma_{k+1,i}/\Gamma_{1,i})$$

The weighting factor generating circuit 700 according to the embodiment generates and outputs the first to (K–1)th weighting factors quantized through the logarithmic quantization in such a manner. In the embodiment, as in the embodiment 6, by using the weighting factors, it is possible to implement first to (K–1)th multipliers 320B, . . . , 320K in a combined branch metric generating circuit 130 by simple bit shift circuits. As a result, there are advantages in that the hardware size can more be reduced, and power consumption can more be reduced than would be in the embodiment 9 in which typical multipliers are required because of no logarithmic quantization.

Embodiment 12

Figure 20:
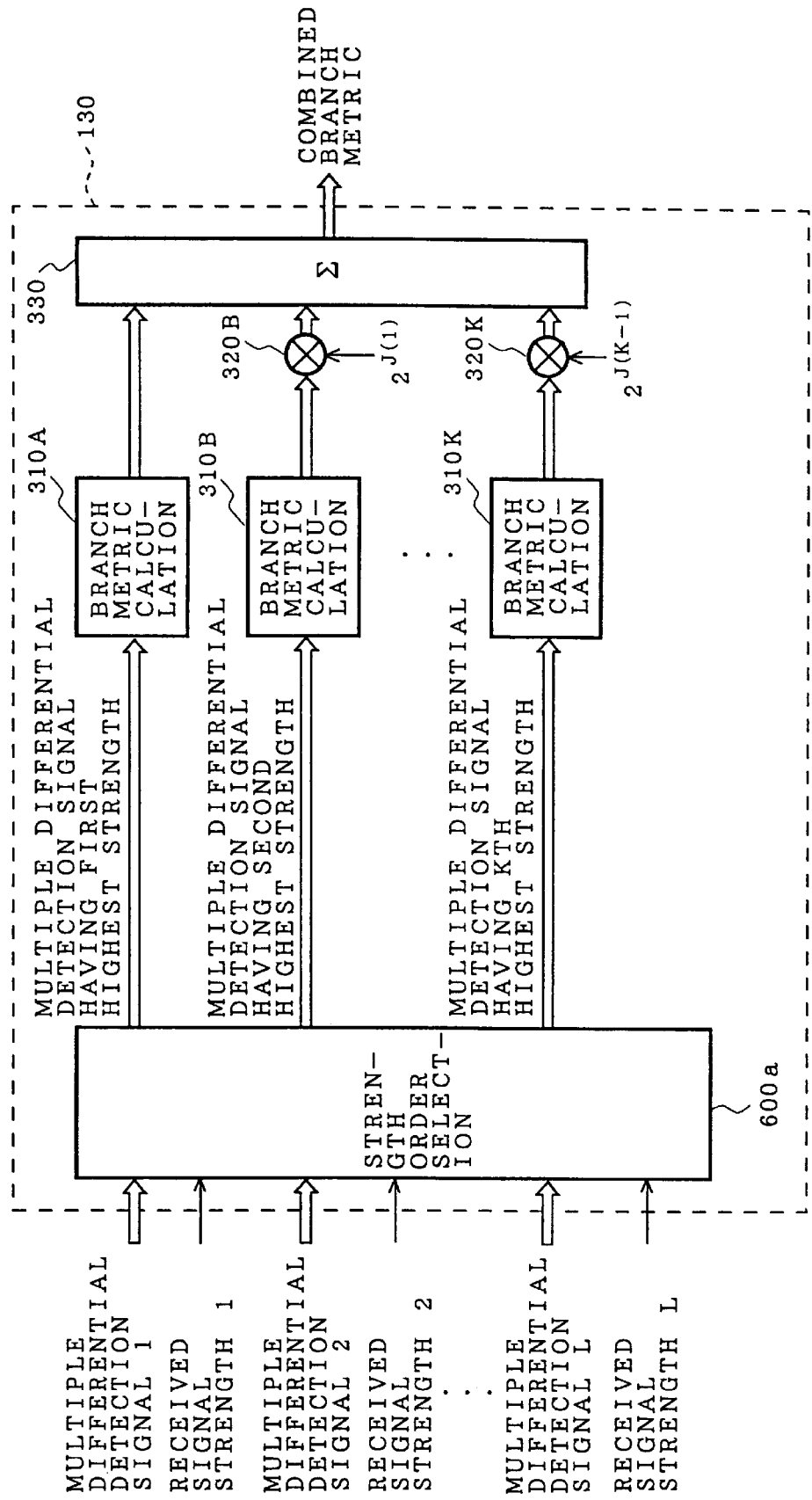
FIG. 20 is a block diagram showing another embodiment of the combined branch metric generating circuit of the diversity receiver of the present invention.

Alternatively, there may be provided a combined branch metric generating circuit 130 which performs weighted combining of branch metrics with respect to multiple differential detection signals having first, second, . . . , Kth highest strength by using as weighting factors constant values of integral powers of 2, determined by the order of magnitude of received signal strength to take values of 1 or less, and outputs the result as a combined branch metric. FIG. 20 is a block diagram showing a structure of the combined branch metric generating circuit 130 for the above signal processing. In the drawing, reference numerals 320B, . . . , 320K denote first to (K–1)th multipliers, and 600a is a strength order selecting circuit. The same reference numerals are used for component parts identical with or equivalent to those in FIG. 14 showing the structure of the combined branch metric generating circuit 130 in the diversity receiver according to the embodiment 8, and descriptions thereof are omitted.

In FIG. 20, the combined branch metric generating circuit 130 takes as input first, second to Lth multiple differential detection signals and received signal strength which are inputted into the strength order selecting circuit 600a. The strength order output circuit 600a compares the magnitude of the first, second to Lth received signal strength, and outputs multiple differential detection signals generated from received signals having first, second, . . . , Kth (K: integer of 1 or more, and less than L) highest signal strength as the multiple differential detection signals having the first, second, . . . , Kth highest strength. The strength order output circuit 600a in the embodiment differs from the strength order output circuit 600 in the embodiment 8 in that the former outputs only the multiple differential detection signal, and outputs no signal strength.

The multiple differential detection signals having the first, second, . . . , Kth highest strength outputted from the strength order selecting circuit 600a are respectively inputted into first, second to Kth branch metric calculating circuits 310A, 310B, . . . , 310K in which a calculation is made to find a branch metric as in the embodiment 1.

The second to Kth branch metric calculating circuits 310B, . . . , 310K output branch metrics with respect to the multiple differential detection signals having the second, . . . , Kth highest strength. The branch metrics are respectively inputted into the first to (K–1)th multipliers 320B, . . . , 320K, and are respectively multiplied by constants $2^{J(1)}$, . .

., $2^{J(K-1)}$ as the weighting factors (where J(k) (k=1, ..., K-1): integer of zero or less). That is, the weighting factors $2^{J(1)}, \ldots, 2^{J(K-1)}$ are limited to 1 or less.

A combining circuit 330 takes as input the branch metric with respect to the multiple differential detection signal having the first highest strength outputted from the first branch metric calculating circuit 310A, and output of the first to (K−1)th multipliers 320B, ..., 320K. The combining circuit 330 computes the sum of values corresponding to the same state transition among the branch metric with respect to the multiple differential detection signal having the first highest strength outputted from the first branch metric calculating circuit 310A, and the branch metrics with respect to the multiple differential detection signals having the second, ..., Kth highest strength weighted by the first to (K−1)th multipliers 320B, 320K. Therefore, the summation operation is executed $M^N$ times according to the total number of state transitions. The combining circuit 330 combines the results of the $M^N$ kinds of summations to output the combined result as the combined branch metric serving as output of the combined branch metric generating circuit 130.

The signal processing is equivalent to multiplication of the maximum weighting factor "1" by the branch metric with respect to the multiple differential detection signal having the first highest strength serving as the output of the first branch metric calculating circuit 310A. Here, if a value of an n-symbol (n=1, 2, ..., N) differential detection signal constituting the multiple differential detection signal having the kth (k=1, 2, ..., K) highest signal strength is defined as $\Delta\Psi_{(n)k,i}$, in the combined branch metric, a metric value $\Lambda\{B_{i,1}, B_i\}$ of a branch corresponding to a state transition from a state $B_{i,1}=(\beta_{i-(N-1)}, \beta_{i-(N-2)}, \ldots, \beta_{i-1})$ to a state $B_i=(\beta_{i-(N-2)}, \beta_{i-(N-3)}, \ldots, \beta_i)$ can be expressed by the following expression (where addition and subtraction within absolute value notations being made modulo $2\pi$, and the results of addition and subtraction being of $-\pi$ or more and less than $\pi$):

$$\Lambda_i\{B_{i-1}, B_i\} = \sum_{n=1}^{N} \left| \Delta\psi_{(n)1,i} - \sum_{j=0}^{n-1} \beta_{i-j} \right| + \sum_{k=2}^{K} 2^{J(k-1)} \sum_{n=1}^{N} \left| \Delta\psi_{(n)k,i} - \sum_{j=0}^{n-1} \beta_{i-j} \right| \quad (38)$$

The combined branch metric generating circuit 130 according to the embodiment generates and outputs the combined branch metric in such a manner. However, as set forth above, the values of the weighting factors are not directly equal to the values of the received signal strength but equal to the constant values determined by the order of their magnitude. Hence, as in the embodiment 9, degradation in bit error rate performance can be prevented from occurring due to an overflow error even when an excessive received signal is inputted. In addition, in the embodiment, it is possible to reduce the hardware size of the first to (K−1)th multipliers 320B, ..., 320K, resulting in reduction in power consumption. That is, in digital signal processing, multiplication using the integral power of 2 can be implemented by a simple bit shift operation. Hence, the first to (K−1)th multipliers 320B, ..., 320K can be implemented by bit shift circuits in which the number of shifted bits is fixed. As a result, it is possible to more reduce the hardware size, and more reduce the power consumption than would be in the embodiment 8 in which typical multipliers are required.

Figure 21:
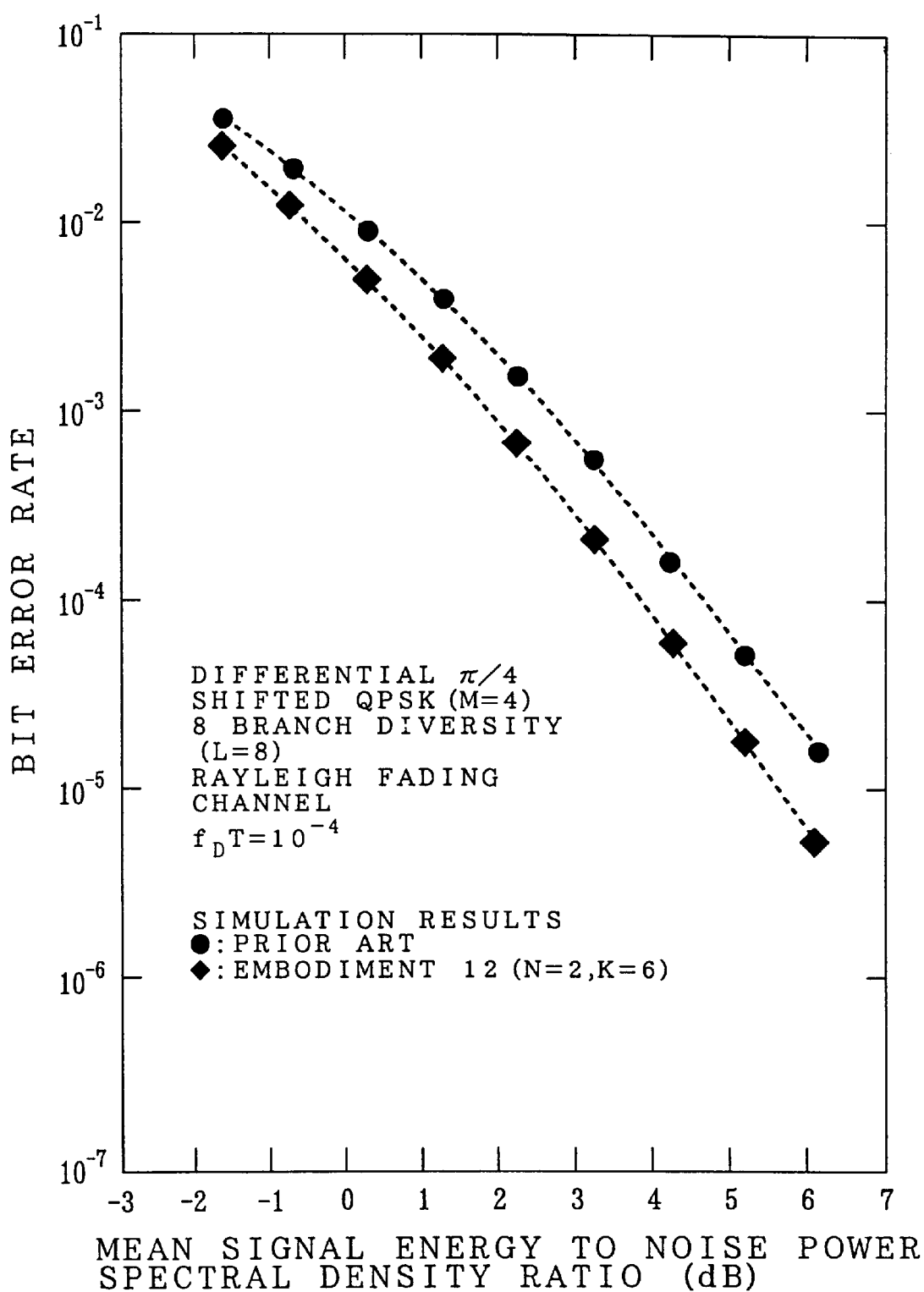
FIG. 21 is a characteristic diagram showing bit error rate performances in diversity receivers according to the prior art and the embodiment 12 depending upon computer simulation.
Figure 22:
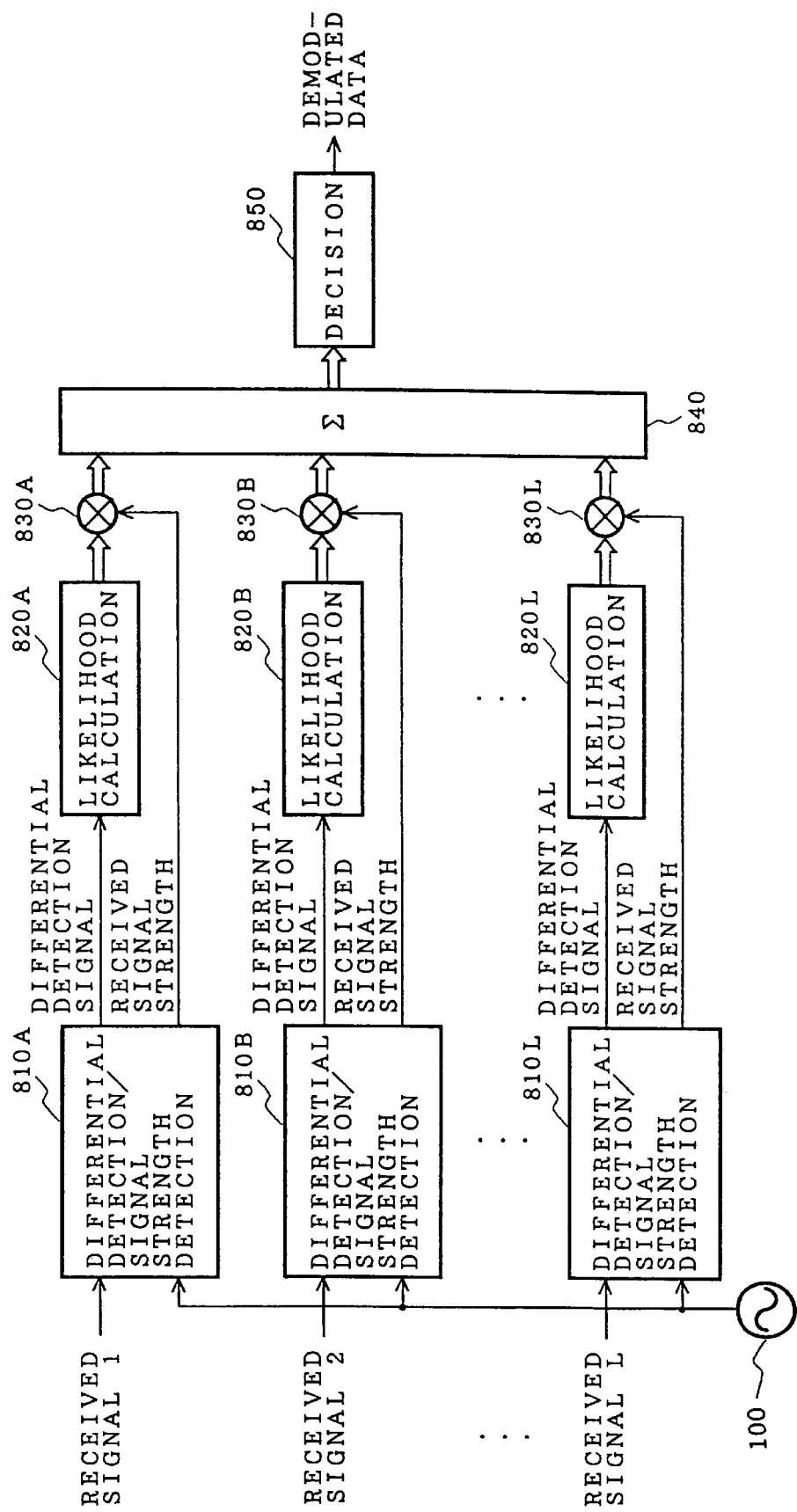
FIG. 22 is a block diagram showing a structure of a conventional diversity receiver.
Figure 23:
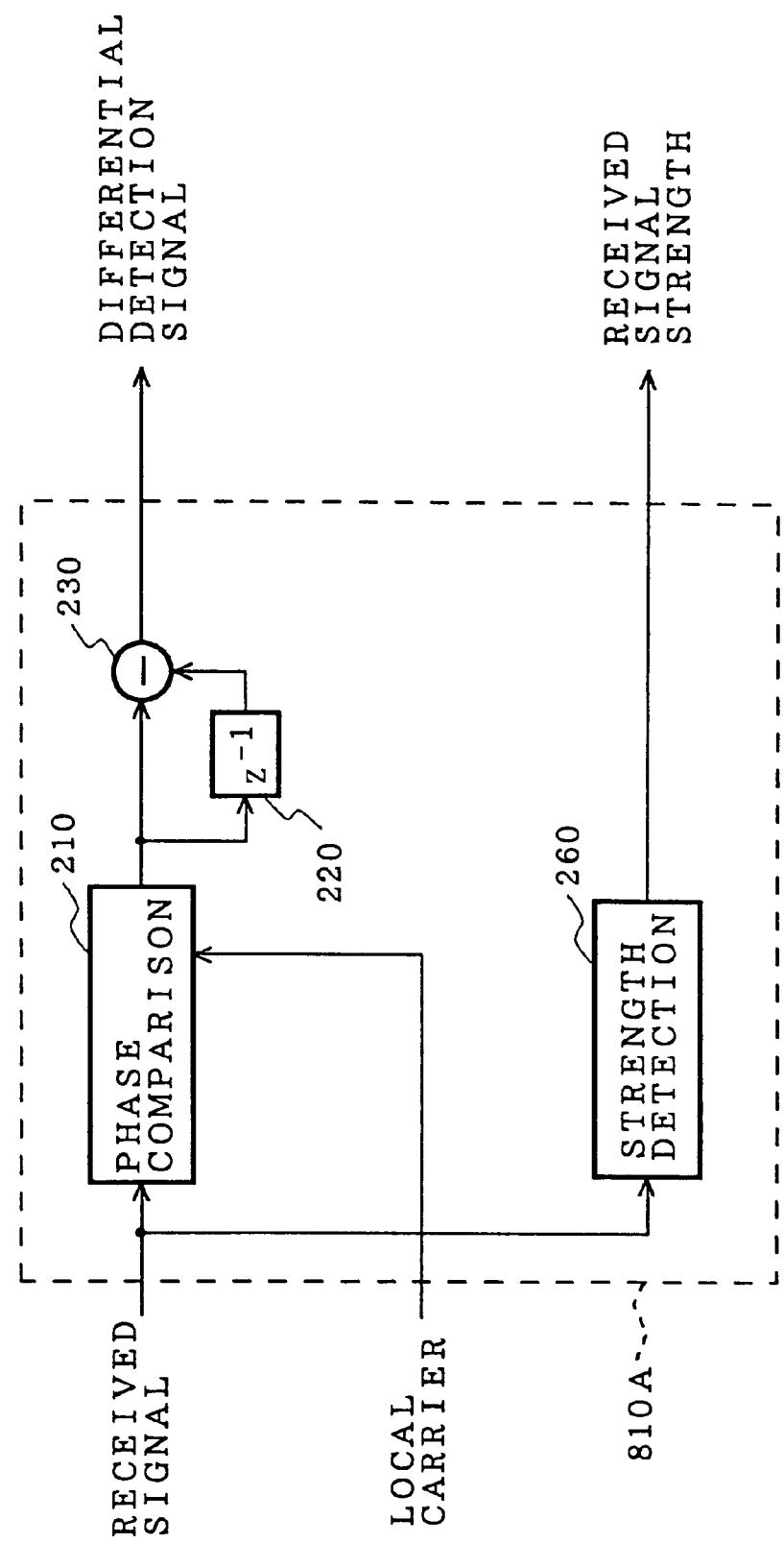
FIG. 23 is a block diagram showing a structure of a first differential detection/signal strength detecting circuit of the conventional diversity receiver.

As stated above, even when the number of received signals used to generate the combined branch metric is reduced from L to K, and simple weighting is made with the constant value of the integral power of 2 as the weighting factor, it is possible to more enhance the bit error rate performance than would be in a prior art apparatus. This is shown according to the result of computer simulation. FIG. 21 is a characteristic diagram showing bit error rate performances in diversity receivers according to the prior art and the embodiment 12 depending upon the computer simulation. Simulation conditions in FIG. 21 are identical with those in FIG. 6 except that a value K is defined as K=6 in the embodiment 12, and values of J(k) (k=1, ..., 5) are set to values shown in the following table:

TABLE 2

| k | 1 | 2 | 3 | 4 | 5 |
|---|---|---|---|---|---|
| J(k) | −1 | −1 | −1 | −2 | −2 |

From FIG. 21, it is apparent that the bit error rate performance is more enhanced in the embodiment 12 than would be in the prior art. As set forth above, even when the number of received signals used to generate the combined branch metric is reduced, and the simple weighting is made with the constant value of the integral power of 2 as the weighting factor, it is possible to provide a more excellent bit error rate performance than that in the prior art diversity receiver.

As set forth above, according to the present invention, there is provided the diversity receiver to receive and demodulate the plurality of signals including the data sequence modulated through the differential phase shift keying, having the multiple differential detection means arranged corresponding to the plurality of received signals, for generating the multiple differential detection signals obtained by multiplying the one-symbol differential detection signal serving as the difference between the current phase of the received signal and the phase preceding by the one-symbol duration, and the predetermined-symbol differential detection signal serving as the difference between the current phase of the received signal and the phase preceding by the predetermined-symbol duration, the signal strength detecting means arranged corresponding to the plurality of received signals, for detecting the signal strength of the received signals, and generating the signal strength signals corresponding to the signal strength, and the sequence estimating means for estimating the transmitted differential phase sequence by using the multiple differential detection signal and the signal strength signal generated for each of the plurality of received signals, and demodulating the data sequence. As a result, it is possible to provide the diversity receiver having the excellent bit error rate performance.

Further, according to the present invention, the sequence estimating means consists of the weighting factor generating means for calculating the weighting factor including the value of the integral power of 2 depending upon the signal strength signal in each of the plurality of received signals, and the weighting means for weighting the multiple differential detection signal depending upon the weighting factor calculated in the weighting factor generating means. Since the weighting can be made by the simple bit shift, it is possible to provide the diversity receiver in which the hardware size can be reduced, and the power consumption can also be reduced.

Further, according to the present invention, there is provided the diversity receiver including the multiple differential detection means for generating, from the first, second to Lth (L: integer of 2 or more) received signals, the 1, 2, ..., N-symbol differential detection signals serving as the differences between the current phases of the received signals and the phases preceding by the 1, 2, ..., N-symbol (N: integer of 2 or more) durations, the signal strength detecting means for generating the received signal strength corresponding to the first, second to Lth received signals, and the sequence estimating means for estimating the transmitted differential phase sequence by using the first, second to Lth 1, 2, ..., N-symbol differential detection signals outputted from the multiple differential detection means, and the first, second to Lth received signal strength outputted from the signal strength detecting means, and outputting the demodulated data sequence corresponding to the estimated value of the transmitted differential phase sequence. Further, the sequence estimating means consists of the combined branch metric generating means for, on the basis of the trellis diagram showing the state transitions between $M^{N-1}$ states obtained by the (N−1) combinations of the M (M: the number of signal point phases in the transmitted differential phase, and integer of 2 or more) signal point phases, generating the combined branch metric values corresponding to the state transitions on the trellis diagram by using the first, second to Lth 1, 2, ..., N-symbol differential detection signals, and the first, second to Lth received signal strength, the ACS means for the ACS operation on the basis of the Viterbi algorithm by using the combined branch metric values generated in the combined branch metric generating means, and the path memory means in which the path selecting signals outputted from the ACS means to serve as the results of the ACS operation, are stored. Further, the sequence estimating means estimates the transmitted differential phase sequence on the basis of the Viterbi algorithm. The combined branch metric generating means consists of the first, second to Lth branch metric calculating means for generating the branch metric values corresponding to the state transitions on the trellis diagram by using the first, second to Lth 1, 2, ..., N-symbol differential detection signals, the first, second to Lth multiplying means for multiplying the branch metric values outputted from the first, second to Lth branch metric calculating means by the first, second to Lth received signal strength, and outputting the results of multiplication as the weighted branch metric values, and the combining means for adding, among the weighted branch metric values outputted from the first, second to Lth multiplying means, the branch metric values corresponding to the same state transition, and outputting the result of addition as the combined branch metric. By using the combined branch metric to which the weighted combining is made according to the received signal strength, generated in the combined branch metric generating means, it is possible to provide the diversity effect in the process of estimation of the sequence depending upon the Viterbi algorithm.

In the branch metric values with respect to the first, second to Lth 1, 2, ..., N-symbol differential detection signals outputted from the first, second to Lth branch metric calculating means, the SNR is enhanced in the process of calculation thereof. Consequently, it is possible to provide a more excellent bit error rate performance of the demodulated data sequence corresponding to the estimated value of the transmitted differential phase sequence estimated by the sequence estimating means by using the combined branch metric value obtained by the weighted combining of the branch metric values than the bit error rate performance of the conventional diversity receiver using only the one-symbol differential detection signal. That is, according to the present invention, there is an effect in that the system can be provided for improvement of the bit error rate performance of the conventional diversity receiver.

Further, the combined branch metric generating means consists of the first, second to Lth branch metric calculating means for generating the branch metric values corresponding to the state transitions on the trellis diagram by using the first, second to Lth 1, 2, ..., N-symbol differential detection signals, the weighting factor generating means for generating the first, second to Lth weighting factors from the first, second to Lth received signal strength, the first, second to Lth multiplying means for multiplying the branch metric values outputted from the first, second to Lth branch metric calculating means by the first, second to Lth weighting factors outputted from the weighting factor generating means, and outputting the results of multiplication as the weighted branch metric values, and the combining means for adding, among the weighted branch metric values outputted from the first, second to Lth multiplying means, the branch metric values corresponding to the same state transition, and outputting the result of addition as the combined branch metric. The weighting factor generating means consists of the maximum value detecting means for detecting and outputting as the maximum signal strength the maximum value among the first, second to Lth received signal strength, and the first, second to Lth dividing means for dividing the first, second to Lth received signal strength by the maximum signal strength outputted from the maximum value detecting means, and outputting the results of division as the first, second to Lth weighting factors. Hence, the first, second to Lth weighting factors are limited to 1 or less, resulting in the following effect. That is, it is possible to provide the diversity receiver in which, even if the excessive received signal is inputted when the combined branch metric generating means consists of the digital circuits, the degradation in bit error rate performance can be prevented from occurring due to the overflow error in the first, second to Lth multiplying means or the combining means.

Further, the weighting factor generating means consists of the maximum value detecting means for detecting and outputting as the maximum signal strength the maximum value among the first, second to Lth received signal strength, the first, second to Lth dividing means for dividing the first, second to Lth received signal strength by the maximum signal strength outputted from the maximum value detecting means, and outputting the results of division as the first, second to Lth normalized signal strength, and the first, second to Lth truncating means for taking as input the first, second to Lth normalized signal strength outputted from the first, second to Lth dividing means, outputting the first, second to Lth normalized signal strength as the first, second to Lth weighting factors when the first, second to Lth normalized signal strength are equal to or more than the predetermined threshold, and outputting zero as the first, second to Lth weighting factors when the first, second to Lth normalized signal strength are less than the predetermined threshold. Hence, it is possible to generate the combined branch metric by using the weighting factor truncated in the combined branch metric generating means. As a result, it is possible to prevent the degradation in bit error rate performance even when the first, second to Lth received signals consist of only the noise and no significant signal.

That is, by setting the predetermined threshold to be higher than the strength of noise, the value of the weighting factor can be set to zero for the branch metric with respect to the received signal including only the noise and no significant signal, thereby removing the term including only the noise when the combined branch metric is generated. As a result, since the reduction in SNR does not occur even in such a case, there is an effect in that the diversity receiver can be provided in which the degradation in bit error rate performance can be prevented.

Further, the weighting factor generating means consists of the maximum value detecting means for detecting and outputting as the maximum signal strength the maximum value among the first, second to Lth received signal strength, the first, second to Lth dividing means for dividing the first, second to Lth received signal strength by the maximum signal strength outputted from the maximum value detecting means, and outputting the results of division as the first, second to Lth normalized signal strength, and the first, second to Lth logarithmic quantization means for taking as input the first, second to Lth normalized signal strength outputted from the first, second to Lth dividing means, and outputting the values of the integral powers of 2 in the vicinity of the first, second to Lth normalized signal strength as the first, second to Lth weighting factors. As a result, when the combined branch metric generating means consists of the digital circuits, it is possible to reduce the hardware size of the first, second to Lth multiplying means arranged in the combined branch metric generating means, resulting in reduction in power consumption.

That is, in the digital signal processing, the multiplication using the integral power of 2 can be implemented by the simple bit shift operation. Hence, by setting the first, second to Lth weighting factors to the values of the integral powers of 2 through the logarithmic quantization, the first, second to Lth multiplying means arranged in the combined branch metric generating means can be implemented by the simple bit shift circuits. As a result, there is an effect in that the diversity receiver can be provided in which the hardware size can more be reduced, and the power consumption can more be reduced than would be in a case where the typical multiplying means are required because of no logarithmic quantization.

Further, the combined branch metric generating means consists of the strength order output means for taking as input the first, second to Lth 1, 2, . . . , N-symbol differential detection signals and the first, second to Lth received signal strength, comparing the magnitude of the first, second to Lth received signal strength, and outputting the 1, 2, . . . , N-symbol differential detection signals generated from the received signals having the kth (k=1, 2, . . . , L) highest signal strength as the 1, 2, . . . , N-symbol differential detection signals having the kth highest strength, the first, second to Lth branch metric calculating means for generating the branch metric values corresponding to the state transitions on the trellis diagram by using the 1, 2, . . . , N-symbol differential detection signals having the first, second, . . . , Lth highest strength outputted from the strength order output means, the first to (L−1)th multiplying means for multiplying the branch metric values outputted from the second to Lth branch metric calculating means by the constants $2^{J(1)}$, . . . , $2^{J(L-1)}$ determined by J(k) (k=1, . . . , L−1) taking the integers of zero or less, and outputting the results of multiplication as the weighted branch metric values, and the combining means for adding, among the branch metric value outputted from the first branch metric calculating means and the weighted branch metric values outputted from the first to (L−1)th multiplying means, the branch metric values corresponding to the same state transition, and outputting the result of addition as the combined branch metric. The values of the weighting factors are not directly equal to the values of the received signal strength but equal to the constant values determined by the order of their magnitude. As a result, there is an effect in that the diversity receiver can be provided in which the degradation in bit error rate performance can be prevented from occurring due to the overflow error even if the excessive received signal is inputted. In addition, when the combined branch metric generating means consists of the digital circuits, it is possible to reduce the hardware size of the first to (L−1)th multiplying means arranged in the combined branch metric generating means, resulting in reduction in power consumption.

That is, in the digital signal processing, the multiplication using the integral power of 2 can be implemented by the simple bit shift operation. Hence, the first to (L−1)th multiplying means can be implemented by the bit shift circuits in which the number of shifted bits is fixed. As a result, there is an effect in that the diversity receiver can be provided in which the hardware size can be reduced to reduce the power consumption.

Further, the combined branch metric generating means consists of the strength order selecting means for taking as input the first, second to Lth 1, 2, . . . , N-symbol differential detection signals and the first, second to Lth received signal strength, comparing the magnitude of the first, second to Lth received signal strength to select and output the first to Kth (K: integer of 1 or more, and less than L) highest signal strength as the first, second, . . . , Kth highest signal strength, and output the 1, 2, . . . , N-symbol differential detection signals generated from the received signals having the kth (k=1, 2, . . . , K) highest signal strength as the 1, 2, . . . , N-symbol differential detection signals having the kth highest strength, the first, second to Kth branch metric calculating means for generating the branch metric values corresponding to the state transitions on the trellis diagram by using the 1, 2, . . . , N-symbol differential detection signals having the first, second, . . . , Kth highest strength outputted from the strength order selecting means, the first, second to Kth multiplying means for multiplying the branch metric values outputted from the first, second to Kth branch metric calculating means by the first, second, . . . , Kth highest signal strength, and outputting the results of multiplication as the weighted branch metric values, and the combining means for adding, among the weighted branch metric values outputted from the first, second to Kth multiplying means, the branch metric values corresponding to the same state transition, and outputting the result of addition as the combined branch metric. Thus, the number of branch metric calculating means and multiplying means can be reduced from L to K. As a result, there is an effect in that the diversity receiver can be provided in which the hardware size can be reduced to reduce the power consumption.

Further, the combined branch metric generating means consists of the strength order selecting means for taking as input the first, second to Lth 1, 2, . . . , N-symbol differential detection signals and the first, second to Lth received signal strength, comparing the magnitude of the first, second to Lth received signal strength to select and output the first to Kth (K: integer of 1 or more, and less than L) highest signal strength as the first, second, . . . , Kth highest strength, and output the 1, 2, . . . , N-symbol differential detection signals generated from the received signals having the kth (k=1, 2, . . . , K) highest signal strength as the 1, 2, . . . , N-symbol differential detection signals having the kth highest strength, the first, second to Kth branch metric calculating means for generating the branch metric values corresponding to the state transitions on the trellis diagram by using the 1, 2, . . . , N-symbol differential detection signals having the first, second, . . . , Kth highest strength outputted from the strength order selecting means, the weighting factor generating means for generating the first to (K−1)th weighting factors from the first, second, . . . , Kth highest signal strength, the first to (K−1)th multiplying means for multiplying the branch metric values outputted from the second to Kth branch metric calculating means by the first to (K−1)th weighting factors outputted from the weighting factor generating means, and outputting the results of multiplication as the weighted branch metric values, and the combining means for adding, among the branch metric value outputted from the first branch metric calculating means and the weighted branch metric values outputted from the first to (K−1)th multiplying means, the branch metric values corresponding to the same state transition, and outputting the result of addition as the combined branch metric. Further, the weighting factor generating means consists of the first to (K−1)th dividing means for dividing the second, . . . , Kth highest signal strength by the first highest signal strength, and outputting the results of division as the first to (K−1)th weighting factors. The first to (K−1)th weighting factors are limited to 1 or less, resulting in the following effect. That is, it is possible to provide the diversity receiver in which, even if the excessive received signal is inputted when the combined branch metric generating means consists of the digital circuits, the degradation in bit error rate performance can be prevented from occurring due to the overflow error in the first to (K−1)th multiplying means or the combining means.

The weighting factor generating means consists of the first to (K−1)th dividing means for dividing the second, . . . , Kth highest signal strength by the first highest signal strength, and outputting the results of division as the first to (K−1)th normalized signal strength, and the first to (K−1)th truncating means for taking as input the first to (K−1)th normalized signal strength outputted from the first to (K−1)th dividing means, outputting the first to (K−1)th normalized signal strength as the first to (K−1)th weighting factors when the first to (K−1)th normalized signal strength are equal to or more than the predetermined threshold, and outputting zero as the first to (K−1)th weighting factors when the first to (K−1)th normalized signal strength are less than the predetermined threshold. It is possible to generate the combined branch metric by using the weighting factor truncated in the combined branch metric generating means. As a result, it is possible to prevent the degradation in bit error rate performance even when the first, second to Lth received signals consist of only the noise and no significant signal.

That is, by setting the predetermined threshold to be higher than the strength of noise, the value of the weighting factor can be set to zero for the branch metric with respect to the received signal including only the noise and no significant signal, thereby removing the term including only the noise when the combined branch metric is generated. As a result, since the reduction in SNR does not occur even in such a case, there is an effect in that the diversity receiver can be provided in which the degradation in bit error rate performance can be prevented.

The weighting factor generating means consists of the first to (K−1)th dividing means for dividing the second, . . . , Kth highest signal strength by the first highest signal strength, and outputting the results of division as the first to (K−1)th normalized signal strength, and the first to (K−1)th logarithmic quantization means for taking as input the first to (K−1)th normalized signal strength outputted from the first to (K−1)th dividing means, and outputting the values of the integral powers of 2 in the vicinity of the first to (K−1)th normalized signal strength as the first to (K−1)th weighting factors. Consequently, when the combined branch metric generating means consists of the digital circuits, it is possible to reduce the hardware size of the first to (K−1)th multiplying means arranged in the combined branch metric generating means, resulting in reduction in power consumption.

That is, in the digital signal processing, the multiplication using the integral power of 2 can be implemented by the simple bit shift operation. Hence, by setting the first to (K−1)th weighting factors to the values of the integral powers of 2 through the logarithmic quantization, the first to (K−1)th multiplying means arranged in the combined branch metric generating means can be implemented by the simple bit shift circuits. As a result, there is an effect in that the diversity receiver can be provided in which the hardware size can more be reduced, and the power consumption can more be reduced than would be in a case where typical multiplying means are required because of no logarithmic quantization.

Further, the combined branch metric generating means consists of the strength order selecting means for taking as input the first, second to Lth 1, 2, . . . , N-symbol differential detection signals and the first, second to Lth received signal strength, comparing the magnitude of the first, second to Lth received signal strength to select and output the 1, 2, . . . , N-symbol differential detection signals generated from the received signals having the first, second, . . . , Kth (K: integer of 1 or more, and less than L) highest signal strength as the 1, 2, . . . , N-symbol differential detection signals having the first, second, . . . , Kth highest strength, the first, second to Kth branch metric calculating means for generating the branch metric values corresponding to the state transitions on the trellis diagram by using the 1, 2, . . . , N-symbol differential detection signals having the first, second, . . . , Kth highest strength outputted from the strength order selecting means, the first to (K−1)th multiplying means for multiplying the branch metric values outputted from the second to Kth branch metric calculating means by the constants $2^{J(1)}, \ldots, 2^{J(K-1)}$ determined by J(k) (k=1, . . . , K−1) taking the integers of zero or less, and outputting the results of multiplication as the weighted branch metric values, and the combining means for adding, among the branch metric value outputted from the first branch metric calculating means and the weighted branch metric values outputted from the first to (K−1)th multiplying means, the branch metric values corresponding to the same state transition, and outputting the result of addition as the combined branch metric. Consequently, the values of the weighting factors are not directly equal to the values of the received signal strength but equal to the constant values determined by the order of their magnitude. As a result, there is an effect in that the diversity receiver can be provided in which the degradation in bit error rate performance can be prevented from occurring due to the overflow error even if the excessive received signal is inputted.

In addition, when the combined branch metric generating means consists of the digital circuits, it is possible to reduce the hardware size of the first to (K−1)th multiplying means arranged in the combined branch metric generating means, resulting in reduction in power consumption. That is, in the digital signal processing, the multiplication using the integral power of 2 can be implemented by the simple bit shift operation. Hence, the first to (K−1)th multiplying means can be implemented by the bit shift circuits in which the number of shifted bits is fixed. As a result, there is an effect in that the diversity receiver can be provided in which the hardware size can more be reduced to more reduce the power consumption.

While preferred embodiments of the invention have been described using specific terms, such description is for illustrative purposes only, and it is to be understood that changes and variations may be made without departing from the spirit or scope of the following claims.

What is claimed is:

1. A diversity receiver for receiving and demodulating a plurality of signals, said diversity receiver comprising:

multiple differential detection means, arranged corresponding to the plurality of received signals, for generating for each received signal a multiple differential detection signal by combining a one-symbol differential detection signal which represents a difference between a current phase of the received signal and a phase preceding the current phase by a one-symbol duration, and a predetermined-symbol differential detection signal which represents a difference between the current phase of the received signal and a phase preceding the current phase by a predetermined-symbol duration;

signal strength detecting means, arranged corresponding to the plurality of received signals, for detecting signal strength of the received signals, and generating signal strength signals respectively corresponding to the signal strength of the received signals; and sequence estimating means for estimating a transmitted differential phase sequence by using the multiple differential detection signal and the signal strength signal generated for each of the plurality of received signals, and demodulating the data sequence.

2. A diversity receiver according to claim 1, wherein said sequence estimating means includes:

weighting factor generating means for calculating a weighting factor including a value of integral power of 2 depending upon the signal strength signal in each of the plurality of received signals; and weighting means for weighting the multiple differential detection signals depending upon the weighting factors calculated by said weighting factor generating means.

3. A diversity receiver according to claim 1, wherein said signal strength detecting means generates values of the uth (u: real number of zero or more) powers of amplitude of the received signals as the received signal strength.

4. A diversity receiver comprising:

multiple differential detection means for generating, for each of first, second to Lth (L: integer of 2 or more) received signals, a . . . , N-symbol (N: integer of 2 or more differential detection signal which represents differences between a current phase of the received signals and phases preceding the current phase by . . . , N-symbol duration;

signal strength detecting means for generating received signal strength signals corresponding to the first, second to Lth received signals; and sequence estimating means for estimating a transmitted differential phase sequence by using the first, second to Lth 1, 2, . . . , N-symbol differential detection signals outputted from said multiple differential detection means, and the first, second to Lth received signal strength signals outputted from said signal strength detecting means, and outputting a demodulated data sequence corresponding to an estimated value of the transmitted differential phase sequence.

5. A diversity receiver according to claim 4, wherein said signal strength detecting means generates values of the uth (u: real number of zero or more) powers of amplitude of the received signals as the received signal singals.

6. A diversity receiver according to claim 4, wherein said sequence estimating means comprises:

combined branch metric generating means for, on the basis of a trellis diagram showing state transitions between $M^{N-1}$ states obtained by (N-1) combinations of M (M: the number of signal point phases in a transmitted differential phase, and integer of 2 or more) signal point phases, generating combined branch metric values corresponding to the state transitions on the trellis diagram by using the first, second to Lth 1, 2, . . . , N-symbol differential detection signals, and the first, second to Lth received signal strength signals;

ACS means for performing an Add-Compare-Select operation on the basis of Viterbi algorithm by using the combined branch metric values generated in said combined branch metric generating means; and path memory means in which path selecting signals outputted from said ACS means to serve as the results of the ACS operation, are stored, and wherein said sequence estimating means estimates the transmitted differential phase sequence on the basis of the Viterbi algorithm.

7. A diversity receiver according to claim 6, wherein said combined branch metric generating means comprises:

first, second to Lth branch metric calculating means for generating branch metric values corresponding to the state transitions on the trellis diagram by using the first, second to Lth 1, 2, . . . , N-symbol differential detection signals;

first, second to Lth multiplying means for multiplying the branch metric values outputted from said first, second to Lth branch metric calculating means by the first, second to said received signal strength signals, and outputting the results of multiplication as weighted branch metric values; and combining means for adding, among the weighted branch metric values outputted from said first, second to Lth multiplying means, the branch metric values corresponding to the same state transition, and outputting the result of addition as a combined branch metric.

8. A diversity receiver according to claim 6, wherein the combined branch metric generating means comprises:

first, second to Lth branch metric calculating means for generating the branch metric values corresponding to the state transitions on the trellis diagram by using the first, second to Lth 1, 2, . . . , N-symbol differential detection signals;

weighting factor generating means for generating first, second to Lth weighting factors from the first, second to Lth received signal strength signals;

first, second to Lth multiplying means for multiplying the branch metric values outputted from said first, second to Lth branch metric calculating means by the first, second to Lth weighting factors outputted from said weighting factor generating means, and outputting the results of multiplication as weighted branch metric values; and combining means for adding, among the weighted branch metric values outputted from the first, second to Lth multiplying means, said branch metric values corresponding to the same state transition, and outputting the result of addition as a combined branch metric.

9. A diversity receiver according to claim 8, wherein the weighting factor generating means comprises:

maximum value detecting means for detecting and outputting as the maximum signal strength signal the maximum value among the first, second to Lth received signal strength signal; and first, second to Lth dividing means for dividing the first, second to Lth received signal strength signal by the maximum signal strength signal outputted from said maximum value detecting means, and outputting the results of division as the first, second to Lth weighting factors.

10. A diversity receiver according to claim 8, wherein said weighting factor generating means comprises:

maximum value detecting means for detecting and outputting as the maximum signal strength signal the maximum value among the first, second to Lth received signal strength signals;

first, second to Lth dividing means for dividing the first, second to Lth received signal strength signals by the maximum signal strength outputted from said maximum value detecting means, and outputting the results of division as first, second to Lth normalized received signal strength signals; and first, second to Lth truncating means for taking as input the first, second to Lth normalized received signal strength signals outputted from said first, second to Lth dividing means, outputting the first, second to Lth normalized received signal strength signals as the first, second to Lth weighting factors when the first, second to Lth normalized received signal strength signals are equal to or more than a predetermined threshold, and outputting zero as the first, second to Lth weighting factors when the first, second to Lth normalized received signal strength signals are less than the predetermined threshold.

11. A diversity receiver according to claim 8, wherein said weighting factor generating means comprises:

maximum value detecting means for detecting and outputting as the maximum signal strength signal the maximum value among the first, second to Lth received signal strength signals;

first, second to Lth dividing means for dividing the first, second to Lth received signal strength signals by the maximum signal strength signal outputted from said maximum value detecting means, and outputting the results of division as first, second to Lth normalized received signal strength signals; and first, second to Lth logarithmic quantization means for taking as input the first, second to Lth normalized received signal strength signals outputted from said first, second to Lth dividing means, and outputting values of integral powers of 2 in the vicinity of the first, second to Lth normalized received signal strength signals as the first, second to Lth weighting factors.

12. A diversity receiver according to claim 6, wherein the combined branch metric generating means comprises:

strength order output means for taking as input the first, second to Lth 1, 2, ..., N-symbol differential detection signals and the first, second to Lth received signal strength signals, comparing the magnitude of the first, second to Lth received signal strength signals, and outputting 1, 2, ..., N-symbol differential detection signals generated from the received signals having kth (k=1, 2, ..., L) highest signal strength as 1, 2, ..., N-symbol differential detection signals having kth highest strength;

first, second to Lth branch metric calculating means for generating branch metric values corresponding to the state transitions on the trellis diagram by using 1, 2, . ., N-symbol differential detection signals having first, second, ..., Lth highest strength outputted from said strength order output means;

first to (L−1)th multiplying means for multiplying the branch metric values outputted from said second to Lth branch metric calculating means by constants $2^{J(1)}$, . . ., $2^{J(L-1)}$ determined by J(k) (k=1, ..., L−1) taking integers of zero or less, and outputting the results of multiplication as weighted branch metric values; and combining means for adding, among the branch metric value outputted from said first branch metric calculating means and the weighted branch metric values outputted from the first to (L−1)th multiplying means, the branch metric values corresponding to the same state transition, and outputting the result of addition as a combined branch metric.

13. A diversity receiver according to claim 6, wherein said combined branch metric generating means comprises:

strength order selecting means for taking as input the first, second to Lth 1, 2, ..., N-symbol differential detection signals and the first, second to Lth received signal strength signals, comparing the magnitude of the first, second to Lth received signal strength signals to select and output first to Kth (K: integer of 1 or more, and less than L) highest signal strength signals as first, second, ..., Kth highest signal strength signals, and output 1, 2, ..., N-symbol differential detection signals generated from received signals having kth (k =1, 2, ..., K) highest signal strength as 1, 2, ..., N-symbol differential detection signals having kth highest strength;

first, second to Kth branch metric calculating means for generating branch metric values corresponding to the state transitions on the trellis diagram by using 1, 2, . ., N-symbol differential detection signals having first, second, ..., Kth highest strength signals outputted from said strength order selecting means;

first, second to Kth multiplying means for multiplying the branch metric values outputted from said first, second to Kth branch metric calculating means by the first, second, ..., Kth highest signal strength signals, and outputting the results of multiplication as weighted branch metric values; and combining means for adding, among the weighted branch metric values outputted from said first, second to Kth multiplying means, the branch metric values corresponding to the same state transition, and outputting the result of addition as a combined branch metric.

14. A diversity receiver according to claim 6, wherein the combined branch metric generating means comprises:

strength order selecting means for taking as input the first, second to Lth 1, 2, ..., N-symbol differential detection signals and the first, second to Lth received signal strength signals, comparing the magnitude of the first, second to Lth received signal strength signals to select and output first to Kth (K: integer of 1 or more, and less than L) highest signal strength signals as first, second, ..., Kth highest signal strength signals, and output 1, 2, ..., N-symbol differential detection signals generated from received signals having kth (k=1, 2, ..., K) highest signal strength as 1, 2, ..., N-symbol differential detection signals having kth highest strength;

first, second to Kth branch metric calculating means for generating branch metric values corresponding to the state transitions on the trellis diagram by using 1, 2, . ., N-symbol differential detection signals having first, second, ..., Kth highest strength outputted from said strength order selecting means;

weighting factor generating means for generating first to (K−1)th weighting factors from the first, second, . . . , Kth highest signal strength signals;

first to (K−1)th multiplying means for multiplying the branch metric values outputted from said second to Kth branch metric calculating means by the first to (K−1)th weighting factors outputted from said weighting factor generating means, and outputting the results of multiplication as weighted branch metric values; and combining means for adding, among the branch metric value outputted from said first branch metric calculating means and the weighted branch metric values outputted from said first to (K−1)th multiplying means, the branch metric values corresponding to the same state transition, and outputting the result of addition as a combined branch metric.

15. A diversity receiver according to claim 14, wherein the weighting factor generating means comprises first to (K−1)th dividing means for dividing the second, . . . , Kth highest signal strength by the first highest signal strength, and outputting the results of division as the first to (K−1)th weighting factors.

16. A diversity receiver according to claim 14, wherein the weighting factor generating means comprises:

first to (K−1)th dividing means for dividing the second, . . . , Kth highest signal strength signals by the first highest signal strength signals, and outputting the results of division as first to (K−1)th normalized signal strength signals; and first to (K−1)th truncating means for taking as input the first to (K−1)th normalized signal strength outputted from the first to (K−1)th dividing means, outputting the first to (K−1)th normalized signal strength as the first to (K−1)th weighting factors when the first to (K−1)th normalized signal strength signals are equal to or more than a predetermined threshold, and outputting zero as the first to (K−1)th weighting factors when the first to (K−1)th normalized signal strength signals are less than the predetermined threshold.

17. A diversity receiver according to claim 14, wherein said weighting factor generating means comprises:

first to (K−1)th dividing means for dividing the second, . . . , Kth highest signal strength signals by the first highest signal strength signals, and outputting the results of division as the first to (K−1)th normalized signal strength signals; and first to (K−1)th logarithmic quantization means for taking as input the first to (K−1)th normalized signal strength signals outputted from said first to (K−1)th dividing means, and outputting values of integral powers of 2 in the vicinity of the first to (K−1)th normalized signal strength signals as the first to (K−1)th weighting factors.

18. A diversity receiver according to claim 6, wherein said combined branch metric generating means comprises:

strength order selecting means for taking as input the first, second to Lth 1, 2, . . . , N-symbol differential detection signals and the first, second to Lth received signal strength signals, comparing the magnitude of the first, second to Lth received signal strength signals to select and output 1, 2, . . . , N-symbol differential detection signals generated from received signals having first, second, . . . , Kth (K: integer of 1 or more, and less than L) highest signal strength signals as 1, 2, . . . , N-symbol differential detection signals having first, second, . . . , Kth highest strength;

first, second to Kth branch metric calculating means for generating branch metric values corresponding to the state transitions on the trellis diagram by using the 1, 2, . . . , N-symbol differential detection signals having the first, second, . . . , Kth highest strength signals outputted from said strength order selecting means;

first to (K−1)th multiplying means for multiplying the branch metric values outputted from said second to Kth branch metric calculating means by constants $2^{J(1)}$, . . . , $2^{J(K-1)}$ determined by J(k) (k=1, . . . , K−1) taking integers of zero or less, and outputting the multiplication results as weighted branch metric values; and combining means for adding, among the branch metric value outputted from said first branch metric calculating means and the weighted branch metric values outputted from said first to (K−1)th multiplying means, the branch metric values corresponding to the same state transition, and outputting the result of addition as a combined branch metric.

19. A diversity receiving method for receiving and demodulating a plurality of signals, said method comprising:

receiving a plurality of signals;

generating for each received signal a multiple differential detection signal by combining a one-symbol differential detection signal which represents a difference between a current phase of the received signal and a phase preceding the current phase by a one-symbol duration, and a predetermined-symbol differential detection signal which represents a difference between the current phase of the received signal and a phase preceding the current phase by a predetermined-symbol duration;

detecting signal strength of the received signals, and generating signal strength signals respectively corresponding to the signal strength of the received signals; and estimating a transmitted differential phase sequence by using the multiple differential detection signal and the signal strength signal generated for each of the plurality of received signals, and demodulating the data sequence.

20. A method according to claim 19, wherein said estimating step includes:

calculating a weighting factor, including a value of integral power of 2, based on the signal strength signal for each of the plurality of received signals; and weighting the multiple differential detection signals based on the calculated weighting factors.

21. A method according to claim 19, wherein said signal strength detecting step generates values of the uth (u: real number of zero or more) powers of amplitude of the received signals as the received signal strength.

22. A diversity receiving method comprising:

generating for each of first, second to Lth (L: integer of 2 or more) received signals a . . . , N-symbol (N: integer of 2 or more) differential detection signal which represents differences between a current phase of the received signal and phases preceding the current phases by . . . , N-symbol duration;

generating received signal strength signals corresponding to the first, second to Lth received signals; and estimating a transmitted differential phase sequence by using the first, second to Lth 1, 2, . . . , N-symbol differential detection signals, and the first, second to Lth received signal strength signals, and outputting a demodulated data sequence corresponding to an estimated value of the transmitted differential phase sequence.

23. A method according to claim 22, wherein said signal strength detecting step generates values of uth (u: real number of zero or more) powers of amplitude of the received signals as the received signal strength signals.

24. A diversity receiver method according to claim 22, wherein said estimating step comprises:

generating, on the basis of a trellis diagram showing state transitions between $M^{N-1}$ states obtained by (N−1) combinations of M (M: the number of signal point phases in a transmitted differential phase, and integer of 2 or more) signal point phases, combined branch metric values corresponding to the state transitions on the trellis diagram by using the first, second to Lth 1, 2, . . . , N-symbol differential detection signals, and the first, second to Lth received signal strength signals;

performing an Add-Compare-Select operation on the basis of the Viterbi algorithm by using the combined branch metric values; and storing path selecting signals output as a result of said Add-Compare-Select operation, and wherein said sequence estimating step estimates the transmitted differential phase sequence on the basis of the Viterbi algorithm.

25. The method according to claim 24, wherein said combined branch metric generating step includes:

generating branch metric values corresponding to the state transitions on the trellis diagram by using the first, second to Lth 1, 2, . . . , N-symbol differential detection signals;

multiplying the branch metric values by the first, second to Lth received signal strength signals, and outputting the results of multiplication as weighted branch metric values; and adding, among the weighted branch metric values, the branch metric values corresponding to the same state transition, and outputting the result of addition as a combined branch metric.

26. A method according to claim 24, wherein said combined branch metric generating step includes:

generating branch metric values corresponding to the state transitions on the trellis diagram by using the first, second to Lth 1, 2, . . . , N-symbol differential detection signals;

generating first, second to Lth weighting factors from the first, second to Lth received signal strength signals;

multiplying the branch metric values by the first, second to Lth weighting factors, and outputting the results of multiplication as weighted branch metric values; and adding, among the weighted branch metric values, the branch metric values corresponding to the same state transition, and outputting the result of addition as a combined branch metric.

27. A method according to claim 26, wherein said weighting factor generating step comprises:

detecting and outputting as the maximum strength signal the maximum value among the first, second to Lth received signal strength signals; and dividing the first, second to Lth received signal strength signals by the maximum signal strength signal, and outputting the results of division as the first, second to Lth weighting factors.

28. A method according to claim 26, wherein said weighting factor generating step includes:

detecting and outputting as the maximum signal strength signal the maximum value among the first, second to Lth received signal strength signals;

dividing the first, second to Lth received signal strength signals by the maximum signal strength, and outputting the results of division as first, second to Lth normalized received signal strength signals; and taking as input the first, second to Lth normalized received signal strength signals, outputting the first, second to Lth normalized received signal strength signals as the first, second to Lth weighting factors when the first, second to Lth normalized received signal strength signals are equal to or more than a predetermined threshold, and outputting zero as the first, second to Lth weighting factors when the first, second to Lth normalized received signal strength signals are less than the predetermined threshold.

29. A method according to claim 26, wherein said weighting factor generating step includes:

detecting and outputting as the maximum signal strength signal the maximum value among the first, second to Lth received signal strength signals;

dividing the first, second to Lth received signal strength signals by the maximum signal strength signal, and outputting the results of division as first, second to Lth normalized received signal strength signals; and taking as input the first, second to Lth normalized received signal strength signals, and outputting values of integral powers of 2 in the vicinity of the first, second to Lth normalized received signal strength signals as the first, second to Lth weighting factors.

30. A method according to claim 24, wherein the combined branch metric generating step includes:

taking as input the first, second to Lth 1, 2, . . . , N-symbol differential detection signals and the first, second to Lth received signal strength signals, comparing the magnitude of the first, second to Lth received signal strength signals, and outputting 1, 2, . . . , N-symbol differential detection signals generated from the received signals having kth (k=1, 2, . . . , L) highest signal strength as 1, 2, . . . , N-symbol differential detection signals having kth highest strength;

generating branch metric values corresponding to the state transitions on the trellis diagram by using 1, 2, . . . , N-symbol differential detection signals having first, second, . . . , Lth highest strength;

multiplying the branch metric values by constants $2^{J(1)}$, . . . , $2^{J(L-1)}$ determined by J(k) (k=1, . . . , L−1) taking integers of zero or less, and outputting the results of multiplication as weighted branch metric values; and adding, among the branch metric values and the weighted branch metric values, the branch metric values corresponding to the same state transition, and outputting the result of addition as a combined branch metric.

31. A method according to claim 24, wherein said combined branch metric generating step includes:

taking as input the first, second to Lth 1, 2, . . . , N-symbol differential detection signals and the first, second to Lth received signal strength signals, comparing magnitudes of the first, second to Lth received signal strength signals to select and output first to Kth (K: integer of 1 or more, and less than L) highest signal strength signals as first, second, . . . , Kth highest signal strength signals, and output 1, 2, . . . , N-symbol differential detection signals generated from received signals having kth (k=1, 2, . . . , K) highest signal strength as 1, 2, . . . , N-symbol differential detection signals having kth highest strength;

generating branch metric values corresponding to the state transitions on the trellis diagram by using 1, 2, . . . , N-symbol differential detection signals having first, second, . . . , Kth highest strength signals output by said strength order selecting step;

multiplying the branch metric values by the first, second, . . . , Kth highest signal strength signals, and outputting the results of multiplication as weighted branch metric values; and adding, among the weighted branch metric values, the branch metric values corresponding to the same state transition, and outputting the result of addition as a combined branch metric.

32. A method according to claim 24, wherein the combined branch metric generating step includes:

taking as input the first, second to Lth 1, 2, . . . , N-symbol differential detection signals and the first, second to Lth received signal strength signals, comparing the magnitude of the first, second to Lth received signal strength signals to select and output first to Kth (K: integer of 1 or more, and less than L) highest signal strength signals as first, second, . . . , Kth highest signal strength signals, and output 1, 2, . . . , N-symbol differential detection signals generated from received signals having kth (k=1, 2, . . . , K) highest signal strength as 1, 2, . . . , N-symbol differential detection signals having kth highest strength;

generating branch metric values corresponding to the state transitions on the trellis diagram by using 1, 2, . . . , N-symbol differential detection signals having first, second, . . . , Kth highest strength;

generating first to (K−1)th weighting factors from the first, second, . . . , Kth highest signal strength signals;

multiplying the branch metric values by the first to (K−1)th weighting factors, and outputting the results of multiplication as weighted branch metric values; and adding, among the branch metric value and the weighted branch metric values, the branch metric values corresponding to the same state transition, and outputting the result of addition as a combined branch metric.

33. A method according to claim 32, wherein said weighting factor generating step comprising:

dividing the second, . . . , Kth highest signal strength by the first highest signal strength, and outputting the results of division as the first to (K−1)th weighting factors.

34. A method according to claim 32, wherein said weighting factor generating step comprises:

dividing the second, . . . , Kth highest signal strength signals by the first highest signal strength signal, and outputting the division results as first to (K−1) normalized signal strength signals; and outputting the first to (K−1) th normalized signal strength signals as the first to (k−1)th weighting factors when the first to (K−1)th normalized signal strength signals are equal to or greater than a predetermined threshold, and outputting zero as the first to (K−1)th weighting factors when the first to (K−1)th normalized signal strength signals are less than the predetermined threshold.

35. A method according to claim 32, wherein said weighting factor generating step includes:

dividing the second, . . . , Kth highest signal strength signals by the first highest signal strength signals, and outputting the results of division as the first to (K−1)th normalized signal strength signals; and taking as input the first to (K−1)th normalized signal strength signals, and outputting values of integral powers of 2 in the vicinity of the first to (K−1)th normalized signal strength signals as the first to (K−1)th weighting factors.

36. A method according to claim 24, wherein said combined branch metric generating step includes:

taking as input the first, second to Lth 1, 2, . . . , N-symbol differential detection signals and the first, second to Lth received signal strength signals, comparing the magnitude of the first, second to Lth received signal strength signals to select and output 1, 2, . . . , N-symbol differential detection signals generated from received signals having first, second, . . . , Kth (K: integer of 1 or more, and less than L) highest signal strength signals as 1, 2, . . . , N-symbol differential detection signals having first, second, . . . , Kth highest strength;

generating branch metric values corresponding to the state transitions on the trellis diagram by using the 1, 2, . . . , N-symbol differential detection signals having the first, second, . . . , Kth highest strength signals;

multiplying the branch metric values by constants $2^{J(1)}, \ldots, 2^{J(K-1)}$ determined by J(k) (k=1, . . . , K−1) taking integers of zero or less, and outputting the multiplication results as weighted branch metric values; and adding, among the branch metric values and the weighted branch metric values, the branch metric values corresponding to the same state transition, and outputting the result of addition as a combined branch metric.

* * * * *